United States Patent
Heath et al.

(10) Patent No.: US 12,036,754 B2
(45) Date of Patent: Jul. 16, 2024

(54) FORMING APPARATUS AND METHOD FOR FORMING HIGHLY CONTOURED COMPOSITE STRUCTURES

(71) Applicant: The Boeing Company, Chicago, IL (US)

(72) Inventors: Richard E. Heath, Mount Pleasant, SC (US); Andrew E. Modin, Charleston, SC (US); Richard A. Prause, Charleston, SC (US); Paul D. Shaw, Wilmington, DE (US); Raviendra S. Suriyaarachchi, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/503,226

(22) Filed: Oct. 15, 2021

(65) Prior Publication Data

US 2022/0143938 A1  May 12, 2022

Related U.S. Application Data

(60) Provisional application No. 63/111,063, filed on Nov. 8, 2020.

(51) Int. Cl.
*B29C 70/54* (2006.01)
*B29C 70/34* (2006.01)
(Continued)

(52) U.S. Cl.
CPC .......... *B29C 70/541* (2013.01); *B29C 70/345* (2013.01); *B29K 2063/00* (2013.01);
(Continued)

(58) Field of Classification Search
CPC ............ B29C 70/345; B29C 2043/366; B29C 70/541
See application file for complete search history.

(56) References Cited

U.S. PATENT DOCUMENTS 6,558,590 B1 * 5/2003 Stewart ................. B29C 43/183
425/149
7,527,759 B2 * 5/2009 Lee ........................ B29C 70/545
264/319
(Continued)

FOREIGN PATENT DOCUMENTS

EP 3115185 A1 1/2017

OTHER PUBLICATIONS

Teckno Mechanics ("Pneumatic Cylinder Working explained," Available on Mar. 7, 2020, <https://www.youtube.com/watch?v=hmz1h5fk2bl>) (Year: 2020).*
(Continued)

*Primary Examiner* — Michael A Tolin
*Assistant Examiner* — Hana C Page

(57) ABSTRACT

There is provided a forming apparatus for constraining a composite charge and forming the composite charge into a highly contoured composite structure. The forming apparatus includes a first die and a second die between which the composite charge is formed. The first die has pairs of first die portions spaced apart to define a die cavity into which the composite charge is formed into a contoured hat section having a cap. The forming apparatus includes a constraining assembly having a constraining device positioned in the die cavity. The constraining device is designed to constrain a cap portion, and to apply an upward resistive force against the cap portion, and against a downward compressive force applied by the second die, to provide wrinkle prevention in the cap as the contoured hat section is formed. The constraining assembly has a retaining element to retain the constraining device.

26 Claims, 21 Drawing Sheets

(51) Int. Cl.
  *B29K 63/00* (2006.01)
  *B29K 105/08* (2006.01)
  *B29K 307/04* (2006.01)
  *B29L 31/30* (2006.01)

(52) U.S. Cl.
  CPC .... *B29K 2105/089* (2013.01); *B29K 2307/04* (2013.01); *B29L 2031/3076* (2013.01)

(56) References Cited

U.S. PATENT DOCUMENTS

| | | |
|---|---|---|
| 7,708,546 B2 | 5/2010 | Lee et al. |
| 8,557,165 B2 | 10/2013 | Jones et al. |
| 8,601,694 B2 | 12/2013 | Brennan et al. |
| 8,997,642 B2 | 4/2015 | Stewart et al. |
| 9,162,380 B2 | 10/2015 | Jones et al. |
| 9,561,602 B2 | 2/2017 | Jones et al. |
| 10,399,284 B2 | 9/2019 | Prause et al. |
| 10,532,828 B2 | 1/2020 | Halbritter et al. |
| 2014/0203477 A1 | 7/2014 | Chapman et al. |
| 2016/0354982 A1* | 12/2016 | Prause ................. B29C 70/34 |
| 2017/0008217 A1* | 1/2017 | Chapman ............... B29C 53/84 |
| 2017/0120541 A1* | 5/2017 | Chapman ........... B29D 99/0003 |
| 2020/0101677 A1 | 4/2020 | Kendall et al. |
| 2020/0180239 A1 | 6/2020 | Prause et al. |
| 2020/0231267 A1 | 7/2020 | Rotter et al. |
| 2020/0398503 A1 | 12/2020 | Kendall et al. |
| 2021/0260795 A1 | 8/2021 | Plummer et al. |
| 2021/0260840 A1 | 8/2021 | Knutson et al. |
| 2021/0276285 A1 | 9/2021 | Heath et al. |

OTHER PUBLICATIONS

Kolstad ("Pneumatic Cylinders—A Technicall Guide," Jan. 10, 2018, <https://tameson.com/pages/pneumatic-cylinders>). (Year: 2018).*

Extended European Search Report (EESR), European Patent Office, Feb. 22, 2022, for Application No. EP21193026.8, Applicant The Boeing Company, 5 pages.

* cited by examiner

| CONSTRAINING ASSEMBLY 60 | | | |
|---|---|---|---|
| CONSTRAINING DEVICE (CD) 62 | FIRST END 94a | SECOND END 94b | BODY 95 |
| SINGLE USE CD 62a | MULT. USE CD 62b | UPWARD RESISTIVE FORCE 92 | RETAINING ELEM. 96 |
| EXPANDED POS. 112 | INTERMED. COMPRESSED POS.(S) 114 | | COMPRESSED POS. 116 |

| FOAM AND VACUUM BAG ASSEMBLY 100 | | | |
|---|---|---|---|
| COMPRESSIBLE FOAM ELEMENT (CFE) 102 | SINGLE USE CFE 102a | | MULTIPLE USE CFE 102b |
| COMPRESSIBLE MATERIAL 120 | | COMPRESSIBLE FOAM MATERIAL 122 | |
| OPEN CELL FOAM 124 | POLYURETHANE FOAM 124a | | LATEX RUBBER FOAM 124b |
| HIGH-DENSITY FOAM 126a | | DENSITY 128a | |
| CLOSED CELL FOAM 130 | POLYETHYLENE FOAM 130a | | POLYSTYRENE FOAM 130b |
| POLYPROPYLENE FOAM 130c | | NEOPRENE FOAM RUBBER 130d | |
| HIGH-DENSITY FOAM 126b | | DENSITY 128b | |
| EXPANDED POS. 112a | INTERMED. COMPRESSED POS.(S) 114a | | COMPRESSED POS. 116a |
| VAC. BAG 105 | VAC. SOURCE 106 | VAC. LINE 108 | VAC. CV(S) 110 | VAC. PRESSURE 118 |

| PNEUMATIC ASSEMBLY 132 | | | | |
|---|---|---|---|---|
| AIR CYL. ROD 134 | PISTON ROD 134a | PISTON HEAD 135 | CAP PRESSER 136 | AIR CYL. 146 |
| SINGLE ACT. SPRING RETURN AIR CYL. 146a | SPRING 166 | SPRING RETURN 168 | | SPRING FORCE 170 |
| DOUBLE ACTING AIR CYLINDER 146b | | ROD LOCK AIR CYLINDER 146c | | |
| ACTUAT. ROD LOCKING DEVICE 176 | ACTUATOR 178 | ROD LOCK 180 | | ACTUAT. FORCE MECH. 182 |
| AIR SUPP.LINE(S) 154 | PORT(S) 157 | AIR SUPP. SOURCE 158 | | COMPRESSED AIR 160 |
| PNEUM. AIR PRESSURE (AP) 162 | PNEUM. AP ABSENCE 162a | | PNEUM. AP APPLICATION 162b | |
| EXPANDED POS. 112b | INTERMED. COMPRESSED POS.(S) 114b | | COMPRESSED POS. 116b | |

| SPRING ASSEMBLY 184 | | | | |
|---|---|---|---|---|
| SPRING-LOADED PLATE 186 | SPRING ELEM. 190 | ROD 192 | STABIL. ROD 192a | CAP PRESSER 194 |
| ACTUATED LOCK. DEVICE 188 | ACTUATOR 212 | ROD LOCK 214 | | ACTUAT. FORCE MECH. 216 |
| EXPANDED POS. 112c | INTERMED. COMPRESSED POS.(S) 114c | | COMPRESSED POS. 116c | |

FIG. 1B

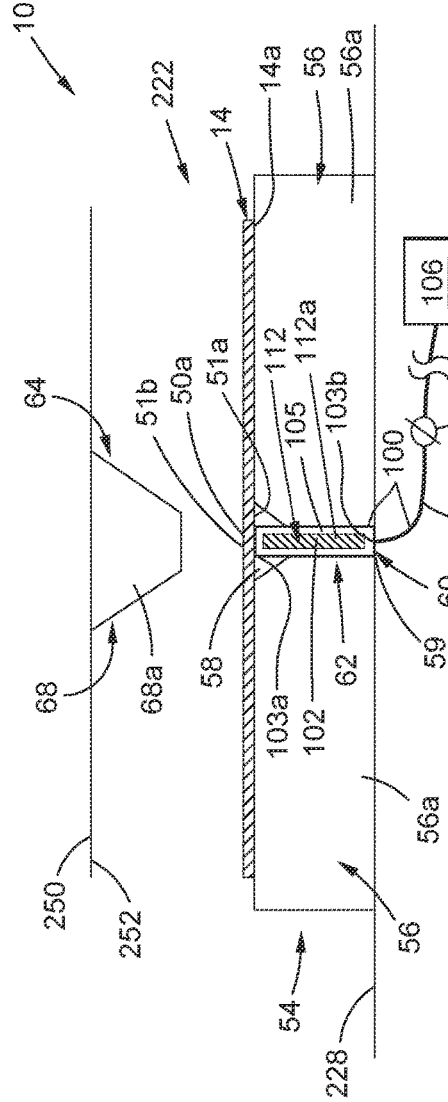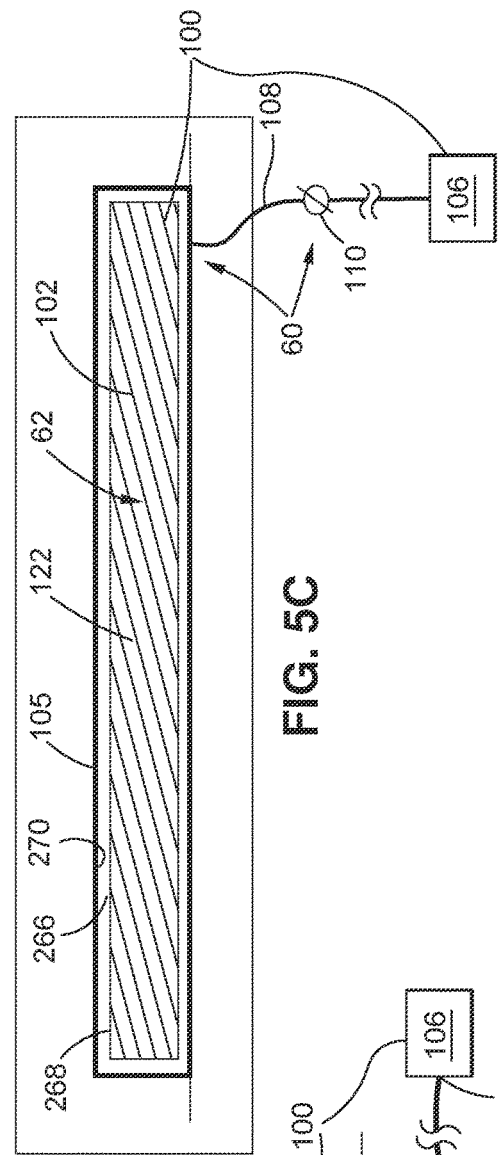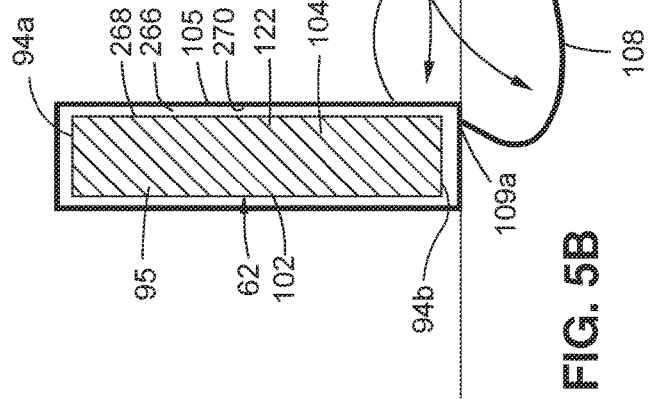

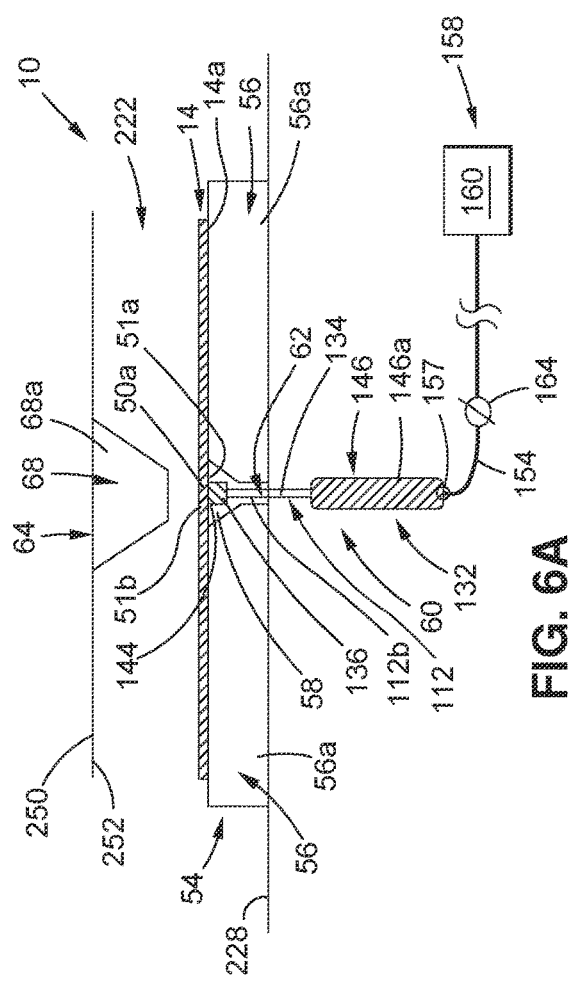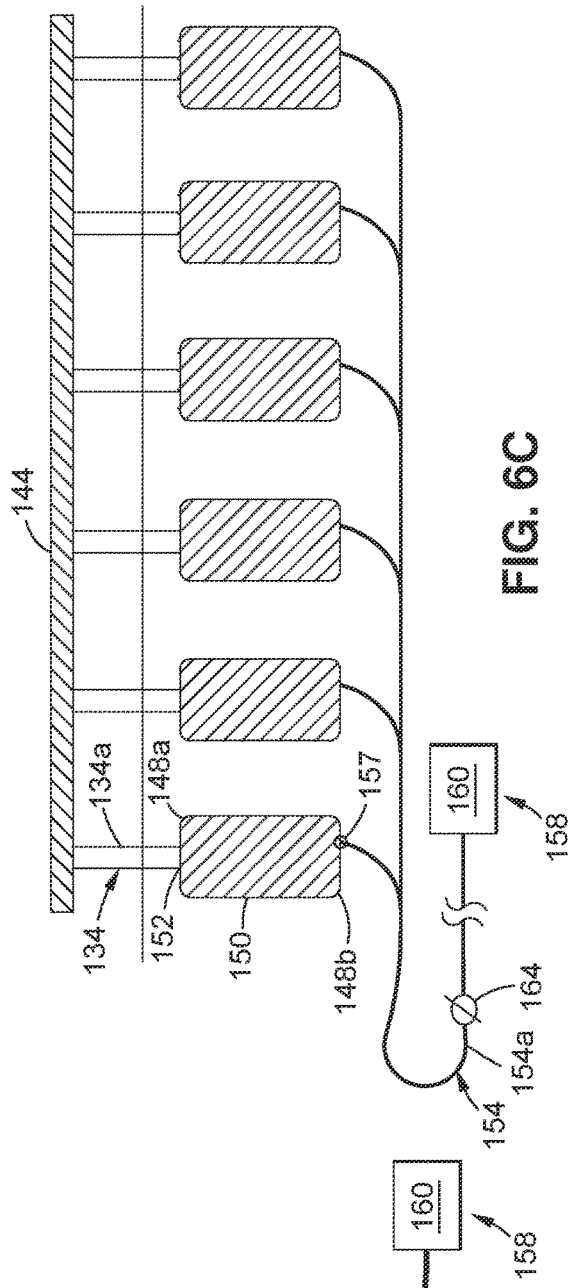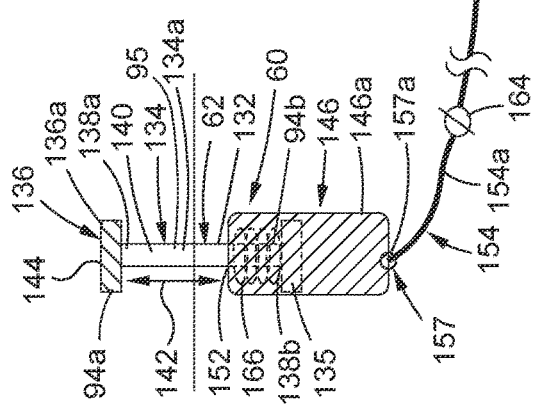

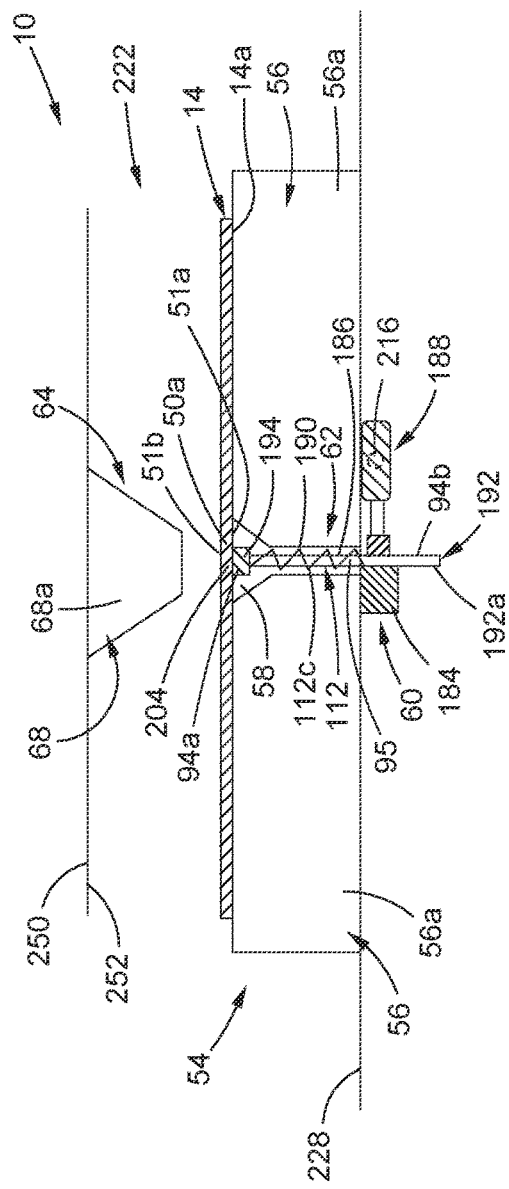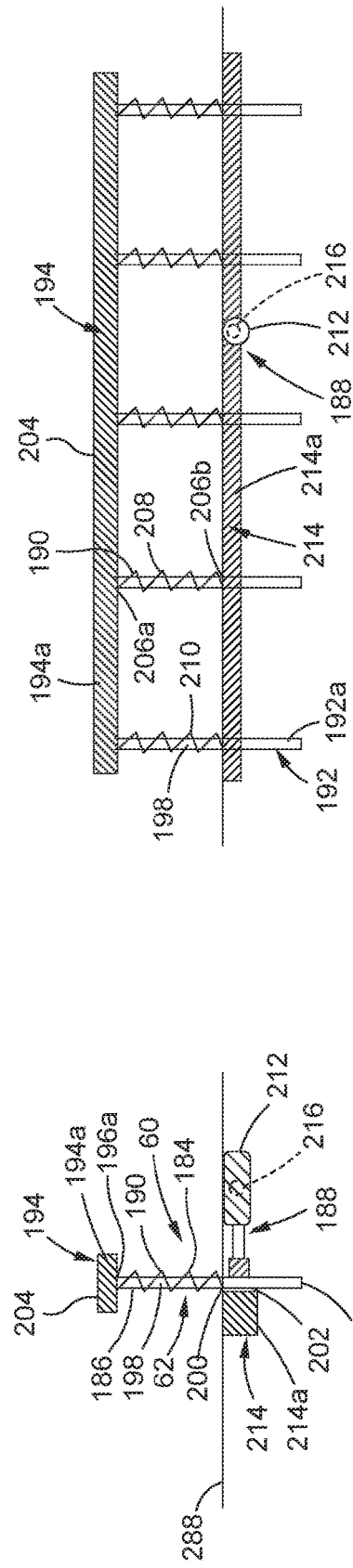

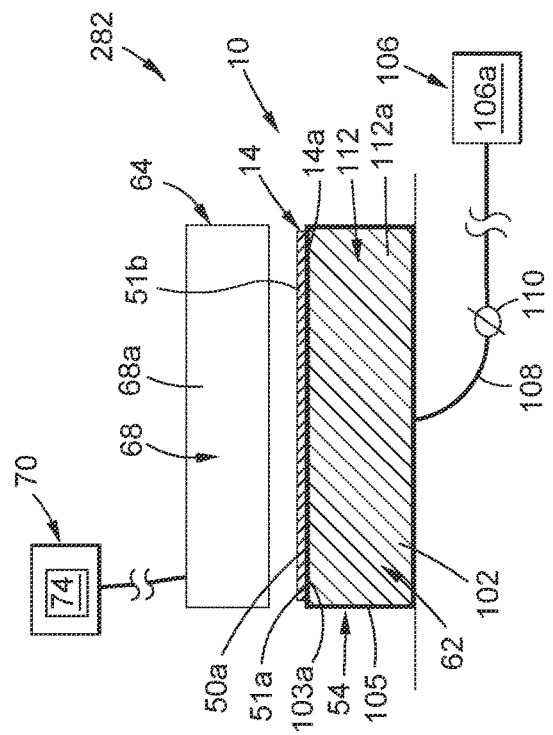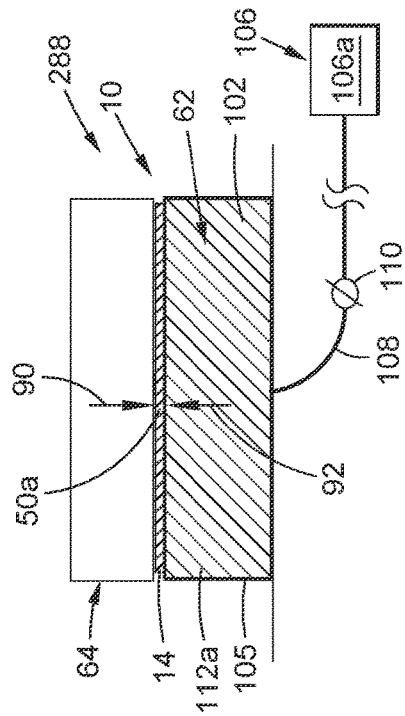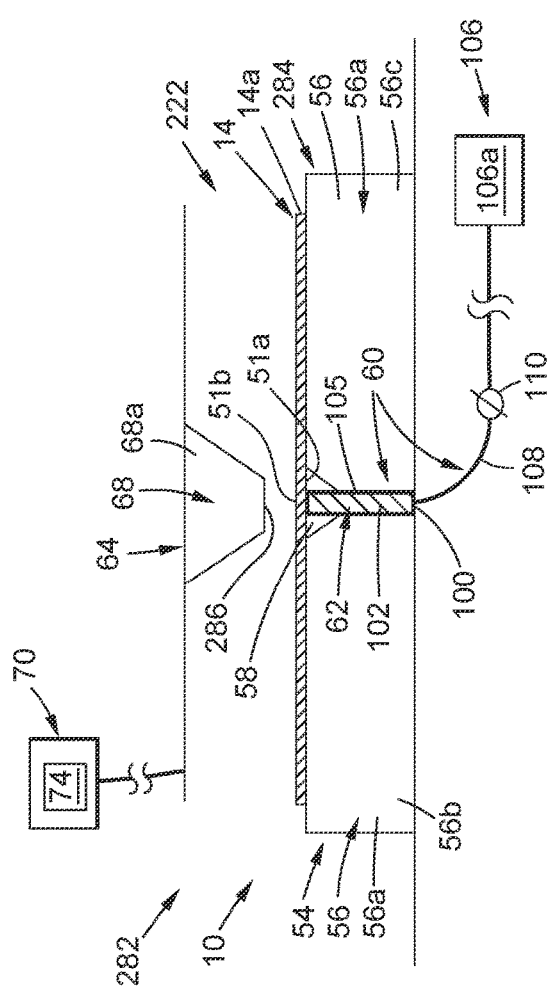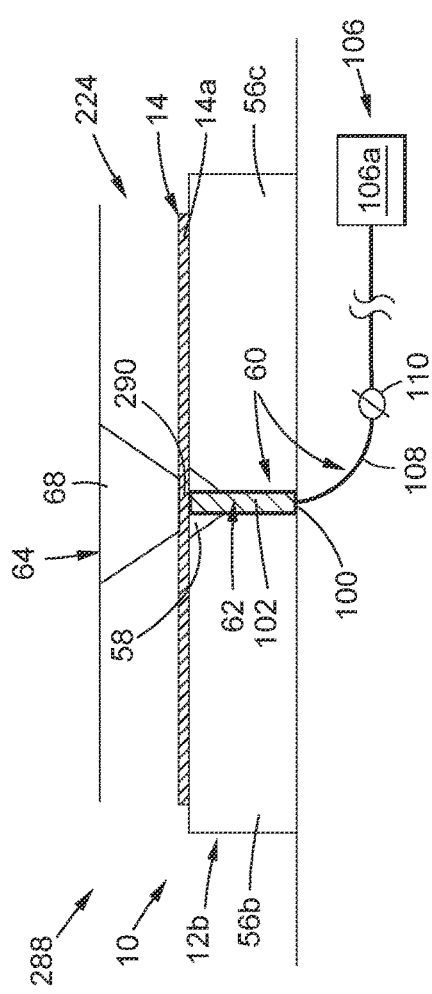

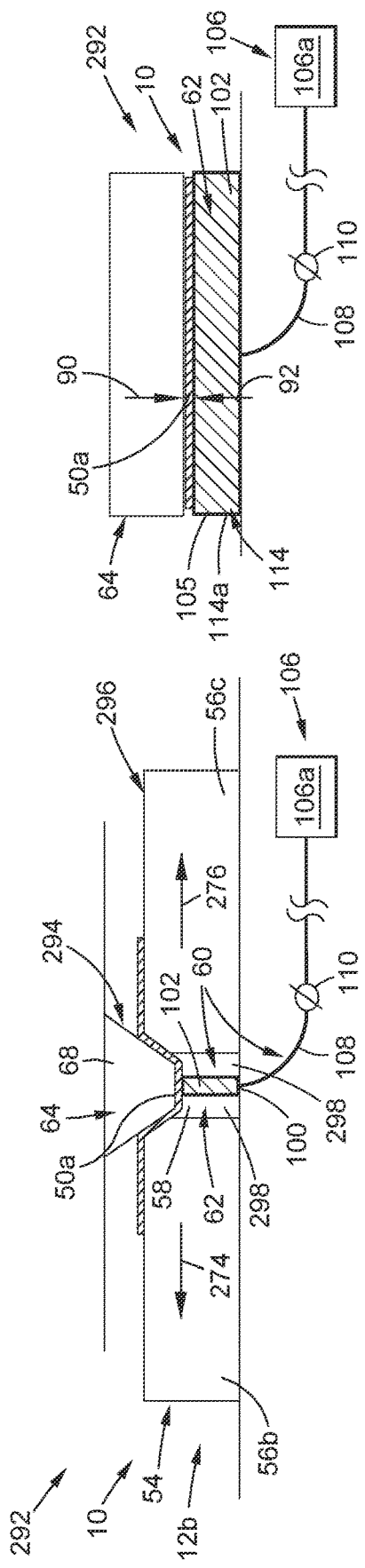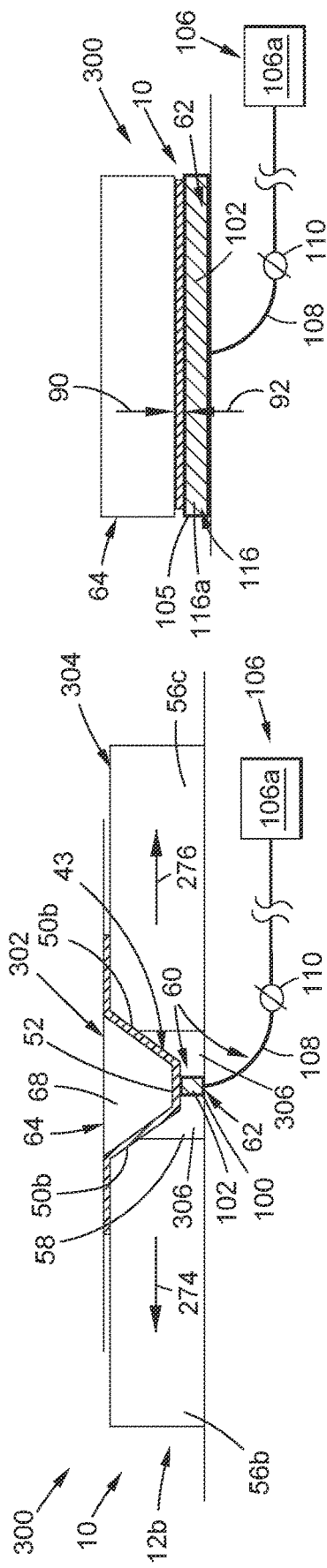

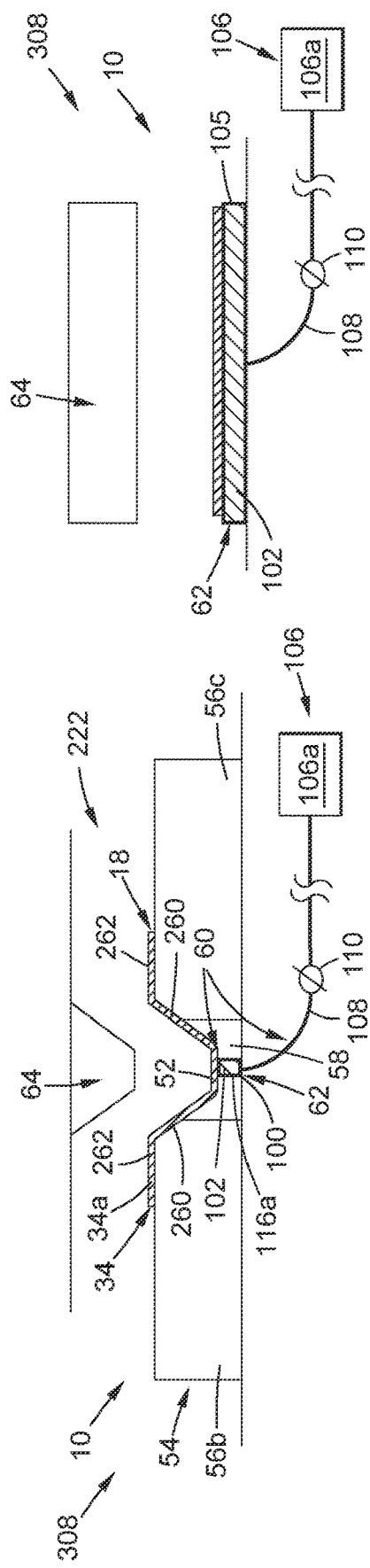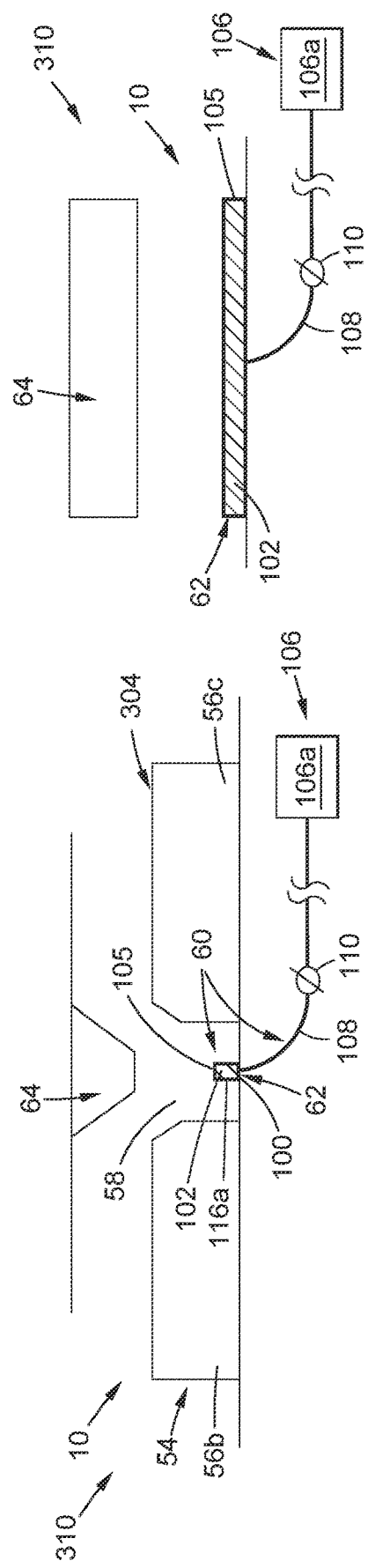

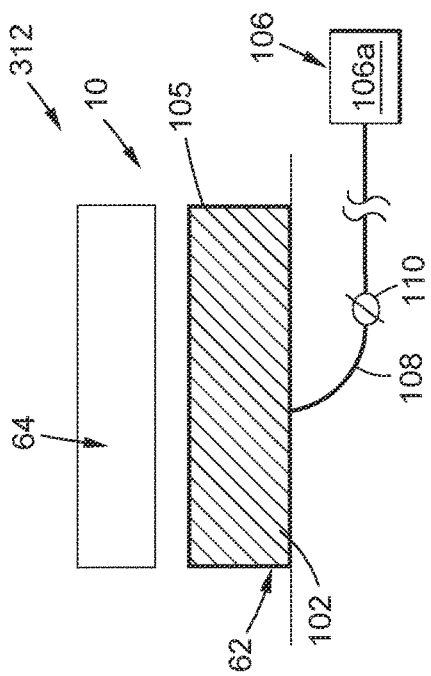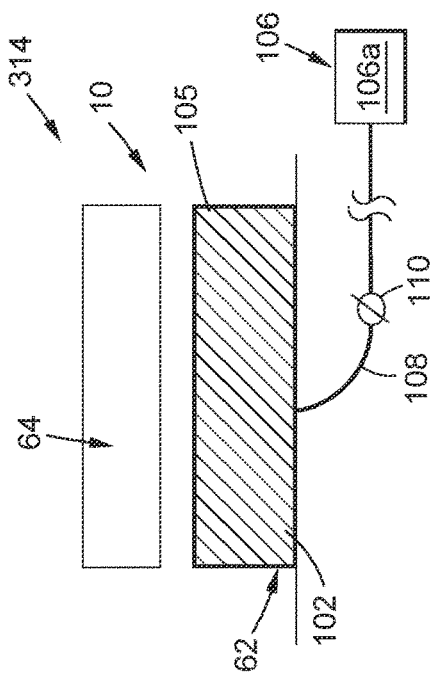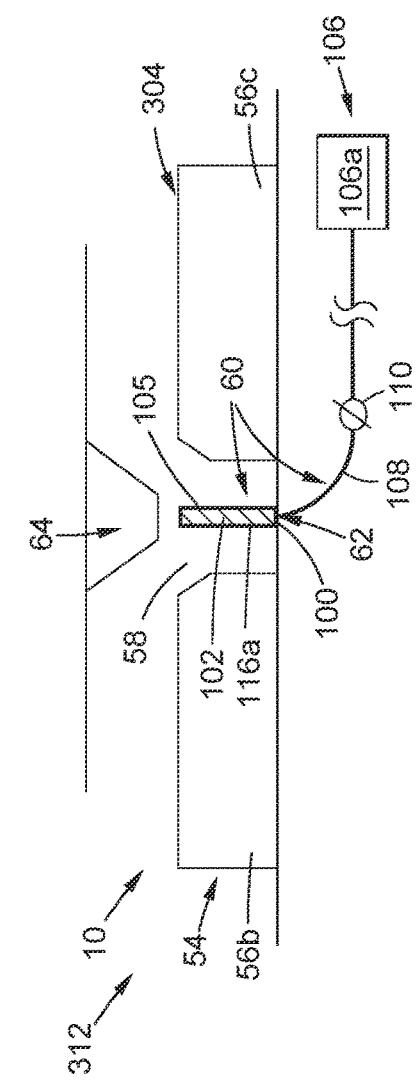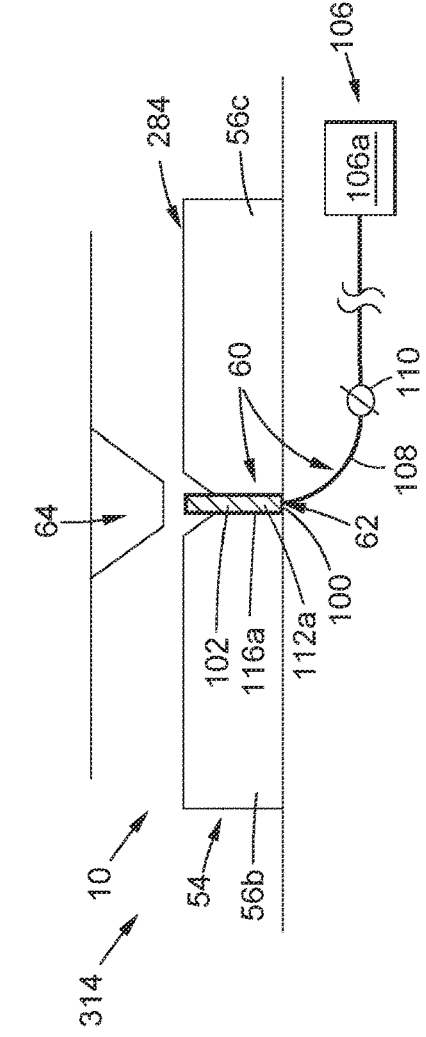

FORMING APPARATUS AND METHOD FOR FORMING HIGHLY CONTOURED COMPOSITE STRUCTURES

CROSS-REFERENCE TO RELATED APPLICATION

This nonprovisional application claims priority to U.S. Provisional Application Ser. No. 63/111,063, filed Nov. 8, 2020, which is incorporated herein by reference in its entirety.

FIELD

The disclosure relates generally to the fabrication of composite structures, such as those used in the aircraft industry, and relates more particularly, to an apparatus and method for forming flat composite charges into highly contoured composite structures, such as structural members, including stringers, stiffener members, and the like.

BACKGROUND

Composite structures may be used in a wide variety of applications, including in the manufacture of aircraft, due to their high strength-to-weight ratios, corrosion resistance and other favorable properties. In particular, in aircraft manufacturing, composite structures may be used to form the fuselage, wings, tail sections, and other parts of the aircraft. Such composite structures may be formed from composite laminates comprising multiple stacked composite plies, or layers, laminated together.

Composite structural members, such as stringers, stiffener members, and the like, may require complex contours tailored to particular applications. Such composite structural members may be formed using a forming apparatus having male and female dies that compress and form a flat composite laminate charge into a desired composite structure having a contoured or highly contoured shape along its length.

Known forming apparatuses and methods exist for forming flat composite laminate charges into highly contoured composite structures, such as stringers. However, in such known forming apparatuses and methods, where the stringer is contoured along its length as part of the forming process, stresses may be locally created within the composite charge during forming that may result in wrinkling or buckling in the areas of the stringer containing these stresses. In the case of a contoured stringer, or highly contoured stringer, having a cross-sectional profile in a hat shape, the stresses may tend to form in the contoured regions of the stringer, and cause wrinkling or buckling of the cap of the stringer, which results in wrinkles, or fiber distortions, in the cap of the stringer. Such wrinkling or buckling of the cap is undesirable because it may affect the structural performance of the stringer, resulting in the need to rework the stringer or alter the stringer design. This, in turn, may result in significant production downtime, increased labor, and/or increased material costs.

Moreover, to reduce the possibility of wrinkling or buckling, known methods for fabricating highly contoured structural members, such as stringers, using flat composite laminate charges may be limited to hand lay-up techniques, in which each ply is laid up by hand over a die or other tool. Such known hand lay-up techniques may be labor intensive and time consuming, and may result in increased manufacturing costs.

Accordingly, there is a need for an apparatus and method for forming highly contoured composite structures, such as structural members, including stringers, stiffener members, and the like, that prevent, or substantially prevent, wrinkling or buckling, in contoured regions, such as the cap, that avoid the use of hand lay-up techniques, and that provide advantages over known apparatuses and methods.

SUMMARY

Example implementations of the present disclosure provide an improved forming apparatus and method for forming highly contoured composite structures, such as stringers, using a constraining assembly in a first die, or female die, to prevent, or substantially prevent, formation of wrinkles, or fiber distortions, in the highly contoured composite structures, such as stringers. As discussed in the below detailed description, versions of the improved forming apparatus and method may provide significant advantages over known apparatuses and methods.

In a version of the disclosure, there is provided a forming apparatus for constraining a composite charge and forming the composite charge into a highly contoured composite structure. The forming apparatus comprises a first die and a second die between which the composite charge is formed. The first die has pairs of first die portions spaced apart to define a die cavity into which the composite charge is formed into a contoured hat section having a cap. The pairs of first die portions are slidably displaceable with respect to each other. The second die has a tapered portion designed for at least partial insertion into the die cavity.

The forming apparatus further comprises a constraining assembly coupled to the first die and having a constraining device positioned in the die cavity. The constraining device is designed to constrain a cap portion of the composite charge between the constraining device and the second die, and the constraining device is designed to apply an upward resistive force against the cap portion, and against a downward compressive force applied by the second die, to provide wrinkle prevention in the cap as the contoured hat section is formed. The constraining assembly further comprises a retaining element designed to retain the constraining device, when the second die is retracted after the highly contoured composite structure is formed.

In another version of the disclosure, there is provided a method for constraining a composite charge and forming the composite charge into a highly contoured composite structure. The method comprises the step of positioning a composite charge between, and in contact with, a first die and a second die of a forming apparatus. The first die has pairs of first die portions spaced apart to define a die cavity. The first die further has a constraining assembly with a constraining device disposed in the die cavity.

The method further comprises the step of pressing the composite charge into the die cavity of the forming apparatus, to form a contoured hat section having a cap and sides. The method further comprises the step of constraining the cap with the constraining device, as the contoured hat section is formed, and applying an upward resistive force, with the constraining device, against the cap, and against a downward compressive force applied by the second die, to transfer stress away from the cap and to provide wrinkle prevention in the cap.

The method further comprises the step of obtaining the highly contoured composite structure having the cap that is wrinkle-free. The method further comprises the step of retaining the constraining device with a retaining element of the constraining assembly, to prevent the constraining device from pushing the highly contoured composite structure upward, when the second die is retracted.

In another version of the disclosure, there is provided a method for forming an aircraft stringer having a cap that is wrinkle-free. The method comprises the step of positioning a composite laminate charge between, and in contact with, a female die and a male die of a high contour stringer former apparatus. The female die has pairs of die blocks spaced apart to define a die cavity. The female die further has a constraining assembly with a constraining device disposed in the die cavity.

The method further comprises the step of pressing the composite laminate charge into the die cavity of the high contour stringer former apparatus, to form a contoured hat section of the aircraft stringer. The contoured hat section has a cap and sides. The method further comprises the step of constraining the cap with the constraining device, as the contoured hat section is formed, and applying an upward resistive force, with the constraining device, against the cap, and against a downward compressive force applied by the second die, to transfer stress away from the cap and to provide wrinkle prevention in the cap.

The method further comprises the step of forming remaining portions of the composite laminate charge into the aircraft stringer, while the constraining device continues to constrain the cap and apply the upward resistive force against the cap and against the downward compressive force. The method further comprises the step of obtaining the aircraft stringer having the cap that is wrinkle-free.

The method further comprises the step of retracting the male die away from the aircraft stringer. The method further comprises the step of retaining the constraining device with a retaining element of the constraining assembly, to prevent the constraining device from pushing the aircraft stringer upward, when the male die is retracted. The method further comprises the step of removing the aircraft stringer from the female die. The method further comprises the step of releasing the retaining element.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary versions, but which are not necessarily drawn to scale. The drawings are examples and not meant as limitations on the description or claims.

FIG. 1B is an illustration of a functional block diagram showing exemplary versions of constraining assemblies that may be used in the forming apparatus of FIG. 1A;

FIG. 5A is a schematic illustration of front view of an exemplary version of a forming apparatus of the disclosure with a constraining assembly in the form of a foam and vacuum assembly;

FIG. 5B is a schematic illustration of an enlarged front view of the foam and vacuum assembly of FIG. 5A;

FIG. 5C is a schematic illustration of an enlarged side view of the foam and vacuum assembly of FIG. 5B;

FIG. 6A is a schematic illustration of front view of an exemplary version of a forming apparatus of the disclosure with a constraining assembly in the form of one version of a pneumatic assembly;

FIG. 6B is a schematic illustration of an enlarged front view of the pneumatic assembly of FIG. 6A;

FIG. 6C is a schematic illustration of an enlarged side view of the pneumatic assembly of FIG. 6B;

FIG. 7A is a schematic illustration of front view of an exemplary version of a forming apparatus of the disclosure with a constraining assembly in the form of a spring assembly;

FIG. 7B is a schematic illustration of an enlarged front view of the spring assembly of FIG. 7A;

FIG. 7C is a schematic illustration of an enlarged side view of the spring assembly of FIG. 7B;

FIG. 10A is a schematic illustration of a pre-forming step, showing a front view of an exemplary version of a forming apparatus of the disclosure having a constraining assembly, and showing a first die and a second die in an open position and a flat composite charge positioned on the first die;

FIG. 10B is a schematic illustration of a side view of the forming apparatus of FIG. 10A in the pre-forming step;

FIG. 11A is a schematic illustration of a first forming step of a forming cycle, showing a front view of the forming apparatus and the constraining assembly, and showing the first die and the second die in a closed position, and showing consolidation of a cap portion of the composite charge;

FIG. 11B is a schematic illustration of a side view of the forming apparatus of FIG. 11A in the first forming step;

FIG. 12A is a schematic illustration of a front view of a second forming step of a forming cycle, showing a front view of the forming apparatus and the constraining assembly, and showing the second die partially inserted into a die cavity;

FIG. 12B is a schematic illustration of a side view of the forming apparatus of FIG. 12A in the second forming step;

FIG. 13A is a schematic illustration of a third forming step of a forming cycle, showing a front view of the forming apparatus and the constraining assembly, and showing the second die fully inserted in the die cavity;

FIG. 13B is a schematic illustration of a side view of the forming apparatus of FIG. 13A in the third forming step;

FIG. 14A is a schematic illustration of a post-forming vacuum application step, showing a front view of the forming apparatus and the constraining assembly, and showing the second die retracted after a vacuum is applied, and the first die and the second die in the open position in the post-forming vacuum application step;

FIG. 14B is a schematic illustration of a side view of the forming apparatus of FIG. 14A in the post-forming vacuum application step;

FIG. 15A is a schematic illustration of a formed stringer removal step, showing a front view of the forming apparatus and the constraining assembly, and the formed stringer removed;

FIG. 15B is a schematic illustration of a side view of the forming apparatus of FIG. 15A in the formed stringer removal step;

FIG. 16A is a schematic illustration of a vacuum release step, showing a front view of the forming apparatus and the constraining assembly, and release of the vacuum;

FIG. 16B is a schematic illustration of a side view of the forming apparatus of FIG. 16A in the vacuum release step;

FIG. 17A is a schematic illustration of a first die return step, showing a front view of the forming apparatus and the constraining assembly, and showing the first die returned to its original position;

FIG. 17B is a schematic illustration of a side view of the forming apparatus of FIG. 17A in the first die return step;

The figures shown in this disclosure represent various aspects of the versions presented, and only differences will be discussed in detail.

DETAILED DESCRIPTION

Disclosed versions or embodiments will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "in one version" or "in a version" do not necessarily refer to the same version. Particular features, structures, or characteristics may be combined in any suitable manner consistent with this disclosure.

As used herein, "comprising" is an open-ended term, and as used in the claims, this term does not foreclose additional structures or steps.

As used herein, "designed to" or "configured to" means various parts or components may be described or claimed as "designed to" or "configured to" perform a task or tasks. In such contexts, "designed to" or "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps.

Figure 1A:
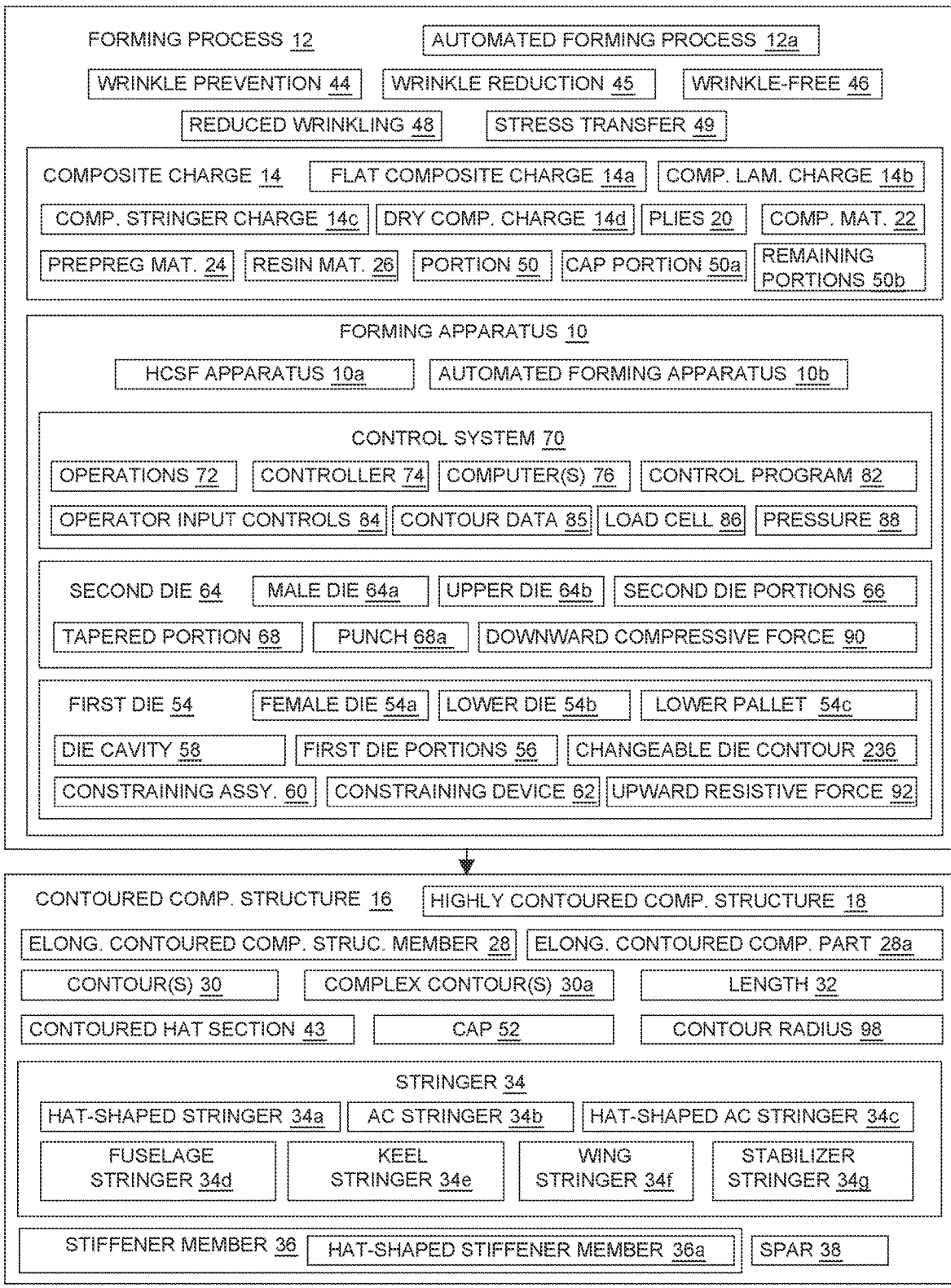
FIG. 1A is an illustration of a functional block diagram showing an exemplary version of a forming apparatus of the disclosure.

Now referring to the Figures, FIG. 1A is an illustration of a functional block diagram showing an exemplary version of a forming apparatus 10 of the disclosure that may be used in a forming process 12, for constraining a composite charge 14 and forming the composite charge 14 into a contoured composite structure 16, such as a highly contoured composite structure 18. The blocks in FIG. 1A represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein.

As shown in FIG. 1A, the forming apparatus 10 may be in the form of a high contour stringer former (HCSF) apparatus 10a, or another suitable forming apparatus. Preferably, the forming apparatus 10 is an automated apparatus 10b (see FIG. 1A), and preferably, the forming process 12 is an automated forming process 12a (see FIG. 1A). An example of a forming apparatus 10, such as a high contour stringer former (HCSF) apparatus 10a, that may be used in the forming process 12, to form the contoured composite structure 16, such as the highly contoured composite structure 18, is disclosed in U.S. Pat. No. 8,557,165, the contents of which are hereby incorporated by reference in their entireties. However, other types of forming apparatuses may also be used in the forming process 12 to form the highly contoured composite structure 18.

The composite charge 14 that is constrained and formed into the contoured composite structure 16, such as the highly contoured composite structure 18, using the forming apparatus 10 and the forming process 12 is preferably in the form of a flat composite charge 14a (see FIG. 1A), or a substantially flat composite charge, that is uncured. The composite charge 14 can be formed to a desired shape of the contoured composite structure 16, such as the highly contoured composite structure 18, by pressure, with or without heating the composite charge 14.

As shown in FIG. 1A, the composite charge 14 may comprise a composite laminate charge 14b, a composite stringer charge 14c, a dry composite charge 14d, or another suitable composite charge. As further shown in FIG. 1A, the composite charge 14 preferably comprises a plurality of plies 20 of composite materials 22, such as prepreg materials 24, which may be knitted or woven fabrics preimpregnated with a resin material 26, such as a resin binder, for example, carbon fiber epoxy prepreg materials. The composite material 22 may comprise carbon fiber reinforced polymer (CFRP) materials, including plastic or thermoplastic materials known in the art composite part manufacturing. The plurality of plies 20 may comprise unidirectional or bidirectional fiber reinforcement impregnated with, and held in, a suitable resin matrix, such as a thermoset or a thermoplastic, i.e., prepregs. The dry composite charges 14d may be formed from fabrics that have been pre-treated with resin materials 26, or may be formed from dry fabric plies having tackifiers that tack the fabric plies together in a desired shape and/or alignment prior to resin infusion. The contoured composite structure 16, such as the highly contoured composite structure 18, is typically formed into a desired configuration while the composite material 22 of the composite charge 14 is in a green, or uncured, condition and then cured while supported in the desired configuration.

The contoured composite structure 16, such as the highly contoured composite structure 18, formed from the composite charge 14 using the forming apparatus 10 and the forming process 12 disclosed herein is preferably an elongate contoured composite structural member 28 (see FIG. 1A), such as an elongate contoured composite part 28a (see FIG. 1A), that can be used in a variety of industries and applications including, but not limited to, the manufacture of aircraft 400a (see FIG. 19) and other aerospace structures and vehicles.

The contoured composite structure 16, such as the highly contoured composite structure 18, has one or more contours 30 (see FIGS. 1A, 4), such as one or more complex contours 30a (see FIGS. 1A, 4), along its length 32 (see FIG. 1A). The contoured composite structure 16, such as the highly contoured composite structure 18, as disclosed herein, can define various contours 30, such as complex contours 30a, and configurations, including curves, angles, flanges, complex contours, high contours, and the like.

As shown in FIG. 1A, the contoured composite structure 16, such as the highly contoured composite structure 18, may comprise one or more of, a stringer 34, including a hat-shaped stringer 34a, an aircraft stringer 34b, a hat-shaped aircraft stringer 34c, a fuselage stringer 34d, a keel stringer 34e, a wing stringer 34f, a stabilizer stringer 34g, or another suitable stringer, or may comprise a stiffener member 36, including, a hat-shaped stiffener member 36a, or another suitable stiffener member, or may comprise a spar 38, or may comprise another suitable highly contoured composite structure.

The stringer 34, such as the hat-shaped stringer 34a, discussed below with respect to FIG. 4, has a cross-sectional profile 40 (see FIG. 4) comprising a hat shape 42 (see FIG. 4). The stringer 34, such as the hat-shaped stringer 34a, preferably has a contoured hat section 43 (see FIGS. 1A, 4) having a cap 52 (see FIGS. 1A, 4). The cap 52 of the contoured composite structure 16, such as the highly contoured composite structure 18, for example, the hat-shaped stringer 34a, formed in the forming process 12, preferably has a contour radius 98 (see FIG. 1A) in a range of 500 (five hundred) inches to 1000 (one thousand) inches, and more preferably, has a contour radius 98 in a range of 500 (five hundred) inches to 750 (seven hundred fifty) inches.

As used herein, "contoured composite structures" and "highly contoured composite structures" mean a wide variety of complex contoured and highly contoured composite structures and parts which, due to the relative severity, or steepness, of their contours, such as complex contours, may be subject to potential wrinkling, or bunching, between the plurality of plies forming the composite charge, when using known forming techniques or processes.

As used herein, "contoured" and "highly contoured" mean a constant or varying contour, such as complex contour, or curvature, in the direction of the length of the composite charge that is sufficient in its severity, or steepness, to be subject to potential wrinkling, or bunching, between the plurality of plies forming the composite charge, when using known forming techniques or processes.

As used herein, "wrinkle(s)" and "wrinkling" mean stresses that are locally created within a composite charge during forming, for example, fiber distortions, ply distortions, or artifacts, that may form in a composite charge, and/or appear in a formed contoured composite structure or part, during a manufacturing or forming process, as a result of buckling between plies or excess fiber material going out of plane or distorting, when one or more portions, such as contoured portions, of the composite charge are compressed or stressed during the manufacturing or forming process.

The forming apparatus 10 and the forming process 12 disclosed herein are designed to provide wrinkle prevention 44 (see FIG. 1A), or wrinkle reduction 45 (see FIG. 1A), that is, to prevent, eliminate, or substantially reduce or minimize, the formation of wrinkles or fiber distortions, in the cap portion 50a of the composite charge 14, and in turn, in the cap 52 of the contoured composite structure 16, such as the highly contoured composite structure 18 that is formed. Thus, the cap 52 of the contoured composite structure 16, such as the highly contoured composite structure 18, formed using the forming apparatus 10 and forming process 12 disclosed herein, is preferably wrinkle-free 46 (see FIG. 1A), or has reduced wrinkling 48 (see FIG. 1A).

As shown in FIG. 1A, in an exemplary version, the forming apparatus 10, such as the high contour stringer former (HCSF) apparatus 10a, comprises a first die 54, also referred to as a female die 54a, a lower die 54b, or a lower pallet 54c. The first die 54, such as the female die 54a, the lower die 54b, or the lower pallet 54c, comprises pairs 55 (see FIG. 2B) of first die portions 56 (see FIGS. 1A, 2B), such as a plurality of pairs 55 of first die portions 56, spaced apart to define a die cavity 58 (see FIGS. 1A, 2B) into which the cap portion 50a of the composite charge 14 is formed into the contoured hat section 43 having the cap 52. The pairs 55 of first die portions 56 are slidably displaceable with respect to each other. The pairs 55 (see FIG. 2B) may comprise a first half 55a (see FIG. 2B) of each pair 55 and a second half 55b (see FIG. 2B) of each pair 55. The first die portions 56 may be in the form of die blocks 56a (see FIGS. 2B, 3), or may be in the form of another suitable shape.

As shown in FIG. 1A, the forming apparatus 10, such as the high contour stringer former apparatus 10a, further comprises a constraining assembly 60 coupled to the first die 54. The constraining assembly 60 has a constraining device 62 (see FIGS. 1A, 1B) positioned in, or disposed within, the die cavity 58 of the first die 54. As discussed in further detail below, the constraining assembly 60, and in particular, the constraining device 62 of the constraining assembly 60, is designed to constrain, and constrains, the cap portion 50a of the composite charge 14 prior to, and during, the forming process 12, to prevent the composite charge 14, and in particular, the cap portion 50a of the composite charge 14, from moving, to transfer stress away from the cap portion 50a and cap 52, and to provide wrinkle prevention 44, that is, prevention of the formation of wrinkles or fiber distortions, in the cap portion 50a of the composite charge 14, and the cap 52 formed from the cap portion 50a. Thus, the constraining device 62 of the constraining assembly 60 provides stress transfer 49 (see FIG. 1A) of stress, such as stress from compression or pressure, away from the cap portion 50a and the cap 52 during the forming process 12. The constraining assembly 60, and in particular, the constraining device 62, applies an upward resistive force 92 (see FIGS. 1A, 1B) against the composite charge 14, such as the cap portion 50a, or cap 52, and against a downward compressive force 90 (see FIG. 1A) applied by the second die 64, as discussed in further detail below. The upward resistive force 92 of the constraining device 62 and the downward compressive force 90 of the second die 64, act to pinch, or constrain, the cap portion 50a, or cap 52 formed by the cap portion 50a, of the composite charge 14, to transfer stress away from the cap portion 50a, or cap 52, and to provide wrinkle prevention 44 (see FIG. 1A) or wrinkle reduction 45 (see FIG. 1A) to the cap portion 50a, or cap 52.

As shown in FIG. 1A, the forming apparatus 10, such as the high contour stringer former apparatus 10a, further comprises a second die 64, also referred to as a male die 64a, or an upper die 64b. The second die 64, such as the male die 64a, or the upper die 64b, has pairs 65 (see FIGS. 2B, 3) of second die portions 66 (see FIGS. 1A, 2B, 3), such as a plurality of pairs 65 of second die portions 66, that are independently displaceable with respect to each other. As shown in FIG. 1A, the second die 64 has a tapered portion 68, such as in the form of a punch 68a, designed for at least partial insertion into the die cavity 58, during the forming process 12. The composite charge 14 is formed between the first die 54 and the second die 64, and the constraining device 62 of the constraining assembly 60, is designed to constrain, and constrains, the cap portion 50a of the composite charge 14 between the constraining device 62 and the second die 64 prior to, and during, the forming process 12.

As shown in FIG. 1A, the forming apparatus 10, such as the high contour stringer former apparatus 10a, further comprises a control system 70 for operatively controlling operations 72 of the forming apparatus 10, including coordinating and controlling movements of the first die 54 and the second die 64 with movement of the constraining assembly 60. As shown in FIG. 1A, the control system 70 comprises a controller 74. The controller 74 may comprise one or more computers 76 (see FIG. 1A), such as a portable computer (PC), or a programmable logic controller (PLC), that controls operations 72 of a plurality of contour control actuators 78 (see FIG. 2A) and a plurality of shape forming actuators 80 (see FIG. 2A) of the forming apparatus 10. In one version, the controller 74 uses a control program 82 (see FIG. 1A) which may include a software program, or an algorithm, that determines how the forming should progress and the sequential operation of the plurality of shape forming actuators 80. A set of operator input controls 84 (see FIG. 1A) allows an operator to input or change the control program 82, contour data 85 (see FIG. 1A) of the contoured composite structure 16, such as the highly contoured composite structure 18, to be formed, or other suitable data sets, with operator defined values. The controller 74 may also receive signals from a load cell 86 (see FIG. 1A) which may be used to monitor pressure 88 (see FIG. 1A) applied to the composite charge 14 by the plurality of contour control actuators 78 and the plurality of shape forming actuators 80.

Now referring to FIG. 1B, FIG. 1B is an illustration of a functional block diagram showing exemplary versions of constraining assemblies 60 that may be used in the forming apparatus 10 and the forming process 12 of FIG. 1A. The blocks in FIG. 1B represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein.

Prior to the forming process 12, and during the forming process 12, the constraining assembly 60 (see FIGS. 1A-1B), and in particular, the constraining device 62 (see FIGS. 1A-1B), constrains a portion 50 (see FIG. 1A) of the composite charge 14 (see FIG. 1A), such as the cap portion 50a (see FIG. 1A), of the composite charge 14, between the constraining device 62 and the second die 64 (see FIG. 1A), such as the tapered portion 68 (see FIG. 1A), of the second die 64.

As the second die 64 applies the downward compressive force 90 (see FIG. 1A) against the portion 50, such as the cap portion 50a, to push the portion 50, such as the cap portion 50a, downward, to compress the constraining device 62 downward, and to move laterally outward and apart the one or more pairs 55 (see FIGS. 2B, 3) of the first die portions 56 (see FIGS. 1A, 2B, 3), the constraining assembly 60, and in particular, the constraining device 62, is designed to apply, and applies, the upward resistive force 92 (see FIGS. 1A-1B) against a first surface 51a (see FIG. 5A) of the cap portion 50a, and against the downward compressive force 90, to provide wrinkle prevention 44, that is, to prevent formation of wrinkles or fiber distortions, in the portion 50, such as the cap portion 50a, and in the cap 52, as the contoured hat section 43 is formed from the composite charge 14.

As shown in FIGS. 1B, 5B, 6B, 6D, 6E, and 7A, the constraining device 62 has a first end 94a, a second end 94b, and a body 95 disposed between the first end 94a and the second end 94b. The first end 94a of the constraining device 62 is designed to directly or indirectly engage with, or contact, and directly or indirectly engages with, or contacts, the first surface 51a of the cap portion 50a, of the composite charge 14, such as the flat composite charge 14a, for example, the composite laminate charge 14b, to apply the upward resistive force 92 against the first surface 51a of the cap portion 50a, and against the downward compressive force 90 applied by the second die 64, and to pinch the cap portion 50a against the tapered portion 68 of the second die 64, during the forming of the composite charge 14 into the highly contoured composite structure 18 of the forming process 12, as well as prior to the forming process 12. In addition, during the forming of the composite charge 14 into the highly contoured composite structure 18 with the forming process 12, the constraining device 62 is initially in an expanded position 112 (see FIGS. 1B, 5A, 6A, 6D, 6E, 7A) in the die cavity 58, to constrain the cap portion 50a against the second die 64, and when the tapered portion 68 of the second die 64 is fully inserted into the die cavity 58, the constraining device 62 is in a compressed position 116 (see FIGS. 1B, 13B), and one or more of the pairs 55 of the first die portions 56 are positioned laterally outward from the constraining device 62.

In one version, the constraining device 62 may comprise a single use constraining device 62a (see FIG. 1B) that is designed to be used a single time, or one time, for a forming process 12, or forming cycle, and then is removed from the first die 54 of the forming apparatus 10. In another version, the constraining device 62 comprises a multiple use constraining device 62b (see FIG. 1B) that is designed to be used two or more times, or multiple times, for two or more, or multiple, forming processes 12, or forming cycles.

As shown in FIG. 1B, the constraining assembly 60 further comprises a retaining element 96. The retaining element 96 is designed to retain, and retains, the constraining device 62 in a compressed position 116 (see FIG. 1B), for example, after the contoured composite structure 16, such as the highly contoured composite structure 18, is formed with the forming process 12, and for example, after the second die 64 is retracted away from the contoured composite structure 16, such as the highly contoured composite structure 18, and away from the first die 54. This is to prevent the contoured composite structure 16, such as the highly contoured composite structure 18, from being pushed upwardly by the constraining device 62 in an unwanted manner. Thus, when the second die 64, or male die 64a, is retracted away from the first die 54, or female die 54a, after the forming process 12, the retaining element 96 retains the constraining device 62 in the compressed position 116, so that the contoured composite structure 16, such as the highly contoured composite structure 18, stays in place on the first die 54, or female die 54a, and is not moved upward in an unwanted manner prior to removal of the contoured composite structure 16, such as the highly contoured composite structure 18, from the first die 54, or female die 54a.

Prior to the forming process 12 of forming the contoured composite structure 16, such as the highly contoured composite structure 18, from the composite charge 14, the constraining device 62 is preferably in an expanded position 112 (see FIG. 1B), such as a fully expanded position. During the forming process 12 of forming the contoured composite structure 16, such as the highly contoured composite structure 18, from the composite charge 14, the constraining device 62 may be compressed to one or more intermediate compressed positions 114 (see FIG. 1B). At completion of the forming process 12 of the contoured composite structure 16, such as the highly contoured composite structure 18, is preferably lowered, or compressed down, to a compressed position 116 (see FIG. 1B), such as a fully compressed position.

As shown in FIG. 1B, and as discussed below with respect to FIGS. 5A-5C, in one version, the constraining assembly 60 comprises a foam and vacuum assembly 100, and the constraining device 62 comprises a compressible foam element 102. The compressible foam element 102 has a first end 103a (see FIG. 5B), a second end 103b (see FIG. 5B), and a body 104 (see FIG. 5B) disposed between the first end 103a and the second end 103b.

As shown in FIG. 1B and FIGS. 5A-5B, the foam and vacuum assembly 100 comprises the compressible foam element 102, a vacuum bag 105 surrounding the compressible foam element 102, a vacuum source 106 coupled to the vacuum bag 105, via a vacuum line 108, and one or more control valves 110. The foam and vacuum assembly 100 may comprise various other components or parts, discussed below, and known in the art.

The compressible foam element 102 is covered, or surrounded, by the vacuum bag 105. The vacuum bag 105 may be made of a plastic material including a plastic film, such as made of polyethylene, nylon, or another suitable plastic film material, or including a plastic sheet such as made of silicone rubber, polyurethane, or another suitable plastic sheet material. One or more seals may be used to seal around the vacuum bag 105 and around the point where the vacuum line 108, or vacuum hose, enters the vacuum bag 105. The one or more seals may be made of a seal material, such as a tape or an adhesive, for example, mastic, or another suitable seal material. If desired, the vacuum bag 105 may be used with a release film, a peel ply, a breather cloth, or other suitable materials to separate the vacuum bag 105 and the compressible foam element 102.

The vacuum bag 105 has a port opening 107 (see FIG. 5B) configured to receive the vacuum line 108, or vacuum hose. The vacuum line 108, or vacuum hose, has a first end 109a (see FIG. 5B) and a second end 109b (see FIG. 5B). The first end 109a of the vacuum line 108, or vacuum hose, is coupled to the port opening 107 of the vacuum bag 105 at, or near, the second end 103b of the compressible foam element 102. However, the vacuum line 108 may also be coupled to the vacuum bag 105 at, or near, another area of the compressible foam element 102. The second end 109b of the vacuum line 108 is coupled to the vacuum source 106 (see FIG. 5B). The vacuum line 108, such as the vacuum hose, may also be used with fittings, or other components or parts known in the art.

The vacuum bag 105 is connected to the vacuum source 106, via the vacuum line 108, such as the vacuum hose. The vacuum source 106 (see FIGS. 1B, 5A-5C) may be in the form of a vacuum pump 106a (see FIGS. 5A-5C), or another suitable vacuum source. The vacuum source 106, such as the vacuum pump 106a, draws or pulls air from the vacuum bag 105 envelope. As the vacuum source 106, such as the vacuum pump 106a, evacuates air from inside the vacuum bag 105 envelope, air pressure inside of the vacuum bag 105 envelope is reduced. The vacuum pump 106a may comprise a mechanical vacuum pump, such as a piston pump, a rotary vane pump, a turbine pump, or another suitable mechanical vacuum pump. The minimum pump requirements of the vacuum pump 106a, may be determined by the size and shape of the compressible foam element 102 used and the size and shape of the vacuum bag 105 surrounding the compressible foam element 102.

One or more control valves 110 (see FIGS. 1B, 5A-5C) may be used. In one example, one control valve 110 (see FIG. 5B) is used, and the control valve 110 is incorporated into the vacuum line 108, to allow an operator to turn the vacuum source 106 on and off and to control the rate of air removal from the vacuum bag 105. In another example, two control valves are used, and one control valve 110 is incorporated into the vacuum line 108, to turn the vacuum source 106 on and off and to control the rate of air removal from the vacuum bag 105, and another control valve 110 may be incorporated into the vacuum line 108 or at the vacuum bag 105 to control the vacuum pressure 118 in the vacuum bag 105. The foam and vacuum assembly 100 may further comprise a vacuum gauge, or another suitable component, to monitor the level of the vacuum pressure 118.

Prior to the forming process 12, the compressible foam element 102 is in an expanded position 112a (see FIG. 1B). During the forming process 12 of the contoured composite structure 16, such as the highly contoured composite structure 18, the compressible foam element 102 is compressed downward by the second die 64, and in particular, by the tapered portion 68 of the second die 64, to one or more intermediate compressed positions 114a (see FIG. 1B). The compressible foam element 102 applies an upward resistive force 92 (see FIG. 1B) against the cap portion 50a of the composite charge 14 and against the downward compressive force 90 (see FIG. 1A) applied by the second die 64. The compressible foam element 102 constrains the cap portion 50a of the composite charge 14 in place prior to, and during, the forming process 12. At completion of the forming process 12 of the contoured composite structure 16, such as the highly contoured composite structure 18, the compressible foam element 102 is preferably compressed down to a compressed position 116a (see FIG. 1B), such as a fully compressed position.

When the second die 64 is retracted, or moved, away from the first die 54, after completion of the forming process 12, vacuum pressure 118 (see FIG. 1B) is preferably applied by the vacuum source 106, such as the vacuum pump 106a, and air is pulled out, or drawn out, of, for example, a gap 266 (see FIGS. 5B-5C) between the vacuum bag 105 and the compressible foam element 102, and this causes the vacuum bag 105 to compress around the compressible foam element 102 and hold down and retain the compressible foam element 102 in the compressed position 116a, such as a fully compressed position.

Thus, for the foam and vacuum assembly 100, the retaining element 96 (see FIG. 1B) comprises the vacuum bag 105 under vacuum pressure 118, to retain, or hold down, the compressible foam element 102, in the compressed position 116a, after the forming process 12, or forming cycle, and after the second die 64 is retracted, so that the compressible foam element 102 does not expand back to the expanded position 112a (see FIG. 1B), to undesirably push the contoured composite structure 16, such as the highly contoured composite structure 18, upwardly out of the die cavity 58 of the first die 54. Pushing the contoured composite structure 16, such as the highly contoured composite structure 18, that has been formed, upward out of the die cavity 58 of the first die 54 may potentially cause the formed contoured structure to flatten out from the contoured or curved configuration, if it remains pushed up out of the die cavity 58 of the first die 54, for a short time, e.g., 5-10 minutes. The vacuum pressure 118 is preferably applied to the vacuum bag 105 and to the compressible foam element 102, so that the vacuum bag 105, functioning as the retaining element 96, retains and holds the compressible foam element 102 in the compressed position 116a, until the contoured composite structure 16, such as the highly contoured composite structure 18, is removed from the first die 54. Once the contoured composite structure 16, such as the highly contoured composite structure 18, is removed from the first die 54, the vacuum pressure 118 may be turned off, or released, by closing, or turning off, the one or more control valves 110 to the vacuum source 106, and the compressible foam element 102 is allowed to expand back to the expanded position 112a.

As shown in FIG. 1B, the compressible foam element 102, in one version, comprises a single use compressible foam element 102a that is designed to be used a single time, or one time, for a forming process 12, or forming cycle, and then is removed from the first die 54 of the forming apparatus 10. In another version, as shown in FIG. 1B, the compressible foam element 102 comprises a multiple use compressible foam element 102b that is designed to be used two or more times, or multiple times, for two or more, or multiple, forming processes 12, or forming cycles. The compressible foam element 102 may be removably attached to the die cavity 58 in the first die 54, so that the compressible foam element 102 can be easily removed and cleaned or repaired, or removed and replaced with a compressible foam element 102 that is unused or new.

As further shown in FIG. 1B, the compressible foam element 102 comprises a compressible material 120, such as a compressible foam material 122. As shown in FIG. 1B, the compressible foam material 122 may comprise an open cell foam 124, including a polyurethane foam 124a, a latex rubber foam 124b, or another suitable open cell foam. Preferably, the open cell foam 124 is in the form of a high-density foam 126a (see FIG. 1B) having a density 128a (see FIG. 1B) in a range of 3 lb/ft$^3$ (three pounds per cubic foot) to 13 lb/ft$^3$ (thirteen pounds per cubic foot).

As shown in FIG. 1B, the compressible foam material 122 may also comprise a closed cell foam 130, including a polyethylene foam 130a, for example, an expanded polyethylene foam, a polystyrene foam 130b, for example, an expanded polystyrene foam, a polypropylene foam 130c, for example, an expanded polypropylene foam, a neoprene foam rubber 130d, or another suitable closed cell foam. Preferably, the closed cell foam 130 is in the form of a high-density foam 126b (see FIG. 1B) having a density 128b (see FIG. 1B) in a range of 2 lb/ft$^3$ (two pounds per cubic foot) to 10 lb/ft$^3$ (ten pounds per cubic foot).

The densities 128a, 128b chosen for the compressible foam material 122 of the compressible foam element 102 depend on the type of composite charge 14 used, and the type of contoured composite structure 16, such as the highly contoured composite structure 18, or part, that is to be formed with the forming apparatus 10 and the forming process 12.

As shown in FIG. 1B, and as discussed below with respect to FIGS. 6A-6C, in another version, the constraining assembly 60 comprises a pneumatic assembly 132, and the constraining device 62 comprises an air cylinder rod 134 having a cap presser 136. The pneumatic assembly 132 comprises the air cylinder rod 134 having a first end 138a (see FIG. 6B), a second end 138b (see FIG. 6B), and a rod body 140 (see FIG. 6B) disposed between the first end 138a and the second end 138b. The air cylinder rod 134 may be in the form of a piston rod 134a (see FIG. 1B) that is movable in an up and down direction 142 (see FIG. 6B), and designed to move, and moves, back and forth from an expanded position 112b (see FIG. 1B), to one or more intermediate compressed positions 114b (see FIG. 1B), to a compressed position 116b (see FIG. 1B). The piston rod 134a may be attached to a piston head 135 (see FIGS. 1B, 6B). The air cylinder rod 134 may be comprised of a metal material, such as steel, aluminum, or another suitable metal material. The first end 138a of the air cylinder rod 134 is coupled to the cap presser 136. The cap presser 136 preferably comprises a semi-rigid cap presser 136a (see FIGS. 1B, 6B) having an engagement surface 144 (see FIG. 6B) that is configured to engage, and engages, with the portion 50, such as the first surface 51a (see FIG. 6A) of the cap portion 50a (see FIG. 6A), of the composite charge 14 (see FIG. 6A), and with the cap 52 (see FIG. 1A) formed from the cap portion 50a. The cap presser 136, such as the semi-rigid cap presser 136a, is preferably in the form of a bar made of aluminum, or made of another suitable metal material, or another suitable semi-rigid material. The cap presser 136, such as the semi-rigid cap presser 136a, in the form of an aluminum bar, may have an exemplary thickness of 0.125 inch, or another suitable thickness.

Preferably, the air cylinder rod 134 with the cap presser 136 comprise a multiple use constraining device 62b (see FIG. 1B) that may be used multiple times for multiple forming processes 12, or forming cycles. The air cylinder rod 134 with the cap presser 136 may be removably attached to the die cavity 58 in the first die 54, so that the air cylinder rod 134 with the cap presser 136 can be removed and cleaned or repaired, or removed and replaced with an air cylinder rod 134 and/or cap presser 136 that is unused or new.

The pneumatic assembly 132 further comprises an air cylinder 146 (see FIGS. 1B, 6B) coupled to the air cylinder rod 134. The air cylinder 146 comprises a first end 148a (see FIG. 6C), a second end 148b (see FIG. 6C), and a cylinder tube 150 (see FIG. 6C) disposed between the first end 148a and the second end 148b. The first end 148a of the air cylinder 146 has an opening 152 (see FIG. 6B) configured to receive, and receiving, the second end 138b and the rod body 140 of the air cylinder rod 134, when the air cylinder rod 134 is compressed, or moved, downwardly from the expanded position 112b (see FIG. 1B), to one or more intermediate compressed positions 114b (see FIG. 1B), and to the compressed position 116b (see FIG. 1B), such as a fully compressed position. The air cylinder 146, such as a pneumatic air cylinder, is a linear actuator that works with compressed air 160 (see FIG. 1B).

Figure 6D:
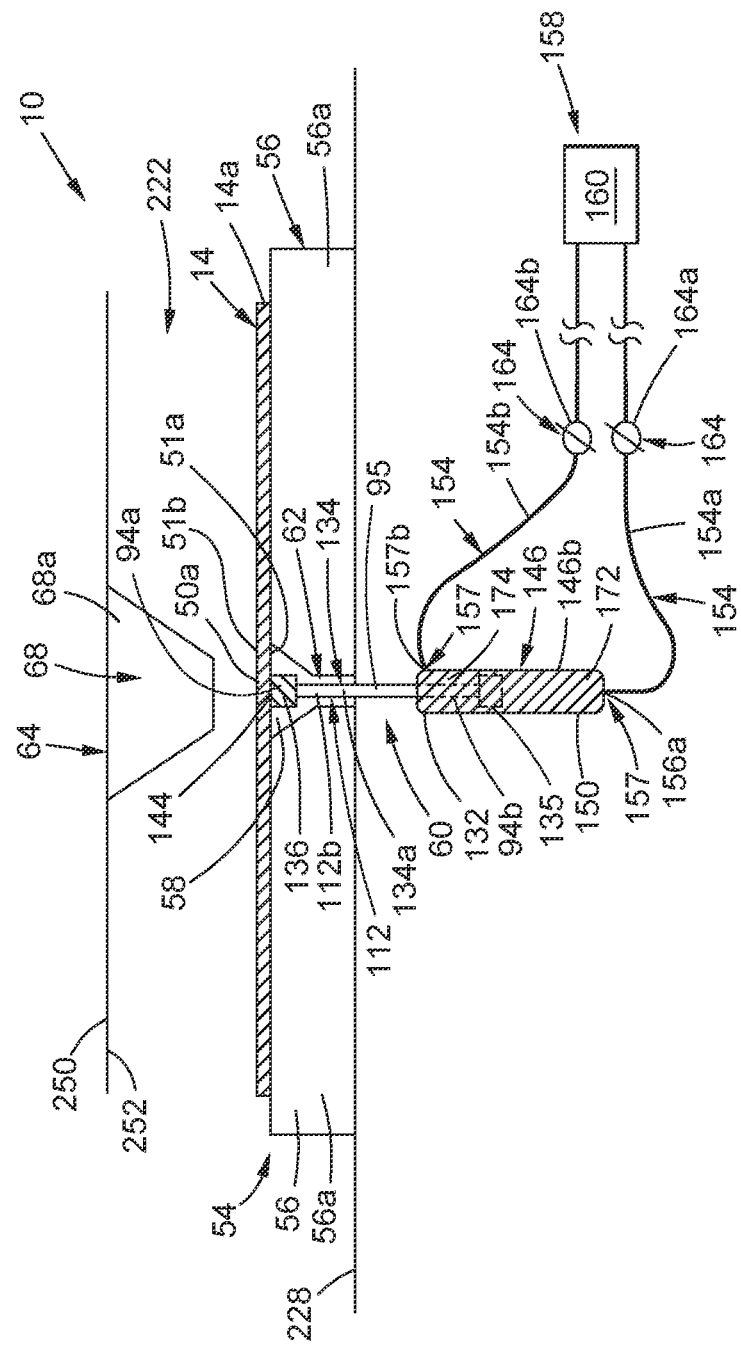
FIG. 6D is a schematic illustration of front view of an exemplary version of a forming apparatus of the disclosure with a constraining assembly in the form of another version of a pneumatic assembly.

The pneumatic assembly 132 further comprises one or more air supply lines 154 (see FIGS. 1B, 6B). Each air supply line 154 has a first end 156a (see FIG. 6B) coupled to the air cylinder 146, and has a second end 156b (see FIG. 6B). The second end 148b of the air cylinder 146 has a port 157 (see FIG. 6B), such as a first port 157a (see FIG. 6B), configured to receive, and receiving, an air supply line 154 (see FIGS. 1B, 6B), such as a first air supply line 154a (see FIG. 6B). In another version, the air cylinder 146 (see FIG. 6D) may have a second port 157b (see FIG. 6D) configured to receive, and receiving, another air supply line 154 (see FIG. 6D), such as a second air supply line 154b (see FIG. 6D). The pneumatic assembly 132 further comprises an air supply source 158 (see FIGS. 1B, 6B) coupled to the second end 156b of each of the air supply lines 154. The air supply source 158 preferably comprises compressed air 160 (see FIG. 1B), for example, stored in a tank or pump, supplied to the air cylinder 146, and applied as pneumatic air pressure 162 (see FIG. 1B) to the air cylinder 146 and applied against the air cylinder rod 134. The pneumatic assembly 132 may further comprise one or more pressure control valves 164 (see FIG. 6B) coupled to the one or more air supply lines 154, to turn the pneumatic air pressure 162 from the air supply source 158 on and off and to control the rate of pneumatic air pressure 162 applied. The pneumatic assembly 132 may further comprise gaskets, seals, or other components or parts known in the art of pneumatic cylinders.

In one version, the air cylinder 146 (see FIGS. 1B, 6B) comprises a single acting spring return air cylinder 146a (see FIGS. 1B, 6B) having one air supply line 154 (see FIGS. 1B, 6B), such as the first air supply line 154a (see FIG. 6B), connected between the air supply source 158 and the first port 157a of the single acting spring return air cylinder 146a. The single acting spring return air cylinder 146a comprises a spring 166 (see FIG. 6B), such as a fitted spring, located inside the cylinder tube 150 of the air cylinder 146 and fitted around the rod body 140 of the air cylinder rod 134, between the first end 148a (see FIG. 6B) of the interior of the air cylinder 146 and the piston head 135.

When the single acting spring return air cylinder 146a is pressurized by the compressed air 160 from the air supply source 158, and pneumatic air pressure 162 (see FIG. 1B) is applied to the single acting spring return air cylinder 146a, the air cylinder rod 134, such as the piston rod 134a, having the cap presser 136, may extend or move vertically upward from a compressed position 116b (see FIG. 1B), or a base or down position, to an expanded position 112b (see FIG. 1B), or an extended or up position, reacting the downward compressive force 90 of the second die 64, or male die 64a, or upper die 64b. During the forming of the composite charge 14 into the highly contoured composite structure 18, the constraining device 62, such as the air cylinder rod 134 (see FIG. 6A) having the cap presser 136 (see FIG. 6A), is initially in the expanded position 112 (see FIG. 6A), such as the expanded position 112b (see FIG. 6A), in, or partially in, the die cavity 58, to constrain the cap portion 50a (see FIG. 6A) against the second die 64 (see FIG. 6A). As soon as the compressed air 160 from the air supply source 158 is stopped or turned off, the air cylinder rod 134, such as the piston rod 134a, is retracted by a spring force 170 (see FIG. 1B). The single acting spring return air cylinder 146a works with the compressed air 160 to actuate the air cylinder rod 134, or piston rod 134a, in one direction, and the spring force 170 to return the air cylinder rod 134, or piston rod 134a, to the compressed position 116b, or base or down position. The cylinder tube 150 of the air cylinder 146 has one port 157, the first port 157a, that is used to both supply and vent the compressed air 160. The air cylinder rod 134, or piston rod 134a, is preferably returned to the compressed position 116b, or base or down position, by the spring 166 (see FIGS. 1B, 6B). However, in other versions, the air cylinder rod 134, or piston rod 134a, may be returned to the compressed position 116b, or base or down position, by an external means, such as gravity, weight, mechanical movement, or an external spring.

When the forming process 12, or forming cycle, is complete, the pneumatic air pressure 162 is turned off with the pressure control valve 164, and the air cylinder rod 134, such as the piston rod 134a, of the single acting spring return air cylinder 146a, moves vertically downward to the compressed position 116b, and stays in the compressed position 116b, or base or down position. Just prior to starting the forming process 12, or next forming cycle, the pneumatic air pressure 162 is turned on with the pressure control valve 164, and the air cylinder rod 134, such as the piston rod 134a, having the cap presser 136, moves vertically upward, from the compressed position 116b, or base or down position, to the expanded position 112b, or up position. With the single acting spring return air cylinder 146a, the retaining element 96 (see FIG. 1B) of the constraining assembly 60 that functions to retain or keep the air cylinder rod 134, such as the piston rod 134a, down after the forming process 12 is complete, comprises the spring return 168 and the spring force 170, as a result of a pneumatic air pressure absence 162a (see FIG. 1B), where the pneumatic air pressure 162 is turned off with the pressure control valve 164, and no pneumatic air pressure 162 is applied to the air cylinder rod 134, such as the piston rod 134a. Thus, with this retaining element 96 comprising the spring return 168 and the spring force 170, as a result of the pneumatic air pressure absence 162a, the air cylinder rod 134, such as the piston rod 134a, stays in the compressed position 116b, or base or down position, for example, when the second die 64, or male die 64a, or upper die 64b, retracts after completion of the forming process 12, or forming cycle. Further, the retaining element 96 removes the upward resistive force 92 (see FIG. 1B) applied by the constraining device 62, when the second die 64, or upper die 64b, is retracted upward.

In another version, the air cylinder 146 (see FIGS. 1B, 6D) comprises a double acting air cylinder 146b (see FIGS. 1B, 6D) having two air supply lines 154 (see FIGS. 1B, 6D), such as a first air supply line 154a (see FIG. 6D) and a second air supply line 154b (see FIG. 6D), connected between the air supply source 158 and the double acting air cylinder 146b. Each of the two air supply lines 154 has a pressure control valve 164 coupled to the air supply line 154. For example, the first air supply line 154a is connected to the double acting air cylinder 146b with a first pressure control valve 164a (see FIG. 6B) actuating the first air supply line 154a to turn the pneumatic air pressure 162 from the air supply source 158 on and off, and the second air supply line 154*b* is connected to the double acting air cylinder 146*b* with a second pressure control valve 164*b* (see FIG. 6B) actuating the second air supply line 154*b* to turn the pneumatic air pressure 162 from the air supply source 158 on and off. The first air supply line 154*a* is coupled, via a first port 157*a* (see FIG. 6D), to a lower bore 172 (see FIG. 6D) located within the cylinder tube 150 of the double acting air cylinder 146*b*. The second air supply line 154*b* is coupled, via a second port 157*b* (see FIG. 6D), to an upper bore 174 (see FIG. 6D) located within the cylinder tube 150 of the double acting air cylinder 146*b*.

With the double acting air cylinder 146*b*, the compressed air 160 is supplied, and the pneumatic air pressure 162 is applied, via the first air supply line 154*a*, to the lower bore 172 of the double acting air cylinder 146*b*, driving the air cylinder rod 134, or piston rod 134*a*, vertically upward from the compressed position 116*b*, or down or base position, to the expanded position 112*b*, or extended or up position. During the forming of the composite charge 14 into the highly contoured composite structure 18, the constraining device 62 (see FIG. 6D), such as the air cylinder rod 134 (see FIG. 6D) having the cap presser 136 (see FIG. 6D), is in the expanded position 112 (see FIG. 6D), such as the expanded position 112*b* (see FIG. 6D), in, or partially in, the die cavity 58 (see FIG. 6D), to constrain the cap portion 50*a* (see FIG. 6D) against the second die 64 (see FIG. 6D), and reacting the downward compressive force 90 of the second die 64, or male die 64*a*, or upper die 64*b*. When the forming process 12, or forming cycle, is complete, the pneumatic air pressure 162 is removed from the lower bore 172 by turning off the pneumatic air pressure 162 in the first air supply line 154*a* with the first pressure control valve 164*a*, and the pneumatic air pressure 162 is applied, such as a pneumatic air pressure application 162*b* (see FIG. 1B), to the upper bore 174 by turning on the pneumatic air pressure 162 in the second air supply line 154*b* with the second pressure control valve 164*b*. The pneumatic air pressure 162 applied to the upper bore 174 pushes down the air cylinder rod 134 and retains or holds down the air cylinder rod 134 in the compressed position 116*b*, or base or down position, within the cylinder tube 150 of the double acting air cylinder 146*b*.

With the double acting air cylinder 146*b*, the retaining element 96 (see FIG. 1B) of the constraining assembly 60 that functions to retain or keep the air cylinder rod 134, such as the piston rod 134*a*, with the cap presser 136 down after the forming process 12 is complete, comprises the pneumatic air pressure application 162*b* (see FIG. 1B) to the upper bore 174 of the double acting air cylinder 146*b*, where the pneumatic air pressure application 162*b* is applied to the upper bore 174 to push down and retain or hold the air cylinder rod 134, such as the piston rod 134*a*, with the cap presser 136 in the compressed position 116*b*, or the base or down position. Thus, with this retaining element 96 comprising the pneumatic air pressure application 162*b* to the upper bore 174 and applied to the air cylinder rod 134 to push the air cylinder rod 134 down, the air cylinder rod 134, such as the piston rod 134*a*, with the cap presser 136, can stay in the compressed position 116*b*, or base or down position, for example, when the second die 64, or male die 64*a*, or upper die 64*b*, retracts after completion of the forming process 12.

The double acting air cylinder 146*b* is one where the thrust, or output force, is developed in both extending and retracting directions. The cylinder tube 150 of the double acting air cylinder 146*b* has a first port 157*a* (see FIG. 6D) and a second port 157*b* (see FIG. 6D) at each end, that is, the first port 157*a* is located at the second end 148*b* (see FIG. 6D) and the second port 157*b* is located at the first end 148*a* (see FIG. 6D). The air cylinder rod 134, such as the piston rod 134*a*, is moved vertically up and down by alternating the port 157, either the first port 157*a* or the second port 157*b*, that receives the compressed air 160 applied at a high pressure. The pneumatic air pressure 162 is applied alternately to the opposite ends, such as the first end 138*a* and the second end 138*b*, of the air cylinder rod 134. The pneumatic air pressure application 162*b* of compressed air 160 produces a thrust in the positive (push) stroke, and thrust in the negative (pull) stroke.

Figure 6E:
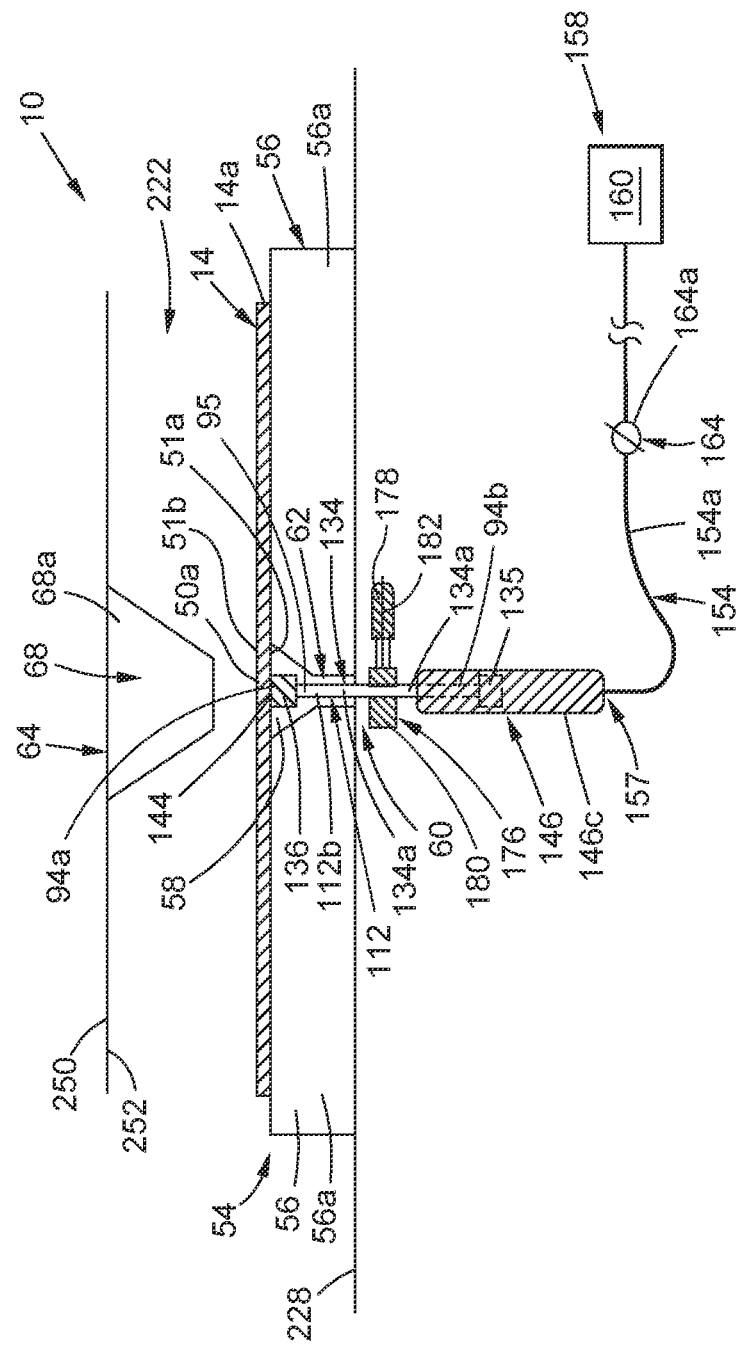
FIG. 6E is a schematic illustration of front view of an exemplary version of a forming apparatus of the disclosure with a constraining assembly in the form of yet another version of a pneumatic assembly.

In yet another version, the air cylinder 146 (see FIGS. 1B, 6E) comprises a rod lock air cylinder 146*c* (see FIGS. 1B, 6E). The rod lock air cylinder 146*c* comprises an actuated rod locking device 176 (see FIGS. 1B, 6E) located within the cylinder tube 150 of the air cylinder 146, or exterior to the first end 148*a* of the air cylinder 146. The actuated rod locking device 176 is configured to couple to the air cylinder rod 134 to lock or retain the air cylinder rod 134 in the compressed position 116*b*.

The actuated rod locking device 176 comprises an actuator 178 (see FIGS. 1B, 6E) that is configured to actuate, and actuates, a rod lock 180 (see FIGS. 1B, 6E) to couple to, and lock around, or firmly press against, one or more portions of the air cylinder rod 134, to lock or retain the air cylinder rod 134 in the compressed position 116*b*. The actuator 178 is actuated with an actuating force mechanism 182 (see FIG. 1B), such as springs, compressed air pressure, or another suitable actuating force mechanism. The rod lock 180 may comprise clamps, spring pins, levers, or other suitable locking elements, which are released by the actuator 178, to lock or retain the air cylinder rod 134 in the compressed position 116*b*. In one version, the actuated rod locking device 176 may be in the form of a cartridge assembly that is positioned transversely to the air cylinder rod 134, such as the piston rod 134*a*, and the actuated rod locking device 176 preferably provides for automated locking and unlocking of the air cylinder rod 134, such as the piston rod 134*a*. When it is desired that the air cylinder rod 134, such as the piston rod 134*a*, be unlocked so that it can move to the expanded position 112*b*, the actuated rod locking device 176 is unlocked to release the rod lock 180 from retaining the air cylinder rod 134, such as the piston rod 134*a*.

With the rod lock air cylinder 146*c*, during the forming of the composite charge 14 into the highly contoured composite structure 18, the constraining device 62 (see FIG. 6E), such as the air cylinder rod 134 (see FIG. 6E) having the cap presser 136 (see FIG. 6E), is in the expanded position 112 (see FIG. 6E), such as the expanded position 112*b* (see FIG. 6E), in, or partially in, the die cavity 58 (see FIG. 6E), to constrain the cap portion 50*a* (see FIG. 6E) against the second die 64 (see FIG. 6E), and reacting the downward compressive force 90 of the second die 64, or male die 64*a*, or upper die 64*b*. With the rod lock air cylinder 146*c*, the retaining element 96 (see FIG. 1B) of the constraining assembly 60 that functions to retain or keep the air cylinder rod 134, such as the piston rod 134*a*, having the cap presser 136, in the compressed position 116*b* (see FIG. 1B), or down position, after the forming process 12 is complete, comprises the actuated rod locking device 176. Thus, with this retaining element 96 comprising the actuated rod locking device 176, the air cylinder rod 134, such as the piston rod 134*a*, having the cap presser 136 stays in the compressed position 116*b*, or down position, for example, when the second die 64, or male die 64*a*, or upper die 64*b*, retracts away from the first die 54 after completion of the forming process 12.

As shown in FIG. 1B, and as discussed below with respect to FIGS. 7A-7C, in another version, the constraining assembly 60 comprises a spring assembly 184, and the constraining device 62 comprises a spring-loaded plate 186. The spring assembly 184 comprises the spring-loaded plate 186 coupled to an actuated locking device 188 (see FIGS. 1B, 7B). The spring-loaded plate 186 comprises a spring element 190 (see FIGS. 1B, 7B), such as a fitted spring, coupled around a rod 192 (see FIGS. 1B, 7B), such as a stabilizing rod 192a (see FIGS. 1B, 7B), and the rod 192, such as the stabilizing rod 192, is attached to a cap presser 194 (see FIGS. 1B, 7B).

The rod 192 (see FIGS. 7B-7C), such as the stabilizing rod 192 (see FIGS. 7B-7C), has a first end 196a (see FIG. 7C), a second end 196b (see FIG. 7C), and a rod body 198 (see FIG. 7C) disposed between the first end 196a and the second end 196b. The rod 192, such as the stabilizing rod 192, is compressible and vertically movable up and down through an opening 200 (see FIG. 7B) in the flexible die tray 228 (see FIG. 7B) of the first die 54, and through an opening 202 (see FIG. 7B) in the actuated locking device 188. The rod 192, such as the stabilizing rod 192, may be comprised of a metal material, such as aluminum, steel, or another suitable metal material. The first end 196a of the rod 192, such as the stabilizing rod 192, is coupled to the cap presser 194, which may also be referred to as a plate in this version. The cap presser 194 preferably comprises a semi-rigid cap presser 194a (see FIG. 7B) having an engagement surface 204 (see FIGS. 7A-7C) that is configured to engage, and engages, with the first surface 51a (see FIG. 7A) of the cap portion 50a (see FIG. 7A), of the composite charge 14, and with the cap 52 formed from the cap portion 50a. The cap presser 194, such as the semi-rigid cap presser 194a, is preferably in the form of a bar made of aluminum, or made of another suitable metal material, or another suitable semi-rigid material. The cap presser 194, such as the semi-rigid cap presser 194a, in the form of an aluminum bar, may have an exemplary thickness of 0.125 inch, or another suitable thickness. The spring element 190, such as the fitted spring, is preferably made of a metal material such as steel, including spring steel, stainless steel, or another suitable metal material. The spring element 190 has a first end 206a (see FIG. 7B) coupled to the cap presser 194, a second end 206b (see FIG. 7B) coupled to the actuated locking device 188, and a coil body 208 (see FIG. 7B) formed between the first end 206a and the second end 206b.

The rod 192, such as the stabilizing rod 192, is inserted through an interior through opening 210 (see FIG. 7B) of the coil body 208 of the spring element 190, and the coil body 208 of the spring element 190 is fitted around a portion of the rod body 198 (see FIG. 7B) of the rod 192, such as the stabilizing rod 192a. The spring element 190 pushes up the rod 192, such as the stabilizing rod 192a, having the cap presser 194, to apply the upward resistive force 92 (see FIG. 1B) against the cap portion 50a of the composite charge 14 and against the downward compressive force 90 (see FIG. 1A) applied by the second die 64. The spring-loaded plate 186 constrains the cap portion 50a of the composite charge 14 in place prior to, and during, the forming process 12, and constrains the cap 52 of the formed contoured composite structure 16, such as the highly contoured composite structure 18. The constraining device 62, such as the spring-loaded plate 186, provides mechanical force against the cap portion 50a, and the cap 52, during the forming process 12, or forming cycle.

The actuated locking device 188 (see FIG. 7B) is preferably positioned transversely to the rod 192, such as the stabilizing rod 192a, and located below the first die 54 and below the die cavity 58, exterior and surrounding the rod 192, such as the stabilizing rod 192a, near the second end 196b (see FIG. 7B). The actuated locking device 188 is configured to couple to the rod 192, such as the stabilizing rod 192a, to lock or retain the rod 192, such as the stabilizing rod 192a, in the compressed position 116c (see FIG. 1B).

The actuated locking device 188 comprises an actuator 212 (see FIGS. 1B, 7B) that is configured to actuate, and actuates, a rod lock 214 (see FIGS. 1B, 7B) to couple to, and lock around, or firmly press against, one or more portions of the rod body 198 of the rod 192, such as the stabilizing rod 192a, to lock or retain the rod 192, such as the stabilizing rod 192a, in the compressed position 116c. The actuator 212 is actuated with an actuating force mechanism 216 (see FIG. 1B), such as springs, compressed air pressure, or another suitable actuating force mechanism. The rod lock 214 may comprise clamps, spring pins, levers, or other suitable locking elements, which are released by the actuator 212, to lock or retain the rod 192, such as the stabilizing rod 192a, in the compressed position 116c. In one version, the actuated locking device 188 may be in the form of a cartridge assembly that is positioned transversely to the rod 192, such as the stabilizing rod 192a, and the actuated locking device 188 preferably provides for automated locking and unlocking of the rod 192, such as the stabilizing rod 192a. When it is desired that the rod 192, such as the stabilizing rod 192a, be unlocked so that it can move to the expanded position 112c (see FIG. 1B), the actuated locking device 188 is unlocked to release the rod lock 214 from retaining the rod 192, such as the stabilizing rod 192a.

With this spring assembly 184 version, during the forming of the composite charge 14 into the highly contoured composite structure 18, the constraining device 62 (see FIG. 7A), such as the spring-loaded plate 186 (see FIG. 7A), is in the expanded position 112 (see FIG. 7A), such as the expanded position 112c (see FIG. 7A), in the die cavity 58 (see FIG. 7A), to constrain the cap portion 50a (see FIG. 7A) against the second die 64 (see FIG. 7A), and reacting the downward compressive force 90 of the second die 64, or male die 64a, or upper die 64b. With this spring assembly 184 version, the retaining element 96 (see FIG. 1B) of the constraining assembly 60 that functions to retain or keep the rod 192, such as the stabilizing rod 192a, having the cap presser 194, in the compressed position 116c (see FIG. 1B), or down position, after the forming process 12 is complete, comprises the actuated locking device 188. Thus, with this retaining element 96 comprising the actuated locking device 188, the rod 192, such as the stabilizing rod 192a, having the cap presser 194 stays in the compressed position 116c, or down position, for example, when the second die 64, or male die 64a, or upper die 64b, retracts away from the first die 54 after completion of the forming process 12.

Figure 2A:
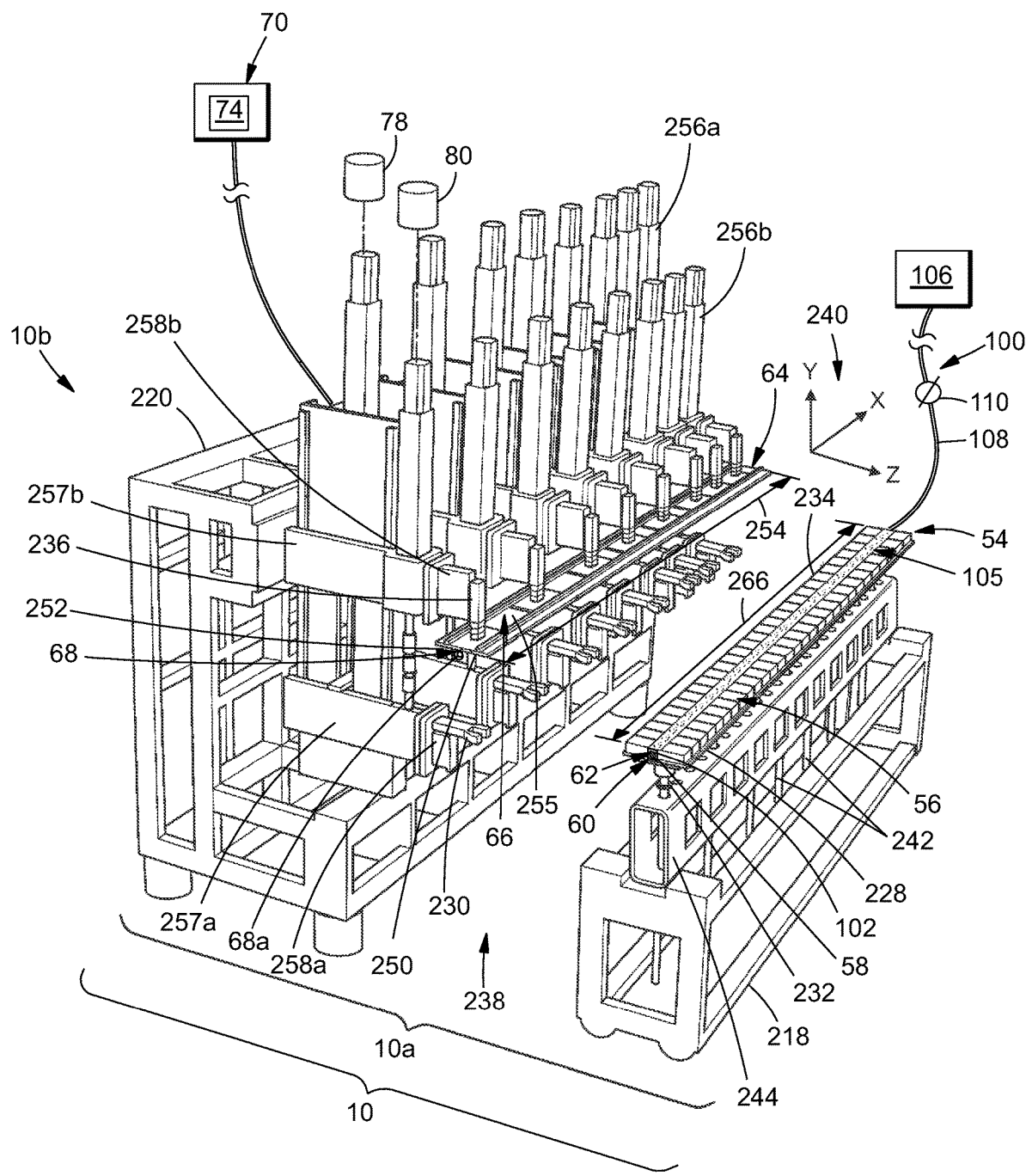
FIG. 2A is an illustration of a front perspective view of an exemplary version of a forming apparatus of the disclosure showing a constraining assembly in a first die, and showing a portable carrier portion uncoupled from a forming machine portion.
Figure 2B:
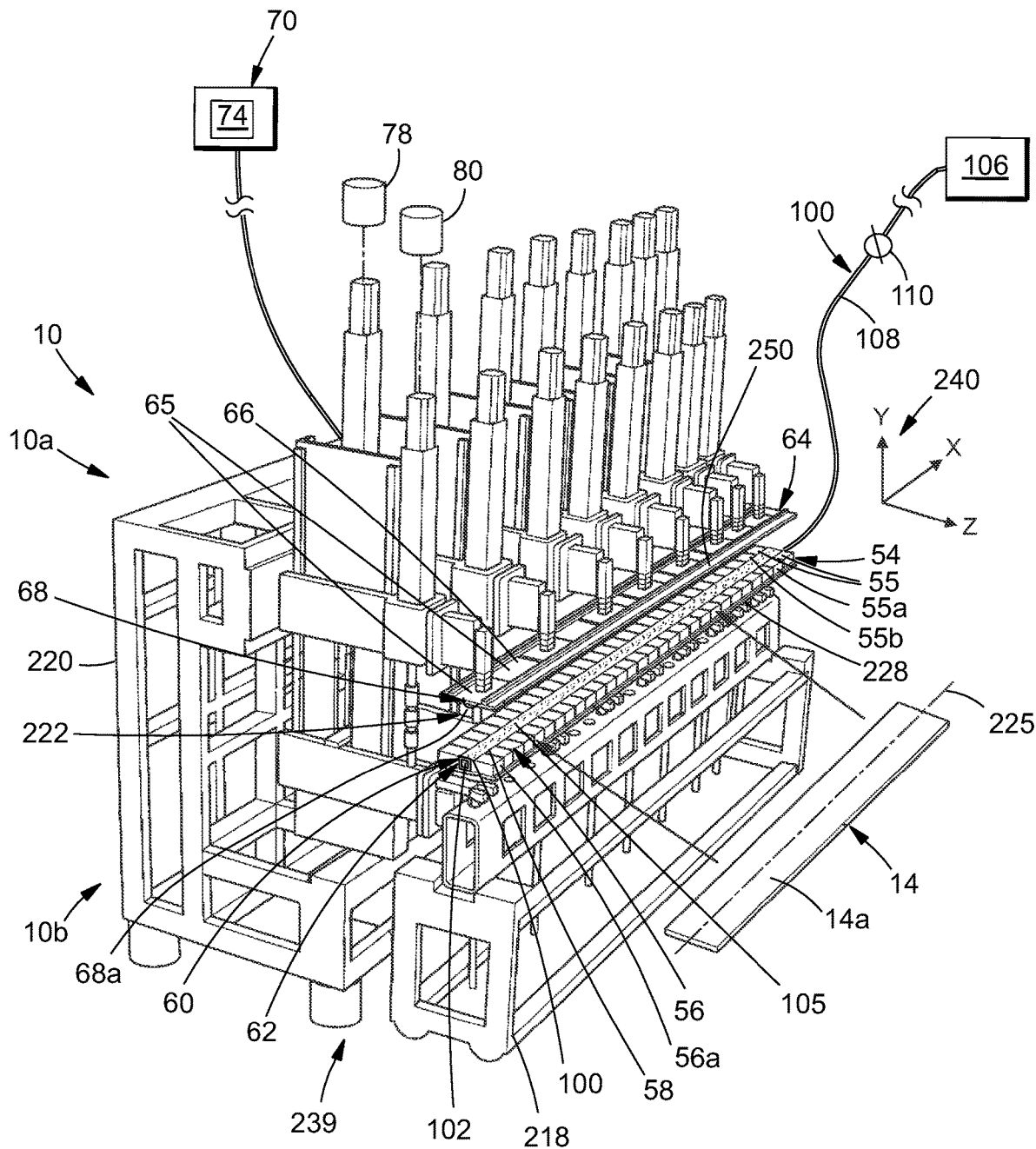
FIG. 2B is an illustration of a front perspective view of the forming apparatus of FIG. 2A showing the portable carrier portion coupled to the forming machine portion and showing the first die and a second die in an open position, ready to receive a composite charge.

Now referring to FIGS. 2A-2B, FIG. 2A is an illustration of a front perspective view of an exemplary version of a forming apparatus 10, such as in the form of a high contour stringer former apparatus 10a, of the disclosure showing a constraining assembly 60, such as in the form of a foam and vacuum assembly 100, in a first die 54, and showing a portable carrier portion 218 uncoupled from a forming machine portion 220. FIG. 2B is an illustration of a front perspective view of the forming apparatus 10, such as in the form of a high contour stringer former apparatus 10a, of FIG. 2A, showing the portable carrier portion 218 coupled to the forming machine portion 220, and showing the first die 54 and a second die 64 in an open position 222 (see also FIG. 10A), ready to receive a composite charge 14, such as a flat composite charge 14a. During the forming process 12, when the first die 54 and the second die 64 are in contact with each other, they are in a closed position 224 (see FIG. 11A). Preferably, the forming apparatus 10, such as in the form of a high contour stringer former apparatus 10a, is an automated forming apparatus 10b (see FIGS. 2A-2B). As shown in FIG. 2B, the composite charge 14 has a center axis 225.

As shown in FIGS. 2A-2B, the constraining assembly 60, such as in the form of the foam and vacuum assembly 100, is positioned in the first die 54, and the constraining device 62, such as in the form of the compressible foam element 102, is positioned in the die cavity 58 of the first die 54, between the first half 55a (see FIG. 2B) and the second half 55b (see FIG. 2B) of the pairs 55 (see FIG. 2B) of the first die portions 56, such as the die blocks 56a (see FIG. 2B). As further shown in FIG. 2A, the constraining device 62, such as in the form of the compressible foam element 102, is disposed in the die cavity 58 along a length 226 of the first die 54. The constraining device 62, such as in the form of the compressible foam element 102, is covered, or surrounded with, a vacuum bag 105 (see FIGS. 2A-2B). As shown in FIGS. 2A-2B, the foam and vacuum assembly 100 further comprises a vacuum source 106 coupled to the vacuum bag 105, via a vacuum line 108, and shows a control valve 110 on the vacuum line 108.

As shown in FIGS. 2A-2B, the first die 54 is supported on a flexible die tray 228 mounted on the portable carrier portion 218 that is releasably coupled to a plurality of first anvils 230 (see FIG. 2A) by means of a releasable coupling 232 (see FIG. 2A). The first die 54 comprises the first die portions 56 (see FIGS. 2A-2B) that are individually displaceable relative to each other and form a changeable die contour 234 (see FIG. 2A). The first die portions 56 are mounted on the flexible die tray 228, which is formed of any suitable flexible material, such as thin aluminum, or a synthetic or plastic material. The first die portions 56, such as in the form of die blocks 56a (see FIG. 2B), are preferably aligned in a side-by-side relationship along the length 226 (see FIG. 2A) of the first die 54 and along the length of the flexible die tray 228, and may be interconnected by connectors (not shown). The first die portions 56, such as in the form of die blocks 56a, may comprise any suitable, relatively rigid material, such as a metal, including steel or stainless steel, a ceramic, or another suitable relatively rigid material. The first die portions 56, such as in the form of die blocks 56a, generally have a rectangular cross-sectional profile. However, the first die portions 56, such as in the form of die blocks 56a, may have other suitable cross-sectional profile shapes.

The plurality of contour control actuators 78 (see FIGS. 2A-2B) control the displacement of the plurality of first anvils 230 (see FIG. 2A), and control the independent displacement of the first die portions 56 of the first die 54 along its length 226 (see FIG. 2A). The plurality of shape forming actuators 80 (see FIGS. 2A-2B) control displacement of a plurality of second anvils 236 (see FIG. 2A), and independently control the displacement of second die portions 66 (see FIGS. 2A-2B) of the second die 64, such as pairs 65 (see FIG. 2B) of the second die portions 66. The plurality of contour control actuators 78 and the plurality of shape forming actuators 80 are controlled by the controller 74 (see FIGS. 1A, 2A-2B) of the control system 70 (see FIGS. 1A, 2A-2B) which, as discussed above, uses operator input controls 84 (see FIG. 1A), a control program 82 (see FIG. 1A), such as an algorithm or a software program, and contour data 85 (see FIG. 1A) of the contoured composite structure 16, such as the highly contoured composite structure 18, to be formed, to control the operation of the plurality of contour control actuators 78 and the plurality of shape forming actuators 80. Through the operation of the controller 74, the first die portions 56 may be individually displaced to collectively form the changeable die contour 234 (FIGS. 1A, 2A) corresponding to the contoured composite structure 16, such as the highly contoured composite structure 18, to be formed. In addition, through operation of the controller 74, the second die portions 66 are individually displaced sequentially to form the composite charge 14 (see FIG. 2B), such as the flat composite charge 14a (see FIG. 2B), against the first die 54 in a manner that applies downward compressive force 90 (see FIGS. 1A, 8) against the composite charge 14, such as the flat composite charge 14a, throughout the forming process 12, when the second die 64 is closed against the first die 54. The constraining device 62 applies upward resistive force 92 (see FIGS. 1A, 8) against the downward compressive force 90, to prevent or eliminate wrinkles in the cap 52 of the contoured composite structure 16, such as the highly contoured composite structure 18, that is formed. FIG. 2A shows the portable carrier portion 218 uncoupled from the forming machine portion 220 in an uncoupled position 238. FIG. 2B shows the portable carrier portion 218 coupled to the forming machine portion 220 in a coupled position 239. As further shown in FIGS. 2A-2B, the forming apparatus 10, such as the high contour stringer former apparatus 10a, may employ an orthogonal x, y, z coordinate system 240 in which the x-axis corresponds to the longitudinal direction of the composite charge 14, and the formed contour extends along a y-axis.

As shown in FIG. 2A, the flexible die tray 228 of the first die 54 is supported on a plurality of spaced apart push rods 242 that are each mounted for vertical displacement on a beam 244. After the forming process 12 is complete, the portable carrier portion 218 may be used to transport the first die 54 supporting the contoured composite structure 16, such as the highly contoured composite structure 18, that is formed, to either a secondary holding tool 246 (see FIGS. 1A, 18A), for example, a cure tooling, or placed upon a substrate 248 (see FIG. 1A), for example, an uncured skin. The contoured composite structure 16, such as the highly contoured composite structure 18, may also be transported or transferred with another suitable apparatus, to another suitable device or structure for additional processing or assembly.

As shown in FIGS. 2A-2B, the second die 64 comprises a tapered portion 68, or punch 68a, mounted on a flexible backing plate 250. The tapered portion 68, or punch 68a, is preferably mounted on a bottom portion 252 (see FIGS. 2A, 5A) of the flexible backing plate 250, and projects downwardly from the bottom portion 252 of the flexible backing plate 250. The tapered portion 68, or punch 68a, preferably extends along a length 254 (see FIG. 2A) of the flexible backing plate 250. The tapered portion 68, or punch 68a, may be formed of any suitable rigid material, such as a metal, including steel and stainless steel, or another suitable metal, a ceramic, a composite, or another suitably rigid material. The flexible backing plate 250 may comprise, for example and without limitation, relatively thin aluminum or other similar metals or flexible synthetic materials. The flexible backing plate 250 is mounted on the plurality of second anvils 236 (see FIG. 2A) for sliding movement along the x-axis by the second die portions 66, which may be in the form of a series of slide plates 255 (see FIG. 2A). FIG. 2A further shows first vertical supports 256a displaceable along the y-axis by the contour control actuators 78, and shows second vertical supports 256b displaceable along the y-axis by the shape forming actuators 80. FIG. 2A further shows the plurality of first anvils 230 secured to first slide arms 257a with first brackets 258a, and shows the plurality of second anvils 236 secured to second slide arms 257b with second brackets 258b.

Figure 3:
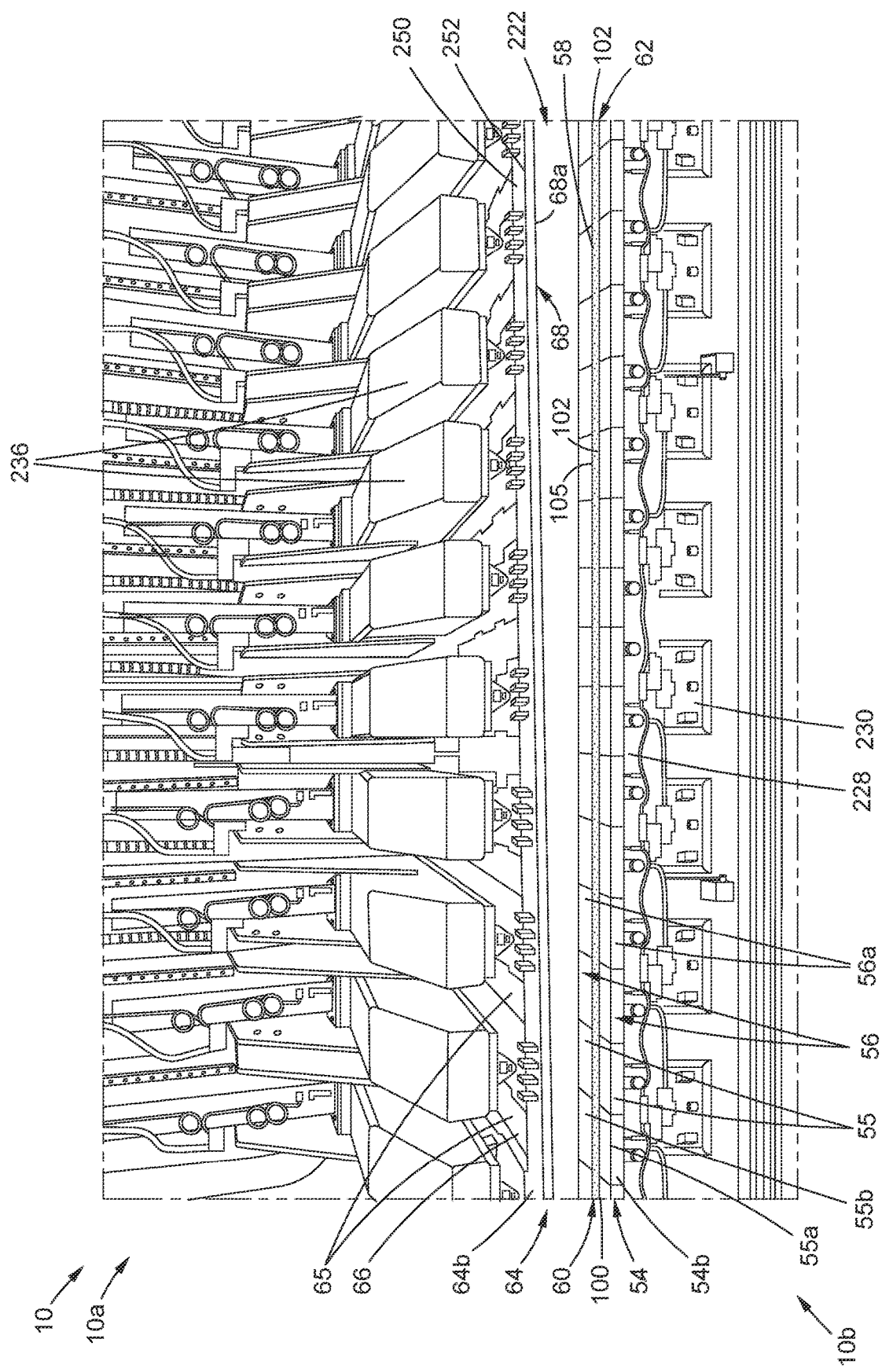
FIG. 3 is an illustration of an enlarged right side perspective view of an exemplary version of a forming apparatus of the disclosure showing a first die and a second die in an open position with a constraining device positioned in the die cavity of the first die.

Now referring to FIG. 3, FIG. 3 is an illustration of an enlarged right side perspective view of an exemplary version of the forming apparatus 10, such as the high contour stringer former apparatus 10a, of the disclosure, showing the first die 54 and the second die 64 in the open position 222, with the constraining assembly 60 comprising the foam and vacuum assembly 100, and the constraining device 62 comprising the compressible foam element 102 positioned in the die cavity 58 of the first die 54, prior to positioning the composite charge 14 (see FIG. 2B), such as a flat composite charge 14a (see FIG. 2B), on the first die 54, and between the first die 54 and the second die 64. Preferably, the forming apparatus 10, such as in the form of a high contour stringer former apparatus 10a, is an automated forming apparatus 10b (see FIG. 3).

FIG. 3 shows the first die 54, or lower die 54b, with the pairs 55 of the first die portions 56, such as in the form of die blocks 56a, on the flexible die tray 228. The flexible die tray 228 is coupled to the plurality of first anvils 230. As shown in FIG. 3, the constraining device 62 comprising the compressible foam element 102 is positioned in the die cavity 58 between the first half 55a and the second half 55b of the pairs 55 of the first die portions 56, such as the die blocks 56a. The constraining device 62 comprising the compressible foam element 102 is disposed in the die cavity 58 along the length 226 (see FIG. 2A) of the first die 54. The constraining device 62 comprising the compressible foam element 102 is covered or surrounded with the vacuum bag 105. The vacuum bag 105 of the foam and vacuum assembly 100 is coupled, or connected, to the vacuum source 106 (see FIGS. 2A-2B), via a vacuum line 108 (see FIGS. 2A-2B).

FIG. 3 further shows the second die 64, or upper die 64b, with the pairs 65 of the second die portions 66 positioned above the first die 54, or lower die 54b. The second die 64 includes the tapered portion 68, or punch 68a, projecting from the bottom portion 252 of the flexible backing plate 250. FIG. 3 further shows the flexible backing plate 250 mounted on the plurality of second anvils 236.

Figure 4:
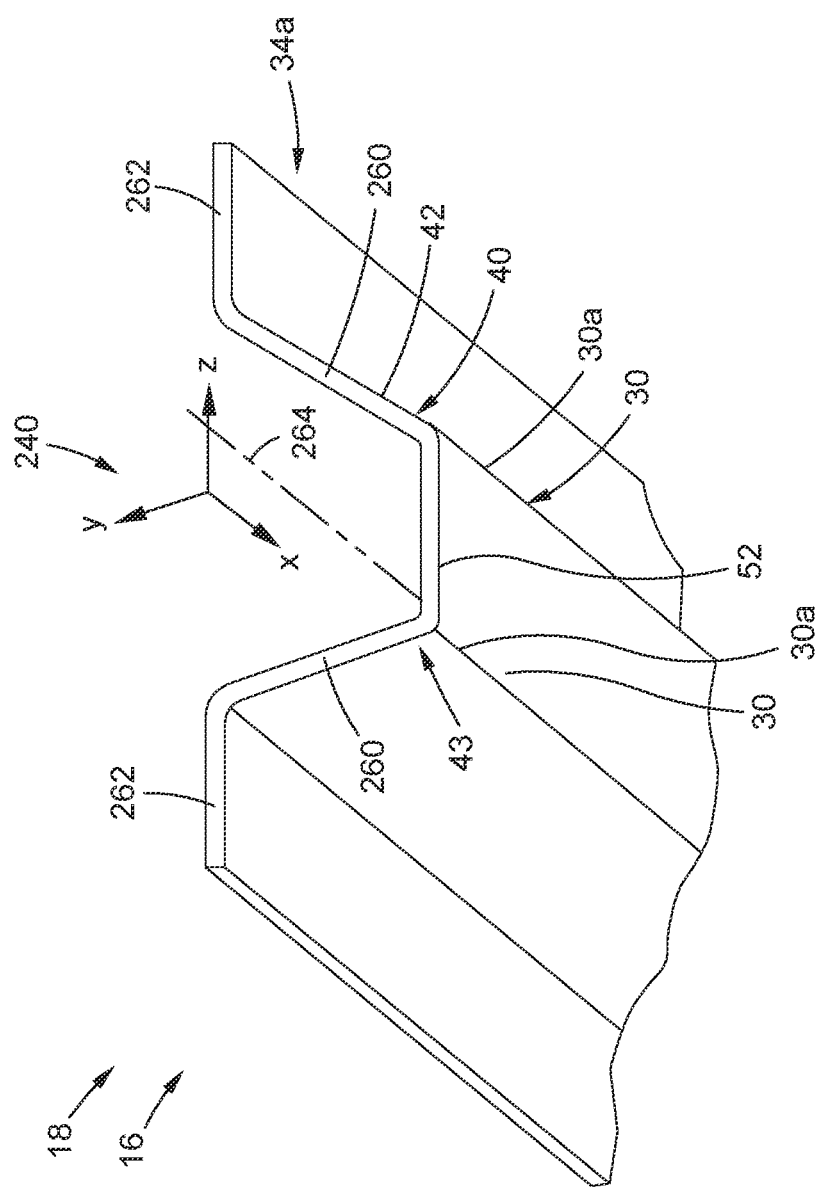
FIG. 4 is an illustration of a perspective front view of a hat-shaped stringer that may be formed by exemplary versions of the forming apparatus of FIGS. 1A and 2A-2B.

Now referring to FIG. 4, FIG. 4 is an illustration of a perspective front view of a contoured composite structure 16, such as a highly contoured composite structure 18, for example, a hat-shaped stringer 34a, that may be formed by exemplary versions of the forming apparatus 10, such as the high contour stringer former apparatus 10a, of FIGS. 1A, 2A-2B, and 3. The hat-shaped stringer 34a may be used, for example and without limitation, in the aircraft industry to stiffen or support a variety of structures, such as a fuselage 402 (see FIG. 19), wings 406 (see FIG. 19), vertical stabilizers 412 (see FIG. 19), horizontal stabilizers 414 (see FIG. 19), or other aircraft structures. FIG. 3 shows the hat-shaped stringer 34a with a cross-sectional profile 40 having a hat shape 42. The hat-shaped stringer 34a may also have another suitable cross-sectional profile, such as a square, a rounded cap, or another geometric or angled shape.

As shown in FIG. 4, the contoured hat section 43 includes the cap 52 and sides 260, also referred to as webs, and may additionally include flanges 262, such as outwardly extending flanges. The cap 52 of the hat-shaped stringer 34a, shown in FIG. 4, and formed with the forming apparatus 10, such as the high contour stringer former apparatus 10a, and the forming process 12, disclosed herein, is wrinkle-free 46, that is, free of wrinkles or fiber distortions. As shown in FIG. 4, the hat-shaped stringer 34a has contours 30, such as complex contours 30a, or out-of-plane contours or curvatures, along its longitudinal axis 264, or length. FIG. 4 further shows the orthogonal x, y, z coordinate system 240. The cap 52 of the hat-shaped stringer 34a preferably has a contour radius 98 (see FIG. 1A) in a range of 500 (five hundred) inches to 1000 (one thousand) inches, and more preferably, has a contour radius 98 in a range of 500 (five hundred) inches to 750 (seven hundred fifty) inches.

Now referring to FIGS. 5A-5C, FIG. 5A is a schematic illustration of front view of an exemplary version of the forming apparatus 10 of the disclosure with the constraining assembly 60 in the form of the foam and vacuum assembly 100, where the constraining device 62 comprises the compressible foam element 102. FIG. 5B is a schematic illustration of an enlarged front view of the constraining assembly 60 comprising the foam and vacuum assembly 100 of FIG. 5A. FIG. 5C is a schematic illustration of an enlarged side view of the constraining assembly 60 comprising the foam and vacuum assembly 100 of FIG. 5B.

As shown in FIGS. 5A-5C, and as discussed above, the foam and vacuum assembly 100 comprises the compressible foam element 102, comprises the vacuum bag 105 surrounding the compressible foam element 102, comprises the vacuum source 106 coupled to the vacuum bag 105, via the vacuum line 108, or vacuum hose, and comprises the control valve 110 coupled to the vacuum line 108. As shown in FIG. 5B, the first end 109a of the vacuum line 108 is coupled to the vacuum bag 105, and the second end 109b of the vacuum line 108 is coupled to the vacuum source 106.

As shown in FIG. 5A, the constraining device 62, such as the compressible foam element 102, is in the expanded position 112, such as the expanded position 112a, within the die cavity 58 of the first die 54 and is surrounded by the vacuum bag 105. The compressible foam element 102 is positioned between the first die portions 56 (see FIG. 5A), such as die blocks 56a (see FIG. 5A). The first die portions 56 are mounted on the flexible die tray 228 (see FIG. 5A). The first end 103a (see FIG. 5A) of the compressible foam element 102 is constrained against the first surface 51a of the cap portion 50a of the composite charge 14, such as the flat composite charge 14a, via the vacuum bag 105, and the second end 103b (see FIG. 5B) of the compressible foam element 102 is positioned near a floor 59 of the die cavity 58, via the vacuum bag 105. FIG. 5B shows the body 104 of the compressible foam element 102. As further shown in FIG. 5A, the tapered portion 68, such as the punch 68a, of the second die 64, is coupled to the bottom portion 252 of the flexible backing plate 250, and is positioned over the second surface 51b of the cap portion 50a of the composite charge 14. The first die 54 and the second die 64 are in the open position 222 (see FIG. 5A).

FIGS. 5B-5C show the compressible foam element 102 comprising the compressible foam material 122. As further shown in FIGS. 5B-5C, the vacuum bag 105 surrounds the compressible foam element 102, and a gap 266 is shown between an exterior 268 of the compressible foam element 102 and an interior 270 of the vacuum bag 105, when there is no vacuum pressure 118 (see FIG. 1B) applied to the compressible foam element 102 in the vacuum bag 105. FIG. 5B further shows the first end 94a, the second end 94b, and the body 95, of the constraining device 62 comprising the compressible foam element 102.

Now referring to FIGS. 6A-6E, FIG. 6A is a schematic illustration of a front view of an exemplary version of the forming apparatus 10 of the disclosure with the constraining assembly 60 in the form of one version of the pneumatic assembly 132 having the air cylinder 146 comprising the single acting spring return air cylinder 146*a*, where the constraining device 62 comprises the air cylinder rod 134 with the cap presser 136. FIG. 6B is a schematic illustration of an enlarged front view of the constraining assembly 60 comprising the pneumatic assembly 132 of FIG. 6A. FIG. 6C is a schematic illustration of an enlarged side view of the constraining assembly 60 comprising the pneumatic assembly 132 of FIG. 6B. FIG. 6D is a schematic illustration of front view of an exemplary version of the forming apparatus 10 of the disclosure with the constraining assembly 60 in the form of another version of the pneumatic assembly 132 having the air cylinder 146 comprising the double acting air cylinder 146*b*, where the constraining device 62 comprises the air cylinder rod 134 with the cap presser 136. FIG. 6E is a schematic illustration of front view of an exemplary version of the forming apparatus 10 of the disclosure with the constraining assembly 60 in the form of yet another version of the pneumatic assembly 132 having the air cylinder 146 comprising the rod lock air cylinder 146*c*, where the constraining device 62 comprises the air cylinder rod 134 with the cap presser 136.

As shown in FIGS. 6A-6E, and as discussed above, the constraining assembly 60, in the form of the pneumatic assembly 132, comprises the constraining device 62 comprising the air cylinder rod 134 with the cap presser 136, comprises the air cylinder 146 coupled to the air cylinder rod 134, and comprises the air supply source 158 coupled to the air cylinder 146, via one or more air supply lines 154 and one or more ports 157.

As shown in FIGS. 6A, 6D, and 6E, the constraining device 62, such as the air cylinder rod 134 with the cap presser 136, is in the expanded position 112, such as the expanded position 112*b*, within, or partially within, the die cavity 58 of the first die 54. The air cylinder rod 134 with the cap presser 136 is positioned between the first die portions 56 (see FIGS. 6A, 6D, 6E), such as die blocks 56*a* (see FIGS. 6A, 6D, 6E). The first die portions 56 are mounted on the flexible die tray 228 (see FIGS. 6A, 6D, 6E). The engagement surface 144 (see also FIGS. 6A-6E) of the cap presser 136 (see FIGS. 6A-7E) engages with, and is constrained against, the first surface 51*a* (see FIGS. 6A, 6D, 6E) of the cap portion 50*a* (see FIGS. 6A, 6D, 6E), of the composite charge 14 (see FIGS. 6A, 6D, 6E), such as the flat composite charge 14*a* (see FIGS. 6A, 6D, 6E). As further shown in FIGS. 6A, 6D, 6E, the tapered portion 68, such as the punch 68*a*, of the second die 64, is coupled to the bottom portion 252 of the flexible backing plate 250, and is positioned over the second surface 51*b* of the cap portion 50*a* of the composite charge 14. The first die 54 and the second die 64 are in the open position 222 (see FIGS. 6A, 6D, 6E). FIG. 6B shows the first end 94*a*, the second end 94*b*, and the body 95, of the constraining device 62 comprising the air cylinder rod 134 with the cap presser 136.

FIGS. 6B-6C show the air cylinder rod 134, such as the piston rod 134*a*, that is movable in an up and down direction 142 (see FIG. 6B). As shown in FIG. 6B, the air cylinder rod 134 has the first end 138*a* coupled to the cap presser 136, such as the semi-rigid cap presser 136*a*, has the second end 138*b* coupled to the piston head 135 within the air cylinder 146, and has the rod body 140. As shown in FIG. 6C, the air cylinder 146 comprises the first end 148*a*, the second end 148*b*, and the cylinder tube 150 disposed between the first end 148*a* and the second end 148*b*. The first end 148*a* of the air cylinder 146 has an opening 152 (see FIGS. 6B-6C) configured to receive, and receiving, the second end 138*b* and the rod body 140 of the air cylinder rod 134, when the air cylinder rod 134 is compressed, or moved, downward from the expanded position 112*b* (see FIGS. 1B, 6A), to one or more intermediate compressed positions 114*b* (see FIG. 1B), and to the compressed position 116*b* (see FIG. 1B), such as a fully compressed position.

As shown in FIGS. 6A-6E, the pneumatic assembly 132 further comprises the air supply line 154, such as a first air supply line 154*a* (see FIG. 6B). As shown in FIG. 6B, the air supply line 154 has the first end 156*a* coupled to the air cylinder 146, via the port 157, such as the first port 157*a*, and has the second end 156*b* coupled to the air supply source 158 comprising compressed air 160. As shown in FIGS. 1B and 6B, the pneumatic assembly 132 further comprises a pressure control valve 164 coupled to the air supply lines 154 to turn the pneumatic air pressure 162 (see FIG. 1B) from the air supply source 158 on and off.

In one version, as shown in FIGS. 6A-6C, the air cylinder 146 comprises the single acting spring return air cylinder 146*a* having one air supply line 154, such as the first air supply line 154*a*, connected between the air supply source 158 and the first port 157*a* of the single acting spring return air cylinder 146*a*. As shown in FIG. 6B, the single acting spring return air cylinder 146*a* comprises a spring 166, such as a fitted spring, located inside the cylinder tube 150 of the air cylinder 146 and fitted around the rod body 140 of the air cylinder rod 134, between the first end 148*a* (see FIG. 6C) of the interior of the air cylinder 146 and the piston head 135. A description of how the single acting spring return air cylinder 146*a* works is discussed in detail above. With the single acting spring return air cylinder 146*a*, the retaining element 96 (see FIG. 1B) of the constraining assembly 60 that functions to retain or keep the air cylinder rod 134, such as the piston rod 134*a*, having the cap presser 136, down after the forming process 12, or forming cycle 12*b* (see FIG. 13A) is complete, comprises the spring return 168 (see FIG. 1B) and the spring force 170 (see FIG. 1B), as a result of the pneumatic air pressure absence 162*a* (see FIG. 1B), where the pneumatic air pressure 162 is turned off with the pressure control valve 164, and no pneumatic air pressure 162 is applied to the air cylinder rod 134, such as the piston rod 134*a*, having the cap presser 136.

In another version, as shown in FIG. 6D, the air cylinder 146 comprises the double acting air cylinder 146*b* having two air supply lines 154, such as the first air supply line 154*a* and the second air supply line 154*b*, connected between the air supply source 158 and the double acting air cylinder 146*b*. As shown in FIG. 6D, the first air supply line 154*a* is connected to the double acting air cylinder 146*b* with the first pressure control valve 164*a*, and the second air supply line 154*b* is connected to the double acting air cylinder 146*b* with the second pressure control valve 164*b*. As shown in FIG. 6D, the first air supply line 154*a* is coupled, via the first port 157*a*, to the lower bore 172 located within the cylinder tube 150 of the double acting air cylinder 146*b*. As further shown in FIG. 6D, the second air supply line 154*b* is coupled, via the second port 157*b*, to an upper bore 174 located within the cylinder tube 150 of the double acting air cylinder 146*b*. A description of how the double acting air cylinder 146*b* works is discussed in detail above. With the double acting air cylinder 146*b*, the retaining element 96 of the constraining assembly 60 that functions to retain or keep the air cylinder rod 134, such as the piston rod 134*a*, having the cap presser 136, down after the forming process 12 is complete, comprises the pneumatic air pressure application 162*b* (see FIG. 1B) to the upper bore 174 of the double acting air cylinder 146*b*, where the pneumatic air pressure application 162b is applied to the upper bore 174 to push down and retain or hold the air cylinder rod 134, such as the piston rod 134a, having the cap presser 136 in the compressed position 116b, or the base or down position. FIG. 6D further shows the first end 94a, the second end 94b, and the body 95, of the constraining device 62 comprising the air cylinder rod 134 with the cap presser 136.

In another version, as shown in FIG. 6E, the air cylinder 146 comprises the rod lock air cylinder 146c. As shown in FIG. 6E, the rod lock air cylinder 146c comprises the actuated rod locking device 176 located exterior to the first end 148a of the air cylinder 146. The actuated rod locking device 176 is configured to couple to the air cylinder rod 134 to lock or retain the air cylinder rod 134 in the compressed position 116b (see FIG. 1B). As shown in FIG. 6E, the actuated rod locking device 176 comprises the actuator 178 that is configured to actuate, and actuates, the rod lock 180 comprising a clamp, to couple to, and lock around, or firmly press against, one or more portions of the air cylinder rod 134, to lock or retain the air cylinder rod 134 in the compressed position 116b. The actuator 178 is actuated with the actuating force mechanism 182 (see FIG. 6E), such as a spring. With this version of the air cylinder 146, the retaining element 96 (see FIG. 1B) of the constraining assembly 60 that functions to retain or keep the air cylinder rod 134, such as the piston rod 134a, having the cap presser 136, in the compressed position 116b, or down position, after the forming process 12 is complete, comprises the actuated rod locking device 176. FIG. 6E further shows the first end 94a, the second end 94b, and the body 95, of the constraining device 62 comprising the air cylinder rod 134 with the cap presser 136.

Now referring to FIGS. 7A-7C, FIG. 7A is a schematic illustration of front view of an exemplary version of the forming apparatus 10 of the disclosure with the constraining assembly 60 in the form of the spring assembly 184, where the constraining device 62 comprises the spring-loaded plate 186. FIG. 7B is a schematic illustration of an enlarged front view of the constraining assembly comprising the spring assembly 184 of FIG. 7A. FIG. 7C is a schematic illustration of an enlarged side view of the constraining assembly comprising the spring assembly 184 of FIG. 7B.

As shown in FIGS. 7A-7C, and as discussed above, the spring assembly 184 comprises the constraining device 62 comprising the spring-loaded plate 186, and the spring-loaded plate 186 is coupled to the actuated locking device 188. As shown in FIG. 7B, the spring-loaded plate 186 comprises the spring element 190, such as a fitted spring, coupled around the rod 192, such as the stabilizing rod 192a, and the rod 192, such as the stabilizing rod 192, is attached to the cap presser 194.

As shown in FIG. 7A, the constraining device 62, such as the spring-loaded plate 186, is in the expanded position 112, such as the expanded position 112c, within, or substantially within, the die cavity 58 of the first die 54. FIG. 7A shows the first end 94a, the second end 94b, and the body 95, of the constraining device 62 comprising the spring-loaded plate 186. The spring-loaded plate 186 is positioned between the first die portions 56 (see FIG. 7A), such as die blocks 56a (see FIG. 7A). The first die portions 56 are mounted on the flexible die tray 228 (see FIGS. 7A-7C). The engagement surface 204 (see also FIGS. 7A-7C) of the cap presser 194 (see FIGS. 7A-7C) engages with, and is constrained against, the first surface 51a (see FIG. 7A) of the cap portion 50a (see FIG. 7A) of the composite charge 14 (see FIG. 7A), such as the flat composite charge 14a (see FIG. 7A). As further shown in FIG. 7A, the tapered portion 68, such as the punch 68a, of the second die 64, is coupled to the bottom portion 252 of the flexible backing plate 250, and is positioned over the second surface 51b of the cap portion 50a of the composite charge 14. The first die 54 and the second die 64 are in the open position 222 (see FIG. 7A).

As shown in FIG. 7B, the rod 192, such as the stabilizing rod 192, has the first end 196a, the second end 196b, and the rod body 198, where the first end 196a of the rod 192, such as the stabilizing rod 192, is coupled to the cap presser 194, such as the semi-rigid cap presser 194a. As further shown in FIG. 7B, the rod 192, such as the stabilizing rod 192, is inserted through the opening 200 in the flexible die tray 228, and through the opening 202 in the actuated locking device 188. The spring element 190 (see FIGS. 7B-7C) has the first end 206a (see FIG. 7C) coupled to the cap presser 194 (see FIGS. 7B-7C), the second end 206b (see FIG. 7C) coupled to the actuated locking device 188 (see FIGS. 7B-7C), and the coil body 208 (see FIG. 7C) having the interior through opening 210 (see FIG. 7C) through which the rod body 198 (see FIGS. 7B-7C) of the rod 192, such as the stabilizing rod 192a, is inserted.

As shown in FIG. 7B, the actuated locking device 188 is positioned transversely to the rod 192, such as the stabilizing rod 192a, and located below the flexible die tray 228. The actuated locking device 188 is configured to couple to the rod 192, such as the stabilizing rod 192a, to lock or retain the rod 192, such as the stabilizing rod 192a, in the compressed position 116c (see FIG. 1B). The actuated locking device 188 comprises the actuator 212 (see FIGS. 7B-7C) that is configured to actuate, and actuates, the rod lock 214 (see FIGS. 7B-7C) to couple to, and lock around, or firmly press against, one or more portions of the rod 192, such as the stabilizing rod 192a, to lock or retain the rod 192, such as the stabilizing rod 192a, in the compressed position 116c (see FIG. 1B). The actuator 212 is actuated with the actuating force mechanism 216 (see FIGS. 7B-7C), such as springs, compressed air pressure, or another suitable actuating force mechanism. As shown in FIGS. 7B-7C, the rod lock 214 is in the form of a clamp 214a. However, the rod lock 214 may comprise spring pins, levers, or other suitable locking elements, which are released by the actuator 212, to lock or retain the rod 192, such as the stabilizing rod 192a, in the compressed position 116c.

Figure 8:
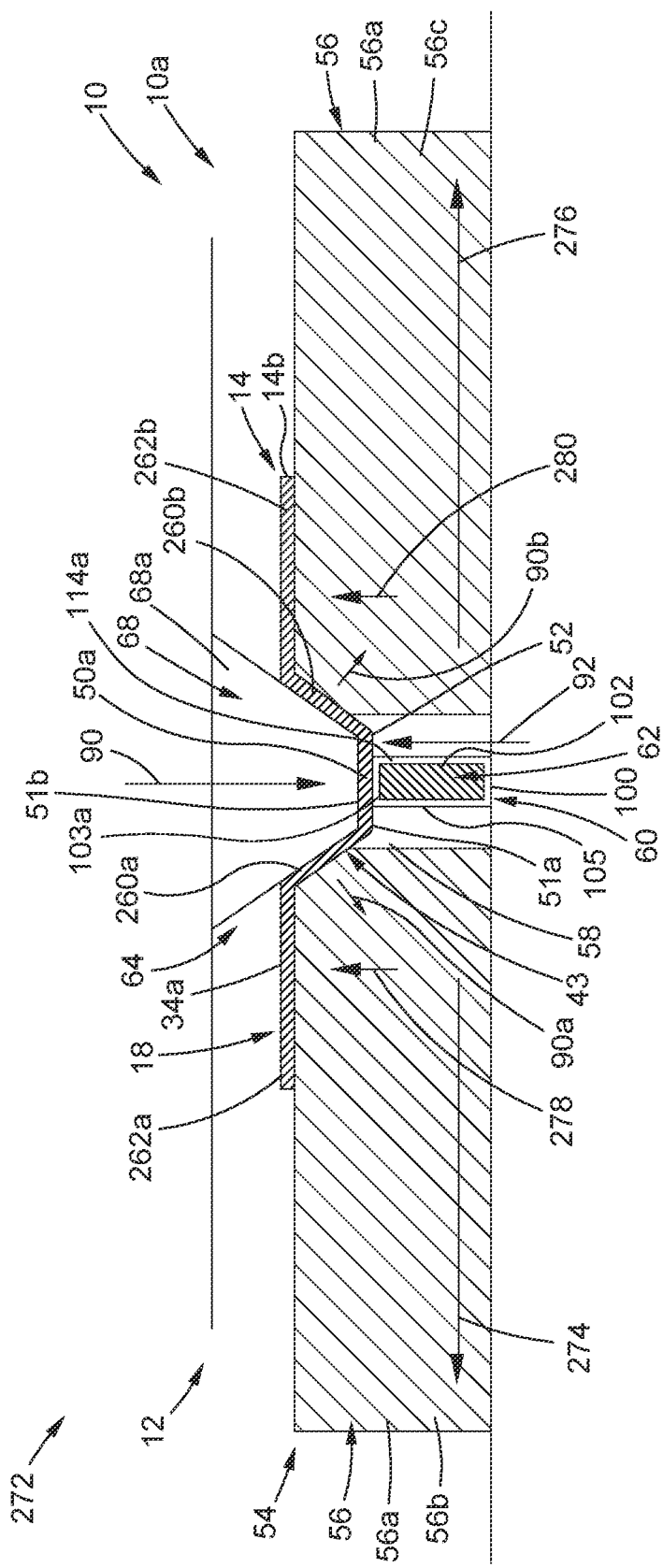
FIG. 8 is a schematic illustration of a front view an exemplary version of a forming apparatus of the disclosure with a constraining assembly in the form of a foam and vacuum assembly and showing various forces applied during a forming process.

Now referring to FIG. 8, FIG. 8 is a schematic illustration of a force diagram 272 showing various forces applied in an exemplary version of the forming apparatus 10, such as the high contour stringer former apparatus 10a, of the disclosure, during the forming process 12. FIG. 8 shows a front view of the forming apparatus 10, such as the high contour stringer former apparatus 10a, with a composite charge 14, such as a composite laminate charge 14b, being formed into a contoured hat section 43 for a highly contoured composite structure 18, such as a hat-shaped stringer 34a, having a cap 52, a first side 260a, and a second side 260b, and a first flange 262a and a second flange 262b. FIG. 8 shows the composite charge 14, such as the composite laminate charge 14b, positioned and constrained between the tapered portion 68, such as the punch 68a, of the second die 64, and the constraining device 62 and the first die portions 56, such as die blocks 56a, of the first die 54.

As shown in FIG. 8, the constraining device 62, in the form of the compressible foam element 102, of the constraining assembly 60, in the form of the foam and vacuum assembly 100. The constraining device 62, in the form of the compressible foam element 102, is shown surrounded by a vacuum bag 105 and compressed in an intermediate compressed position 114a in the die cavity 58. The constraining device 62 and vacuum bag 105 are coupled to other components of the foam and vacuum assembly 100, such as the vacuum source 106, the vacuum line 108, and the control valve 110, as shown and described above with respect to FIGS. 5A-5C. As shown in FIG. 8, the first end 103a of the compressible foam element 102 is compressed against the first surface 51a of the cap portion 50a, of which the cap 52 is formed.

FIG. 8 shows the second die 64, such as the tapered portion 68, for example, the punch 68a, applying the downward compressive force 90 against the second surface 51b of the cap portion 50a, or against the cap 52 formed from the cap portion 50a, and against the constraining device 62, such as the compressible foam element 102. The downward compressive force 90 applied by the second die 64, such as the tapered portion 68, for example, the punch 68a, against the cap portion 50a, or against the cap 52 formed from the cap portion 50a, of the composite charge 14, is preferably in a range of 20 (twenty) psi (pounds per square inch) to 380 (three hundred eighty) psi. However, another suitable downward compressive force psi may also be used depending on the composite charge 14 and the contoured composite structure 16, such as highly contoured composite structure 18 desired to be formed.

FIG. 8 further shows the second die 64, such as the tapered portion 68, for example, the punch 68a, applying a first downward side compressive force 90a against the first side 260a of the contoured hat section 43 and against a left die block 56b, or left lower pallet, of the first die 54 to move the left die block 56b laterally outwardly in a first lateral direction 274, as the tapered portion 68 is inserted, or forced, downward into the die cavity 58. FIG. 8 further shows the second die 64, such as the tapered portion 68, for example, the punch 68a, applying a second downward side compressive force 90b against the second side 260b of the contoured hat section 43 and against a right die block 56c, or right lower pallet, of the first die 54 to move the right die block 56c laterally outwardly in a second lateral direction 276, as the tapered portion 68 is inserted, or forced, downward into the die cavity 58.

As further shown in FIG. 8, the left die block 56b, or left lower pallet, applies a first upward compressive force 278 against the first flange 262a of the highly contoured composite structure 18, such as the hat-shaped stringer 34a, formed by the composite charge 14. The first upward compressive force 278 applied by the left die block 56b, or left lower pallet against the first flange 262a is preferably in a range of 5 (five) psi (pounds per square inch) to 90 (ninety) psi. However, another suitable upward compressive force psi may also be used.

As further shown in FIG. 8, the right die block 56c, or right lower pallet, applies a second upward compressive force 280 against the second flange 262b of the highly contoured composite structure 18, such as the hat-shaped stringer 34a, formed by the composite charge 14. The second upward compressive force 280 applied by the right die block 56c, or right lower pallet against the second flange 262b is preferably in a range of 5 (five) psi (pounds per square inch) to 90 (ninety) psi. However, another suitable upward compressive force psi may also be used.

As further shown in FIG. 8, the constraining device 62, such as the compressible foam element 102, of the constraining assembly 60, such as the foam and vacuum assembly 100, applies an upward resistive force 92 against the cap portion 50a, or against the cap 52 formed from the cap portion 50a, and against the downward compressive force 90 of the second die 64, such as the tapered portion 68, for example, the punch 68a. The upward resistive force 92 applied by the constraining assembly 60, and in particular, applied by the constraining device 62, against the cap portion 50a, or against the cap 52 formed from the cap portion 50a, is preferably in a range of 10 (ten) psi (pounds per square inch) to 200 (two hundred) psi. However, another suitable upward resistive force psi may also be used depending on the composite charge 14 and the contoured composite structure 16, such as the highly contoured composite structure 18, desired to be formed. The upward resistive force 92 of the constraining device 62 and the downward compressive force 90 of the second die 64, such as the tapered portion 68, for example, the punch 68a, act to pinch, or constrain, the cap portion 50a, or cap 52 formed by the cap portion 50a of the composite charge 14, to transfer stress away from the cap portion 50a, or cap 52, and to provide wrinkle prevention 44 (see FIG. 1A) or wrinkle reduction 45 (see FIG. 1A) to the cap portion 50a, or cap 52.

Figure 9A:
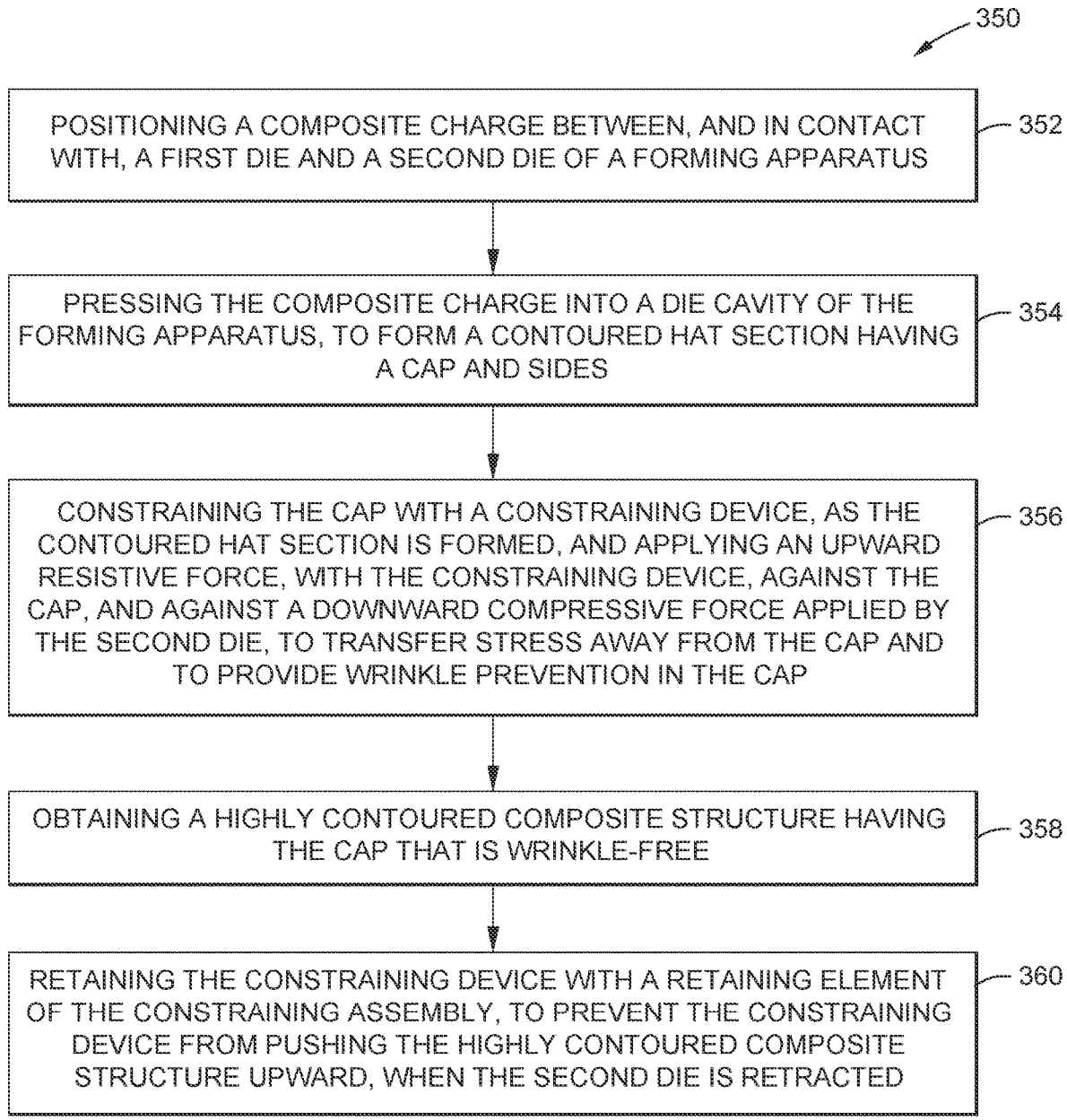
FIG. 9A is an illustration of a flow diagram of an exemplary version of a method of the disclosure.

Now referring to FIG. 9A, FIG. 9A is an illustration of a flow diagram of an exemplary version of a method 350 of the disclosure. In another version of the disclosure, there is provided the method 350 for constraining a composite charge 14 and forming the composite charge 14 into a contoured composite structure 16, such as a highly contoured composite structure 18.

The blocks in FIG. 9A represent operations and/or portions thereof, or elements, and lines connecting the various blocks do not imply any particular order or dependency of the operations or portions thereof, or elements. FIG. 9A and the disclosure of the steps of the method 350 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 9A, the method 350 comprises the step of positioning 352 a composite charge 14 between, and in contact with, a first die 54 and a second die 64 of a forming apparatus 10, such as a high contour stringer former apparatus 10a, as discussed in detail above. As further discussed above, in one version, the forming apparatus 10 comprises the first die 54 having pairs 55 of first die portions 56 spaced apart to define a die cavity 58. The first die 54 further has a constraining assembly 60, as discussed above, with a constraining device 62 disposed in the die cavity 58, and in contact with the composite charge 14, via the vacuum bag 105, and in particular, in contact with a cap portion 50a of the composite charge 14, such as a first surface 51a of the cap portion 50a of the composite charge 14, via the vacuum bag 105, when the composite charge 14 is positioned on the first die 54 and between the first die 54 and the second die 64.

The step of positioning 352 (see FIG. 9A) the composite charge 14 may further comprise, positioning the composite charge 14 between, and in contact with, the first die 54 and the second die 64, wherein the first die 54 has the constraining assembly 60, in one version, comprising a foam and vacuum assembly 100, and the constraining device 62 comprising a compressible foam element 102.

As shown in FIG. 1B, and discussed above, the foam and vacuum assembly 100 comprises the compressible foam element 102, a vacuum bag 105 surrounding the compressible foam element 102, a vacuum source 106 coupled to the vacuum bag 105, via a vacuum line 108, and a control valve 110. When the second die 64 retracts away from the first die 54, the vacuum bag 105 is designed to retain and hold down the compressible foam element 102 in the compressed position 116a, so that the compressible foam element 102 does not expand back to the expanded position 112a and move the highly contoured composite structure 18 upward in an unwanted manner. A vacuum pressure 118 is applied to the compressible foam element 102, and the vacuum bag 105 retains and holds the compressible foam element 102 in the compressed position 116a, until the highly contoured composite structure 18 is removed from the first die 54. Once the highly contoured composite structure 18 is removed from the first die 54, the vacuum pressure 118 may then be turned off, or released, and compressible foam element 102 is allowed to expand back to the expanded position 112a.

The compressible foam element 102 may comprise a single use compressible foam element 102a that is used one time, or a single use, for a single forming process 12 and then is removed from the first die 54 of the forming apparatus 10. Alternatively, the compressible foam element 102 may comprise a multiple use compressible foam element 102b that is designed for two or more, or multiple, uses in the forming apparatus 10 and may be used for multiple forming processes 12. The compressible foam element 102 may be removably attached to the die cavity 58 in the first die 54, so that the compressible foam element 102 can be easily removed and cleaned or repaired, or removed and replaced with a compressible foam element 102 that is unused or new.

The compressible foam element 102 comprises a compressible foam material 122. As shown in FIG. 1B, and discussed above, the compressible foam material 122 may comprise an open cell foam 124, including a polyurethane foam 124a, a latex rubber foam 124b, or another suitable open cell foam. Preferably, the open cell foam 124 is in the form of a high-density foam 126a (see FIG. 1B) having a density 128a (see FIG. 1B) in a range of 3 lb/ft$^3$ (three pounds per cubic foot) to 13 lb/ft$^3$ (thirteen pounds per cubic foot).

As shown in FIG. 1B, the compressible foam material 122 may also comprise a closed cell foam 130, including a polyethylene foam 130a, for example, an expanded polyethylene foam, a polystyrene foam 130b, for example, an expanded polystyrene foam, a polypropylene foam 130c, for example, an expanded polypropylene foam, a neoprene foam rubber 130d, or another suitable closed cell foam. Preferably, the closed cell foam 130 is in the form of a high-density foam 126b (see FIG. 1B) having a density 128b (see FIG. 1B) in a range of 2 lb/ft$^3$ (two pounds per cubic foot) to 10 lb/ft$^3$ (ten pounds per cubic foot).

The densities 128a, 128b chosen for the compressible foam material 122 of the compressible foam element 102 depend on the type of composite charge 14 used, and the type of contoured composite structure 16, such as the highly contoured composite structure 18, or part, being formed with the forming apparatus 10 and the forming process 12.

The step of positioning 352 (see FIG. 9A) the composite charge 14 may further comprise, positioning the composite charge 14 between, and in contact with, the first die 54 and the second die 64, wherein the first die 54 has the constraining assembly 60, in another version, comprising a pneumatic assembly 132, and the constraining device 62 comprising an air cylinder rod 134 with a cap presser 136. As shown in FIG. 1B, the pneumatic assembly 132 comprises the air cylinder rod 134 with the cap presser 136, the air cylinder 146 coupled to the air cylinder rod 134, and an air supply source 158 coupled to the air cylinder 146, via one or more air supply lines 154, and one or more ports 157.

The step of positioning 352 (see FIG. 10A) the composite charge 14 may further comprise, positioning the composite charge 14 between, and in contact with, the first die 54 and the second die 64, wherein the first die 54 has the constraining assembly 60, in another version, comprising a spring assembly 184, and the constraining device 62 comprising a spring-loaded plate 186. As shown in FIG. 1B, the spring assembly 184 comprises the spring-loaded plate 186, which comprises a spring element 190 (see FIG. 7B), a stabilizing rod 192 (see FIG. 7B), and a cap presser 194 (see FIG. 7B).

As shown in FIG. 1A, the forming apparatus 10 further comprises a control system 70 for operatively controlling operations 72 of the forming apparatus 10, including coordinating movement of the first die 54 and movement of the second die 64 with movement of the constraining assembly 60. The control system 70 is discussed in detail above with respect to FIG. 1A.

As shown in FIG. 9A, the method 350 further comprises the step of pressing 354, or forcing, the composite charge 14 into the die cavity 58 of the forming apparatus 10, to form a contoured hat section 43 having a cap 52 and sides 256.

As shown in FIG. 9A, the method 350 further comprises the step of constraining 356 the cap 52 with the constraining device 62, as the contoured hat section 43 is formed, and applying an upward resistive force 92, with the constraining device 62, against the cap 52, and against a downward compressive force 90 applied by the second die 64, to provide stress transfer 49 (see FIG. 1A), and transfer stress away from the cap 52, and to provide wrinkle prevention 44 (see FIG. 1A), to prevent formation of wrinkles, or fiber distortions, in the cap 52. The downward compressive force 90 pushes the cap 52 downward, compresses the constraining device 62 downward, and moves laterally outward one or more of the pairs 55 of the first die portions 56, for example, the left die block 56b (see FIG. 8) and the right die block 56c (see FIG. 8). After the contoured hat section 43 is formed, other remaining portions 50b (see FIG. 1A) of the composite charge 14 may be formed with the forming process 12. The constraining assembly 60, and in particular, the constraining device 62, maintains the cap portion 50a, and the cap 52, of the composite charge 14 in a constrained position during the forming process 12, to provide the wrinkle prevention 44 (see FIG. 1A), to prevent formation of wrinkles or fiber distortions, in the cap portion 50a of the composite charge 14, and in turn, to provide wrinkle prevention 44, to prevent formation of wrinkles or fiber distortions in the cap 52 of the contoured composite structure 16, such as the highly contoured composite structure 18, to provide the cap 52 that is wrinkle-free 46.

As shown in FIG. 9A, the method 350 further comprises the step of obtaining 358 the highly contoured composite structure 18 having the cap 52 that is wrinkle-free 46 of wrinkles or fiber distortions. The step of obtaining 358 the highly contoured composite structure 18 having the cap 52 that is wrinkle-free 46 of wrinkles or fiber distortions, further comprises, obtaining the highly contoured composite structure 18 comprising, as shown in FIG. 1A, one or more of, a stringer 34, including a hat-shaped stringer 34a, an aircraft stringer 34b, a hat-shaped aircraft stringer 34c, a fuselage stringer 34d, a keel stringer 34e, a wing stringer 34f, a stabilizer stringer 34g, comprising one or more of, a stiffener member 36, a hat-shaped stiffener member 36a, or another suitable stiffener member, or comprising a spar 38, or comprising another suitable highly contoured composite structure. Preferably, the highly contoured composite structure 18 has a contour radius 98 (see FIG. 1A) in a range of 500 inches to 1000 inches, and more preferably, has a contour radius 98 in a range of 500 inches to 750 inches.

As shown in FIG. 9A, the method 350 further comprises the step of retaining 360 the constraining device 62 with a retaining element 96 of the constraining assembly 60, to prevent the constraining device 62 from pushing the highly contoured composite structure 18 upward, when the second die 64 is retracted. As discussed above, when the constraining assembly 60 comprises the foam and vacuum assembly 100, the retaining element 96 preferably comprises the vacuum bag 105 under a vacuum pressure 118 (see FIG. 1B) surrounding the compressible foam element 102, and designed to retain or hold the compressible foam element 102 in a compressed position 116a.

As discussed above, when the constraining assembly 60 comprises the pneumatic assembly 132, in one version, the retaining element 96 may comprise a spring return 168 (see FIG. 1B) and a spring force 170 (see FIG. 1B) applied to the air cylinder rod 134, to retain the air cylinder rod 134 in a compressed position 116b (see FIG. 1B), where the air cylinder 146 comprises a single acting spring return air cylinder 146a (see FIG. 1B). When the constraining assembly 60 comprises the pneumatic assembly 132, in another version, the retaining element 96 may comprise a pneumatic air pressure application 162b (see FIG. 1B) applied to the air cylinder rod 134, to retain the air cylinder rod 134 in the compressed position 116b, where the air cylinder 146 comprises a double acting air cylinder 146b (see FIG. 1B). When the constraining assembly 60 comprises the pneumatic assembly 132, in another version, the retaining element 96 may comprise an actuated rod locking device 176 (see FIG. 1B) retaining the air cylinder rod 134 in the compressed position 116b, where the air cylinder 146 comprises a rod lock air cylinder 146c (see FIG. 1B).

As discussed above, when the constraining assembly 60 comprises the spring assembly 184, the retaining element 96 comprises the actuated locking device 188 (see FIG. 1B) coupled to the spring-loaded plate 186, and the actuated locking device 188 is designed to retain or hold the spring-loaded plate 186 in a compressed position 116c (see FIG. 1B).

After the step of retaining 360 the constraining device 62, the method 350 may further optionally comprise, the steps of: removing the highly contoured composite structure 18 from the first die 54, and releasing the retaining element 96, to allow the constraining device 62 to move upward from a compressed position 116 (see FIG. 1B) to an expanded position 112 (see FIG. 1B). The method 350 may further optionally comprise the step of moving laterally inward the one or more pairs 55 of the first die portions 56, such as the left die block 56b (see FIG. 8) and the right die block 56c (see FIG. 8), back to their original positions. The method 350 may further optionally comprise the step of moving the contoured composite structure 16, such as the highly contoured composite structure 18, to one of, a secondary holding tool 246, such as a curing tool, a substrate 248, such as an uncured skin, or another suitable structure for holding the contoured composite structure 16, such as the highly contoured composite structure 18, for further processing or assembly.

Figure 9B:
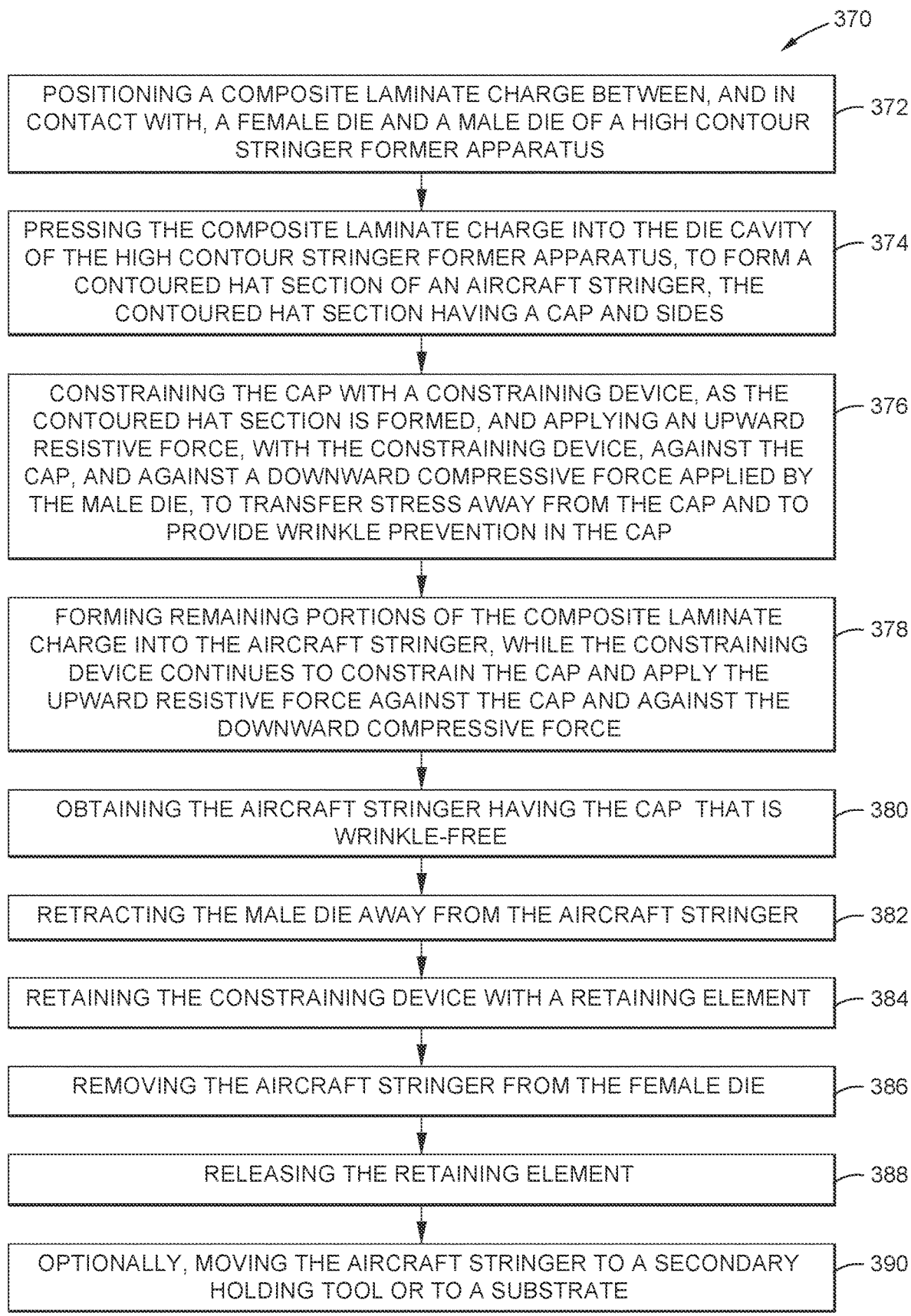
FIG. 9B is an illustration of a flow diagram of another exemplary version of a method of the disclosure.

Now referring to FIG. 9B, FIG. 9B is an illustration of a flow diagram of another exemplary version of a method 370 of the disclosure. In another version of the disclosure, there is provided the method 370 for forming an aircraft stringer 34b having a cap 52 that is wrinkle-free 46 (see FIG. 1A).

The blocks in FIG. 9B represent operations and/or portions thereof, or elements, and lines connecting the various blocks do not imply any particular order or dependency of the operations or portions thereof, or elements. FIG. 9B and the disclosure of the steps of the method 370 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 9B, the method 370 comprises the step of positioning 372 a composite laminate charge 14b between, and in contact with, a female die 54a and a male die 64a of a high contour stringer former apparatus 10a. The composite laminate charge 14b is initially placed on the female die 54a, and the male die 64a is lowered toward the composite laminate charge 14b and the female die 54a, until the male die 64a contacts the composite laminate charge 14b. Preferably, the tapered portion 68, such as in the form of a punch 68a, contacts the second surface 51b of a cap portion 50a of the composite laminate charge 14b.

The female die 54a has pairs 55 of die blocks 56a spaced apart to define a die cavity 58. The female die 54a further has a constraining assembly 60, as discussed in detail above, with a constraining device 62 disposed in the die cavity 58. The constraining device 62 is in contact with a first surface 51a of the cap portion 50a of the composite laminate charge 14b, via the vacuum bag 105.

The step of positioning 372 the composite laminate charge 14b between, and in contact with, the female die 54a and the male die 64a, where the female die 54a has the constraining assembly 60 with the constraining device 62, may further comprise, positioning the composite laminate charge 14b between, and in contact with, the female die 54a and the male die 64a, where the female die 54a has the constraining assembly 60, in one version, comprising a foam and vacuum assembly 100 (see FIG. 1B), and the constraining device 62 comprising a compressible foam element 102 (see FIG. 1B).

As shown in FIG. 1B, and discussed above, the foam and vacuum assembly 100 comprises the compressible foam element 102, the vacuum bag 105 surrounding the compressible foam element 102, the vacuum source 106 coupled to the vacuum bag 105, via the vacuum line 108, and the control valve 110. When the male die 64a retracts away from the female die 54a, the retaining element 96 of the constraining assembly 60 comprises the vacuum bag 105. The vacuum bag 105 is designed to retain or hold down the compressible foam element 102 in the compressed position 116a, so that the compressible foam element 102 does not expand back to the expanded position 112a and move the highly contoured composite structure 18 upward in an unwanted manner. A vacuum pressure 118, or vacuum, is applied to the compressible foam element 102, and the vacuum bag 105 retains or holds down the compressible foam element 102 in the compressed position 116a, until the highly contoured composite structure 18 is removed from the female die 54a. Once the highly contoured composite structure 18 is removed from the female die 54a, the vacuum pressure 118, or vacuum, may then be turned off, or released, and compressible foam element 102 is allowed to expand back to the expanded position 112a.

As discussed above, the compressible foam element 102 may comprise a single use compressible foam element 102a that is used for a single forming process 12 and then is removed from the female die 54a of the forming apparatus 10, such as the high contour stringer former apparatus 10a. Alternatively, the compressible foam element 102 may comprise a multiple use compressible foam element 102b that is designed to stay in the female die 54a of the forming apparatus 10, such as the high contour stringer former apparatus 10a, and may be used for multiple forming processes 12 in the forming apparatus 10. The compressible foam element 102 may be removably coupled to the female die 54a, so that is can be easily removed and cleaned or repaired, or removed and replaced with a compressible foam element 102 that is unused or new.

The compressible foam element 102 comprises a compressible foam material 122. As shown in FIG. 1B, and discussed above, the compressible foam material 122 may comprise an open cell foam 124, including a polyurethane foam 124a, a latex rubber foam 124b, or another suitable open cell foam. Preferably, the open cell foam 124 is in the form of a high-density foam 126a (see FIG. 1B) having a density 128a (see FIG. 1B) in a range of 3 lb/ft³ (three pounds per cubic foot) to 13 lb/ft³ (thirteen pounds per cubic foot).

As shown in FIG. 1B, the compressible foam material 122 may also comprise a closed cell foam 130, including a polyethylene foam 130a, for example, an expanded polyethylene foam, a polystyrene foam 130b, for example, an expanded polystyrene foam, a polypropylene foam 130c, for example, an expanded polypropylene foam, a neoprene foam rubber 130d, or another suitable closed cell foam. Preferably, the closed cell foam 130 is in the form of a high-density foam 126b (see FIG. 1B) having a density 128b (see FIG. 1B) in a range of 2 lb/ft³ (two pounds per cubic foot) to 10 lb/ft³ (ten pounds per cubic foot).

The densities 128a, 128b chosen for the compressible foam material 122 of the compressible foam element 102 depend on the type of composite charge 14 used, and the type of contoured composite structure 16, such as the highly contoured composite structure 18, or part, being formed with the forming apparatus 10 and the forming process 12.

The step of positioning 372 (see FIG. 9B) the composite laminate charge 14b between, and in contact with, the female die 54a and the male die 64a, where the female die 54a has the constraining assembly 60 with the constraining device 62, may further comprise, positioning the composite laminate charge 14b between, and in contact with, the female die 54a and the male die 64a, where the female die 54a has the constraining assembly 60, in another version, comprising a pneumatic assembly 132, and the constraining device 62 comprising an air cylinder rod 134 with a cap presser 136.

As shown in FIG. 1B, the pneumatic assembly 132 comprises the air cylinder rod 134 with the cap presser 136, and comprises the air cylinder 146 coupled to the air cylinder rod 134, and an air supply source 158 coupled to the air cylinder 146, via one or more air supply lines 154 and one or more ports 157.

The step of positioning 372 (see FIG. 9B) the composite laminate charge 14b between, and in contact with, the female die 54a and the male die 64a, where the female die 54a has the constraining assembly 60 with the constraining device 62, may further comprise, positioning the composite laminate charge 14b between, and in contact with, the female die 54a and the male die 64a, where the female die 54a has the constraining assembly 60 comprising a spring assembly 184, and the constraining device 62 comprising a spring-loaded plate 186. As shown in FIG. 1B, the spring assembly 184 comprises the spring-loaded plate 186, which comprises a spring element 190 (see FIG. 7B), a stabilizing rod 192 (see FIG. 7B), and a cap presser 194 (see FIG. 7B).

As shown in FIG. 1A, the forming apparatus 10, such as the high contour stringer former apparatus 10a, further comprises a control system 70 for operatively controlling operations 72 of the high contour stringer former apparatus 10a, including coordinating operation and movement of the female die 54a and the male die 64a with operation and movement of the constraining assembly 60. The control system 70 is discussed in detail above with respect to FIG. 1A.

As shown in FIG. 9B, the method 370 further comprises the step of pressing 374 the composite laminate charge 14b into the die cavity 58 of the high contour stringer former apparatus 10a, to form a contoured hat section 43 of the aircraft stringer 34b. As shown in FIG. 4, the contoured hat section 43 has a cap 52 and sides 256. The contoured hat section 43 may further comprise flanges 262 (see FIG. 4).

As shown in FIG. 9B, the method 370 further comprises the step of constraining 376 the cap 52, with the constraining device 62, between the constraining device 62 and the male die 64a, as the contoured hat section 43 is formed, and applying an upward resistive force 92, with the constraining device 62, against the cap 52, and against a downward compressive force 90 applied by the male die 64a, to transfer stress away from the cap 52 and to provide wrinkle prevention 44, that is, to prevent formation of wrinkles or fiber distortions in the cap 52. The constraining device 62 provides stress transfer 49 (see FIG. 1B) of stress away from the cap portion 50a, and in turn, the cap 52, to one or more remaining portions 50b of the composite charge 14, such as remaining portions 50b to be formed as flanges 262 (see FIG. 4).

The step of constraining 376 the cap 52 with the constraining device 62, as the contoured hat section 43 is formed, and applying the upward resistive force 92, may further comprise, applying the upward resistive force 92 in a range of 10 psi (pounds per square inch) to 200 psi. The step of constraining 376 the cap 52 with the constraining device 62, as the contoured hat section 43 is formed, and applying the upward resistive force 92 against the downward compressive force 90 applied by the male die 64a, may further comprise, applying the downward compressive force 90 in a range of 20 psi (pounds per square inch) to 380 psi.

The step of constraining 376 the cap 52 with the constraining device 62, as the contoured hat section 43 is formed, and applying the upward resistive force 92 against the downward compressive force 90 applied by the male die 64a, may further comprise, the downward compressive force 90 applied by the male die 64a also pushing the cap 52 downward, compressing the constraining device 62 downward, and moving one or more of the pairs 55 of the die blocks 56a, such as the left die block 56b (see FIG. 8) and the right die block 56c (see FIG. 8), laterally outward.

As shown in FIG. 9B, the method 370 further comprises the step of forming 378 remaining portions 50b (see FIG. 1A) of the composite laminate charge 14b into the aircraft stringer 34b, while the constraining device 62 continues to constrain the cap 52 and apply the upward resistive force 92 against the cap 52 and against the downward compressive force 90.

As shown in FIG. 9B, the method 370 further comprises the step of obtaining 380 the aircraft stringer 34b having the cap 52 that is wrinkle-free 46, that is, free of wrinkles or fiber distortion. As shown in FIG. 9B, the method 370 further comprises the step of retracting 382 the male die 64a away from the aircraft stringer 34b. As shown in FIG. 9B, the method 370 further comprises the step of retaining 384 the constraining device 62 with a retaining element 96 of the constraining assembly 60, to prevent the constraining device 62 from pushing the aircraft stringer 34b upward, when the male die 64a is retracted.

As discussed above, when the constraining assembly 60 comprises the foam and vacuum assembly 100, the retaining element 96 preferably comprises the vacuum bag 105 under a vacuum pressure 118 (see FIG. 1B) surrounding the compressible foam element 102, and designed to retain or hold the compressible foam element 102 in a compressed position 116a.

As discussed above, when the constraining assembly 60 comprises the pneumatic assembly 132, in one version, the retaining element 96 may comprise a spring return 168 (see FIG. 1B) and a spring force 170 (see FIG. 1B) applied to the air cylinder rod 134, to retain the air cylinder rod 134 in a compressed position 116b (see FIG. 1B), where the air cylinder 146 comprises a single acting spring return air cylinder 146a (see FIG. 1B). When the constraining assembly 60 comprises the pneumatic assembly 132, in another version, the retaining element 96 may comprise a pneumatic air pressure application 162b (see FIG. 1B) applied to the air cylinder rod 134, to retain the air cylinder rod 134 in the compressed position 116b, where the air cylinder 146 comprises a double acting air cylinder 146b (see FIG. 1B). When the constraining assembly 60 comprises the pneumatic assembly 132, in another version, the retaining element 96 may comprise an actuated rod locking device 176 (see FIG. 1B) retaining the air cylinder rod 134 in the compressed position 116b, where the air cylinder 146 comprises a rod lock air cylinder 146c (see FIG. 1B).

As discussed above, when the constraining assembly 60 comprises the spring assembly 184, the retaining element 96 comprises the actuated locking device 188 (see FIG. 1B) coupled to the spring-loaded plate 186, and the actuated locking device 188 is designed to retain or hold the spring-loaded plate 186 in a compressed position 116c (see FIG. 1B).

As shown in FIG. 9B, the method 370 further comprises the step of removing 386 the aircraft stringer 34b from the female die 54a.

As shown in FIG. 9B, the method 370 further comprises the step of releasing 388 the retaining element 96. The step of releasing 388 the retaining element 96 preferably allows the constraining device 62 to move upward from a compressed position 116 to an expanded position 112.

As shown in FIG. 9B, the method 370 may further optionally comprise after the step of removing 386 the aircraft stringer 34b from the female die 54a, the step of moving 390 the aircraft stringer 34b to one of, a secondary holding tool 246, such as a curing tool, a substrate 248, such as an uncured skin, or another suitable structure for holding the aircraft stringer 34b.

The method 370 may further optionally comprise after the step of releasing 388 the retaining element 96, the step of moving laterally inward the one or more pairs 55 of the die blocks 56a, such as the left die block 56b (see FIG. 8) and the right die block 56c (see FIG. 8), back to their original positions.

Now referring to FIGS. 10A-17B, FIGS. 10A-17B show various steps of an exemplary forming process 12 (see FIG. 1A) using the forming apparatus 10 (see FIG. 1A) and the forming process 12 (see FIG. 1A), as disclosed herein, to form a highly contoured composite structure 18 (see FIG. 14A), such as a stringer 34 (see FIG. 14A), for example, a hat-shaped stringer 34a (see FIG. 14A).

Now referring to FIGS. 10A-10B, FIG. 10A is a schematic illustration of a pre-forming step 282 before a forming cycle 12b (see FIG. 11A), showing a front view of an exemplary version of the forming apparatus 10 of the disclosure having the constraining assembly 60, in the form of the foam and vacuum assembly 100, with the constraining device 62, in the form of the compressible foam element 102, and showing the first die 54 and the second die 64 in the open position 222. FIG. 10B is a schematic illustration of a side view of the forming apparatus 10, and the constraining device 62, in the form of the compressible foam element 102, of FIG. 10A, in the pre-forming step 282.

FIG. 10B shows the composite charge 14, such as the flat composite charge 14a, positioned on the first die 54 and spaced apart from the second die 64. FIG. 10A shows the first die portions 56, such as die blocks 56a, and in particular, the left die block 56b and the right die block 56c, in a first position 284 adjacent, or substantially adjacent to the constraining device 62, such as the compressible foam element 102, positioned or disposed in the die cavity 58 of the first die 54. The constraining device 62 (see FIGS. 10A-10B), such as the compressible foam element 102 (see FIGS. 10A-10B), is covered or surrounded with the vacuum bag 105 (see FIGS. 10A-10B), and the constraining device 62, such as the compressible foam element 102, is in the expanded position 112 (see FIG. 10B), such as the expanded position 112a (see FIG. 10B), for example, a fully expanded position. As shown in FIG. 10B, the first end 103a, or top end, of the compressible foam element 102 is engaged with the first surface 51a of the cap portion 50a of the composite charge 14, via the vacuum bag 105.

FIGS. 10A-10B, as well as FIGS. 11A-17B, further show the vacuum line 108, the vacuum source 106, such as the vacuum pump 106a, and the control valve 110 of the foam and vacuum assembly 100. The vacuum bag 105 is attached to the vacuum source 106, via the vacuum line 108, and the control valve 110 is incorporated into the vacuum line 108. As shown in FIGS. 10A-10B, as well as FIGS. 11A-17B, the constraining device 62, such as the compressible foam element 102, covered or surrounded with the vacuum bag 105, is attached to the vacuum source 106, such as the vacuum pump 106a, via the vacuum line 108 and the control valve 110, all from the foam and vacuum assembly 100. FIGS. 10A-10B further show the forming apparatus 10 having the control system 70, with the controller 74. The control system 70 operatively controls the forming apparatus 10, including coordinating movements of the first die 54 and the second die 64 with movement of the constraining assembly 60. Although the control system 70 with the controller 74 is not shown in FIGS. 11A-17B, it is understood from FIGS. 10A-10B, that the forming apparatus 10 shown in FIGS. 11A-17B, is similarly coupled to the control system 70 with the controller 74, as shown in FIGS. 10A-10B. FIGS. 10A-10B further show the second die 64 comprising the tapered portion 68, such as the punch 68a. The tapered portion 68 has an engagement surface 286 designed to engage with a second surface 51b of the cap portion 50a of the composite charge 14.

Now referring to FIGS. 11A-11B, FIG. 11A is a schematic illustration of a first forming step 288 of the forming cycle 12b, showing a front view of the forming apparatus 10 having the constraining device 62, in the form of the compressible foam element 102, and showing the first die 54 and the second die 64 in the closed position 224, and showing consolidation 290 of the cap portion 50a of the composite charge 14, such as the flat composite charge 14a. FIG. 11B is a schematic illustration of a side view of the forming apparatus 10, and the constraining device 62, in the form of the compressible foam element 102, of FIG. 11A, in the first forming step 288.

As shown in FIGS. 11A-11B, the tapered portion 68 of the second die 64 is lowered, and the engagement surface 286 (see FIG. 10A) makes initial contact with the second surface 51b (see FIG. 10A) of the cap portion 50a of the composite charge 14. The compressible foam element 102 is in the expanded position 112a (see FIG. 11B) in the die cavity 58 (see FIG. 11A) between, and adjacent to, the left die block 56b (see FIG. 11A) and the right die block 56c (see FIG. 11A). As shown in FIGS. 11A-11B, the cap portion 50a is constrained, or pinched, between the constraining device 62, such as the compressible foam element 102, and the tapered portion 68 of the second die 64, consolidating the cap portion 50a. As the second die 64 applies the downward compressive force 90 (see FIG. 11B), the compressible foam element 102 applies the upward resistive force 92 (see FIG. 11B), to constrain, or pinch, the cap portion 50a of the composite charge 14. FIG. 11A shows consolidation 290 of the cap portion 50a of the composite charge 14 first in the first forming step 288.

As used herein, the terms "consolidating" or "consolidation" mean compressing or squeezing the one or more portions of a composite charge together under pressure, and/or heat, to join and/or melt individual plies of composite material, and to flow or migrate the resin material and the fiber material, to solidify or combine the composite material in forming one or more portions of a contoured composite structure, such as a highly contoured composite structure.

Now referring to FIGS. 12A-12B, FIG. 12A is a schematic illustration of a second forming step 292 of the forming cycle 12b, showing a front view of the forming apparatus 10 and the constraining device 62, in the form of the compressible foam element 102, and showing the second die 64, such as the tapered portion 68 of the second die 64, partially inserted in a first insertion position 294 into the die cavity 58 of the first die 54. FIG. 12B is a schematic illustration of a side view of the forming apparatus 10, and the constraining device 62, in the form of the compressible foam element 102, of FIG. 12A, in the second forming step 292.

As shown in FIG. 12A, in the second forming step 292, halfway through the forming cycle 12b, the tapered portion 68 of the second die 64 is partially inserted, or forced or pushed, into the die cavity 58 of the first die 54, and forces or pushes the left die block 56b and the right die block 56c apart, and causes the left die block 56b and the right die block 56c to move laterally outward, to a second position 296. The left die block 56b is moved laterally outward in the first lateral direction 274 (see FIG. 12A), and the right die block 56c is moved laterally outward in the second lateral direction 276 (see FIG. 12A). Movement of the left die block 56b and the right die block 56c laterally outward creates first spaces 298 (see FIG. 12A) on each side of the compressible foam element 102, between the compressible foam element 102, covered or surrounded with the vacuum bag 105, and the left die block 56b and the right die block 56c, respectively.

As shown in FIGS. 12A-12B, the cap portion 50a continues to be constrained, or pinched, by the constraining device 62, such as the compressible foam element 102, between the second die 64 and the constraining device 62. As the second die 64 continues to apply the downward compressive force 90 (see FIG. 12B), the compressible foam element 102 continues to apply the upward resistive force 92 (see FIG. 12B), to constrain, or pinch, the cap portion 50a of the composite charge 14. The cap portion 50a continues to undergo consolidation 290 (see FIGS. 12A-12B) by the constraining device 62, to form the cap 52 (see FIG. 14A) of the contoured hat section 43 (see FIG. 13A). The constraining device 62, such as the compressible foam element 102, is in the intermediate compressed position 114 (see FIG. 12B), such as the intermediate compressed position 114b (see FIG. 12B), in the die cavity 58 (see FIG. 12A), between the left die block 56b and the right die block 56c.

Now referring to FIGS. 13A-13B, FIG. 13A is a schematic illustration of a third forming step 300 of the forming cycle 12b, showing a front view of the forming apparatus 10 and the constraining device 62, in the form of the compressible foam element 102, and showing the second die 64 fully inserted in a second insertion position 302 into the die cavity 58 of the first die 54. FIG. 13B is a schematic illustration of a side view of the forming apparatus 10, and the constraining device 62, in the form of the compressible foam element 102, of FIG. 13A, in the third forming step 300.

As shown in FIG. 13A, in the third forming step 300, the tapered portion 68 (see also FIG. 13B) of the second die 64 is fully inserted, or forced or pushed, further into the die cavity 58 of the first die 54, to the second insertion position 302, and forces or pushes the left die block 56b and the right die block 56c further apart, and causes the left die block 56b and the right die block 56c to move further laterally outward, to a third position 304. The left die block 56b is moved further laterally outward in the first lateral direction 274 (see FIG. 13A), and the right die block 56c is further moved laterally outward in the second lateral direction 276 (see FIG. 13A). Further movement of the left die block 56b and the right die block 56c laterally outward creates second spaces 306 (see FIG. 13A) on each side of the compressible foam element 102, between the compressible foam element 102, covered or surrounded with the vacuum bag 105, and the left die block 56b and the right die block 56c, respectively.

As shown in FIGS. 13A-13B, the cap 52 formed by the cap portion 50a (see FIG. 11A) is constrained, or pinched, by the constraining device 62, such as the compressible foam element 102, between the second die 64 and the constraining device 62. As the second die 64 continues to apply the downward compressive force 90 (see FIG. 13B), the compressible foam element 102 continues to apply the upward resistive force 92 (see FIG. 13B), to constrain, or pinch, the cap 52 of the contoured hat section 43 that is formed. Remaining portions 50b (see FIG. 13A) of the cap portion 50a undergo consolidation 290 (see FIG. 13A) to form the sides 260 (see FIG. 14A) and the flanges 262 (see FIG. 14A) of the contoured hat section 43. The constraining device 62 (see FIG. 13B), such as the compressible foam element 102 (see FIG. 13B), is in the compressed position 116 (see FIG. 13B), such as the compressed position 116a (see FIG. 13B), in the die cavity 58 (see FIG. 13A), between the left die block 56b (see FIG. 13A) and the right die block 56c (see FIG. 13A). In the third forming step, the forming cycle 12b is complete.

Now referring to FIGS. 14A-14B, FIG. 14A is a schematic illustration of a post-forming vacuum application step 308, showing a front view of the forming apparatus 10 and the constraining device 62, in the form of the compressible foam element 102, and showing the second die 64 retracted after a vacuum is applied, and the first die and the second die in the open position 222. FIG. 14B is a schematic illustration of a side view of the forming apparatus 10, and the constraining device 62, in the form of the compressible foam element 102, of FIG. 14A, in the post-forming vacuum application step 308.

As shown in FIG. 14A, after the forming cycle 12*b* (see FIG. 13A) is complete, the highly contoured composite structure 18, such as a stringer 34, for example, a hat-shaped stringer 34*a*, is obtained. As shown in FIG. 14A, the highly contoured composite structure 18, such as a stringer 34, for example, a hat-shaped stringer 34*a*, comprises a cap 52, sides 260, and flanges 262.

In the post-forming vacuum application step 308, before the second die 64 is retracted from the first die 54 and from the highly contoured composite structure 18, such as a stringer 34, for example, a hat-shaped stringer 34*a*, a vacuum, such as vacuum pressure 118 (see FIG. 1B), from the vacuum source 106 (see FIG. 10A), such as the vacuum pump 106*a* (see FIG. 10A), is applied to the vacuum bag 105 (see FIG. 14B) and the compressible foam element 102 surrounded by the vacuum bag 105. The control valve 110 (see FIG. 10A) is opened to turn on the vacuum pressure 118 from the vacuum source 106, and to control the rate of air removal from the vacuum bag 105 surrounding the compressible foam element 102. Air is pulled out, or drawn out, of the vacuum bag 105, via the vacuum line 108 and the vacuum source 106, and this causes the vacuum bag 105 to compress around the compressible foam element 102 and hold down and retain the compressible foam element 102 in the compressed position 116*a*, such as a fully compressed position. The vacuum bag 105, under the vacuum pressure 118, surrounding the compressible foam element 102 functions as the retaining element 96 (see FIG. 1B), and is designed to retain the compressible foam element 102 in the compressed position 116*a*, to prevent the constraining device 62, such as the compressible foam element 102, from pushing the highly contoured composite structure 18, such as the stringer 34, for example, the hat-shaped stringer 34*a* upward, when the second die 64 is retracted. As shown in FIG. 14A, the constraining device 62, such as the compressible foam element 102, is in the compressed position 116*a* in the die cavity 58, between the left die block 56*b* and the right die block 56*c*.

Now referring to FIGS. 15A-15B, FIG. 15A is a schematic illustration of a formed stringer removal step 310, showing a front view of the forming apparatus 10 the constraining device 62, in the form of the compressible foam element 102, where the stringer 34 (see FIG. 14A) that is formed is removed from the first die 54. FIG. 15B is a schematic illustration of a side view of the forming apparatus 10, and the constraining device 62, in the form of the compressible foam element 102, of FIG. 15A, in the formed stringer removal step 310.

In the formed stringer removal step 310, the highly contoured composite structure 18 (see FIG. 14A), such as the stringer 34 (see FIG. 14A), for example, the hat-shaped stringer 34*a* (see FIG. 14A), is removed from the first die 54 (see FIG. 15A), and the vacuum, such as the vacuum pressure 118, is maintained by the vacuum source 106 (see FIG. 10A), such as the vacuum pump 106*a* (see FIG. 10A), on the vacuum bag 105 (see FIGS. 15A-15B) and the constraining device 62, such as the compressible foam element 102, surrounded by the vacuum bag 105. As shown in FIGS. 15A-15B, the constraining device 62, such as the compressible foam element 102, is in the compressed position 116*a* in the die cavity 58, between the left die block 56*b* and the right die block 56*c*. As shown in FIG. 15A, the left die block 56*b* and the right die block 56*c* are still in the third position 304, and the second die 64 is still retracted.

Now referring to FIGS. 16A-16B, FIG. 16A is a schematic illustration of vacuum release step 312, showing a front view of the forming apparatus 10 and the constraining device 62, in the form of the compressible foam element 102, and showing release of the vacuum, such as the vacuum pressure 118, from the vacuum bag 105 and the constraining device 62, such as the compressible foam element 102, surrounded by the vacuum bag 105. FIG. 16B is a schematic illustration of a side view of the forming apparatus 10, and the constraining device 62, in the form of the compressible foam element 102, in the vacuum release step 312.

In the vacuum release step 312, the control valve 110 (see FIG. 10A) is closed and the vacuum source 106 (see FIG. 10A), such as the vacuum pump 106*a* (see FIG. 10), is turned off, and the vacuum, such as the vacuum pressure 118, is released from the vacuum bag 105 and the constraining device 62, such as the compressible foam element 102, surrounded by the vacuum bag 105. This allows the constraining device 62, such as the compressible foam element 102, to expand back to the expanded position 112*a* (see FIG. 16A), such as the fully expanded position, or its original position, while still surrounded by the vacuum bag 105. As shown in FIG. 16A, the left die block 56*b* and the right die block 56*c* are still in the third position 304, and the second die 64 is still retracted.

Now referring to FIGS. 17A-17B, FIG. 17A is a schematic illustration of a first die return step 314, showing a front view of the forming apparatus 10 and the constraining device 62, in the form of the compressible foam element 102, and showing the first die 54, such as the left die block 56*b* and the right die block 56*c* returned to an original position, such as the first position 284. FIG. 17B is a schematic illustration of a side view of the forming apparatus 10, and the constraining device 62, in the form of the compressible foam element 102, and constraining assembly of FIG. 17A in the first die return step 314.

In the first die return step 314, the control system 70 (see FIG. 1A) of the forming apparatus 10 controls the movement of the left die block 56*b* and the right die block 56*c* and operates the controls to move the left die block 56*b* and the right die block 56*c* back to their original positions, or first positions 284, after the highly contoured composite structure 18 (see FIG. 14A), such as the stringer 34 (see FIG. 14A), for example, the hat-shaped stringer 34*a* (see FIG. 14A), is removed from the first die 54, and after the vacuum, such as the vacuum pressure 118, is turned off. FIG. 17A shows the compressible foam element 102 expanded back to the expanded position 112*a*.

Figure 18:
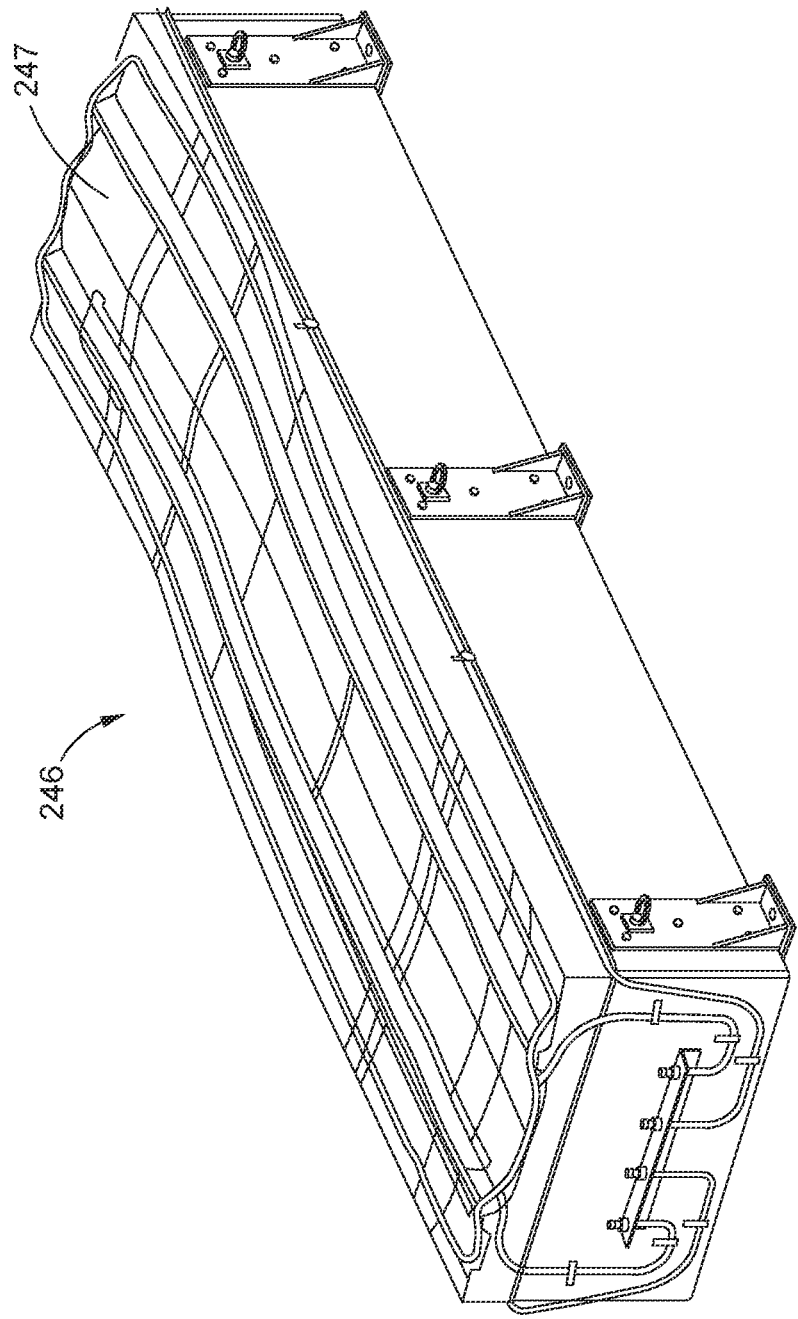
FIG. 18 is an illustration of a front perspective view of an exemplary version of a secondary holding tool.

FIG. 18 is an illustration of a front perspective view of an exemplary version of a secondary holding tool 246 for holding a contoured composite structure 16 (see FIG. 1A), such as a highly contoured composite structure 18 (see FIG. 1A), after it is formed in the forming process 12 with the forming apparatus 10 disclosed herein. As shown in FIG. 18, the contoured composite structure 16 (see FIGS. 1A, 4), such as the highly contoured composite structure 18 (see FIGS. 1A, 4), may be placed and retained on a tool surface 247, for example, for curing, finishing, or other suitable processing or assembly operations.

Figure 19:
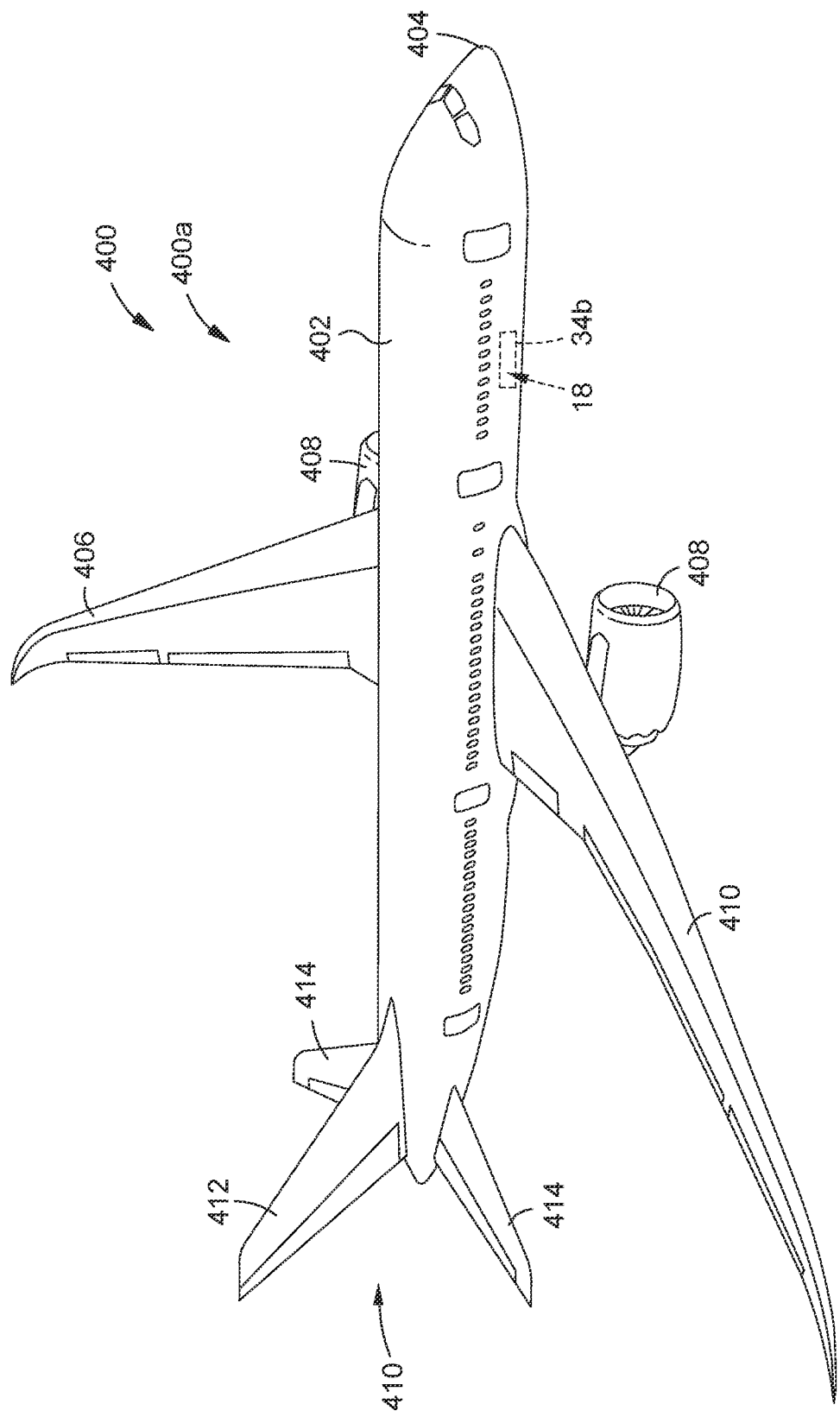
FIG. 19 is an illustration of a perspective view of an aircraft incorporating a highly contoured composite structure made with an exemplary version of a forming apparatus and a forming process of the disclosure.

Now referring to FIG. 19, FIG. 19 is an illustration of a perspective view of an air vehicle 400, such as an aircraft 400*a*, incorporating a highly contoured composite structure 18, such as in the form of an aircraft stringer 34*b*, made with a version of the forming apparatus 10 (see FIGS. 1A, 2A-2B, 3), such as the high contour stringer former apparatus 10*a* (see FIGS. 1A, 2A-2B, 3), and a forming process 12, of the disclosure. As shown in FIG. 19, the air vehicle 400, such as the aircraft 400*a*, includes a fuselage 402, a nose 404, wings 406, engines 408, and an empennage 410. As shown in FIG. 19, the empennage 410 comprises a vertical stabilizer 412 and horizontal stabilizers 414.

The contoured composite structure 16 (see FIGS. 1A, 4), such as the highly contoured composite structure 18 (see FIGS. 1A, 4), can be used individually, or in combination with other structures and devices. As shown in FIG. 19, in one version, after the highly contoured composite structure 18 comprising the aircraft stringer 34*b* has been formed, it can be used in a section of the fuselage 402 of the aircraft 400*a*. For example, before or after each highly contoured composite structure 18 comprising the aircraft stringer 34*b* is cured, it can be loaded onto a mandrel of a machine for making a section of fuselage 402. Fiber-reinforced resin can be disposed over the highly contoured composite structure 18 comprising the aircraft stringer 34*b*, and the fiber-reinforced resin can then be cured (or co-cured with the another structure) to produce a finished assembly for the fuselage 402 of the aircraft 400*a*. After the highly contoured composite structure 18, such as in the form of an aircraft stringer 34*b*, has been formed, it may also be uses in sections of the wings 406, the vertical stabilizer 412, the horizontal stabilizers 414, or other suitable parts of the aircraft 400*a*. The highly contoured composite structure 18 can be used in a variety of industries and applications including, but not limited to, in connection with the manufacture of aircraft 400*a* and other aerospace structures and vehicles, including spacecraft, and rotorcraft, as well as vehicles such as watercraft, trains, or other suitable vehicles or structures.

Figure 20:
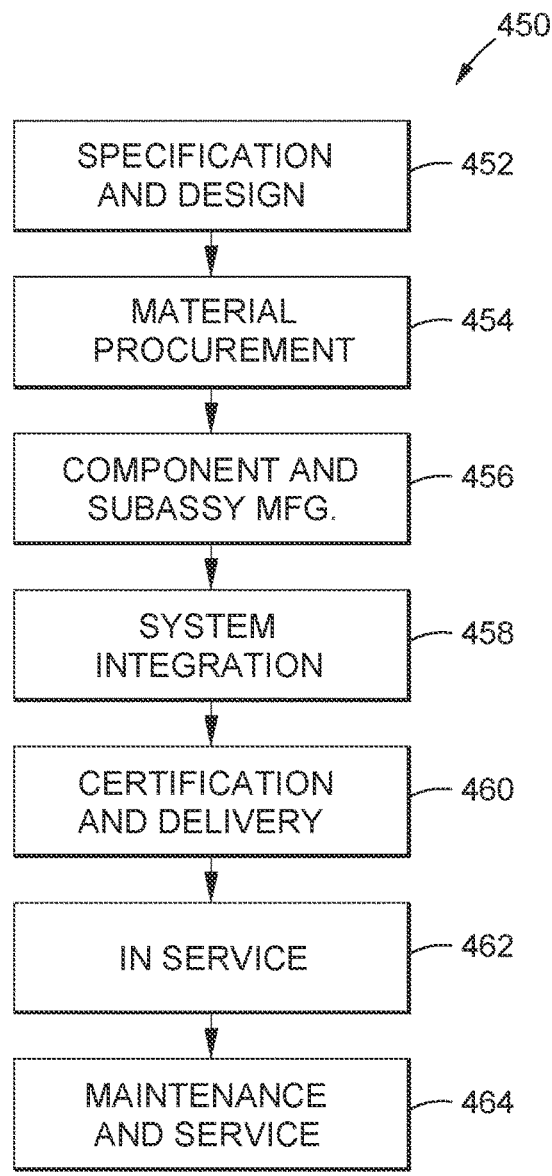
FIG. 20 is an illustration of a flow diagram of an exemplary aircraft manufacturing and service method.
Figure 21:
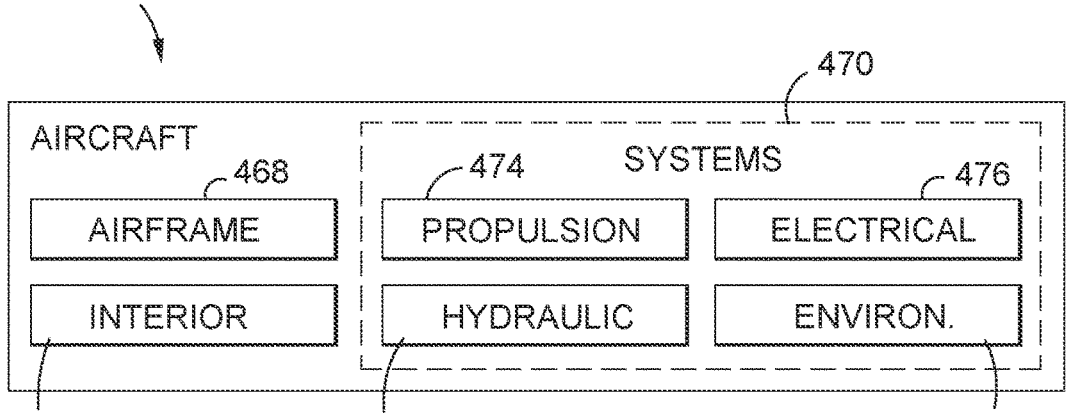
FIG. 21 is an illustration of an exemplary block diagram of an aircraft.

Now referring to FIGS. 20 and 21, FIG. 20 is an illustration of a flow diagram of an exemplary aircraft manufacturing and service method 450, and FIG. 21 is an illustration of an exemplary block diagram of an aircraft 466. Referring to FIGS. 20 and 21, versions of the disclosure may be described in the context of the aircraft manufacturing and service method 450 as shown in FIG. 20, and the aircraft 466 as shown in FIG. 21.

During pre-production, exemplary aircraft manufacturing and service method 450 may include specification and design 452 of the aircraft 466 and material procurement 454. During manufacturing, component and subassembly manufacturing 456 and system integration 458 of the aircraft 466 takes place. Thereafter, the aircraft 466 may go through certification and delivery 460 in order to be placed in service 462. While in service 462 by a customer, the aircraft 466 may be scheduled for routine maintenance and service 464 (which may also include modification, reconfiguration, refurbishment, and other suitable services).

Each of the processes of the aircraft manufacturing and service method 450 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 21, the aircraft 466 produced by the exemplary aircraft manufacturing and service method 450 may include an airframe 468 with a plurality of systems 470 and an interior 472. Examples of the plurality of systems 470 may include one or more of a propulsion system 474, an electrical system 476, a hydraulic system 478, and an environmental system 480. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 450. For example, components or subassemblies corresponding to component and subassembly manufacturing 456 may be fabricated or manufactured in a manner similar to components or subassemblies produced while the aircraft 466 is in service 462. Also, one or more apparatus embodiments, method embodiments, or a combination thereof, may be utilized during component and subassembly manufacturing 456 and system integration 458, for example, by substantially expediting assembly of or reducing the cost of the aircraft 466. Similarly, one or more of apparatus embodiments, method embodiments, or a combination thereof, may be utilized while the aircraft 466 is in service 462, for example and without limitation, to maintenance and service 464.

Disclosed versions of the forming apparatus 10 (see FIGS. 1, 2A-2B, 3), such as the high contour stringer former apparatus 10*a* (see FIGS. 1, 2A-2B, 3), the method 350 (see FIG. 9A), and the method 370 (see FIG. 9B) provide for an automated forming apparatus 10*b* (see FIGS. 1, 2A-2B) using an automated forming process 12*a* (see FIG. 1A) that is labor saving and time saving over hand lay-up techniques. Known hand lay-up techniques may take about eight times as long to form a contoured composite structure as compared to the forming process 12 using the forming apparatus 10 disclosed herein. In addition, disclosed versions of the forming apparatus 10 (see FIGS. 1, 2A-2B, 3), such as the high contour stringer former apparatus 10*a* (see FIGS. 1, 2A-2B, 3), the method 350 (see FIG. 9A), and the method 370 (see FIG. 9B) enable higher production rate of contoured composite structures 16 (see FIGS. 1A, 4), such as highly contoured composite structures 18 (see FIGS. 1A, 4), and avoid costs associated with additional inspection and repair of wrinkles or fiber distortions of known methods. Further, disclosed versions of the forming apparatus 10 (see FIGS. 1, 2A-2B, 3), such as the high contour stringer former apparatus 10*a* (see FIGS. 1, 2A-2B, 3), the method 350 (see FIG. 9A), and the method 370 (see FIG. 9B) enable design of contoured composite structures 16 (see FIGS. 1A, 4), such as highly contoured composite structures 18 (see FIGS. 1A, 4), having complex contours 30*a* (see FIG. 1A), including having higher contours, each having a contour radius 98 (see FIG. 1A) that is tighter than the contour radius of contoured structures formed by known methods. This, in turn, may result in an aircraft 400*a* (see FIG. 19) or other aerospace vehicle or structure, that is more efficient. Disclosed versions of the forming apparatus 10 (see FIGS. 1, 2A-2B, 3), such as the high contour stringer former apparatus 10*a* (see FIGS. 1, 2A-2B, 3), the method 350 (see FIG. 9A), and the method 370 (see FIG. 9B) allow for variable thickness and depth of formed part, for example, the contoured composite structures 16 (see FIGS. 1A, 4), such as highly contoured composite structures 18 (see FIGS. 1A, 4), formed, without having to make unique dies for each part.

Moreover, disclosed versions of the forming apparatus 10 (see FIGS. 1, 2A-2B, 3), such as the high contour stringer former apparatus 10*a* (see FIGS. 1, 2A-2B, 3), the method 350 (see FIG. 9A), and the method 370 (see FIG. 9B) improve the forming process 12 (see FIG. 1A) of contoured composite structures 16 (see FIGS. 1A, 4), such as highly contoured composite structures 18 (see FIGS. 1A, 4), for example, aircraft stringers 34*b* (see FIGS. 1A, 19), such as fuselage stringers 34*d* (see FIG. 1A), by adding a constraining assembly 60 (see FIG. 1B) having a constraining device 62 (see FIG. 1B). The constraining device 62 (see FIG. 1B) constrains the cap portion 50a (see FIGS. 8, 11A), of a composite charge 14 (see FIGS. 8, 11A), prior to the forming process 12 (see FIG. 1A), and during the forming process 12, the constraining device 62 constrains the cap portion 50a, or the cap 52 (see FIG. 13A) formed from the cap portion 50a, as the contoured hat section 43 (see FIGS. 8, 13A) is formed. As the second die 64, or upper die 64b (see FIG. 1A) applies the downward compressive force 90 (see FIG. 8), the constraining assembly, and in particular, the constraining device 62, applies the upward resistive force 92 (see FIG. 8). against the cap portion 50a, or the cap 52, and against the downward compressive force 90 (see FIG. 8) applied by the second die 64 (see FIG. 8), to transfer stress away from the cap portion 50a, or cap 52, and to provide wrinkle prevention 44 (see FIG. 1A), or wrinkle reduction 45 (see FIG. 1A), in the cap portion 50a, or cap 52, to obtain the contoured composite structure 16, such as the highly contoured composite structure 18, having the cap 52 that is wrinkle-free 46 (see FIG. 1A) or having reduced wrinkling 48 (see FIG. 1A). In particular, this constraint, or pinching, by the constraining device 62 prevents or mitigates wrinkles forming in the cap 52 of stringers 34 (see FIG. 1A). The forming apparatus 10 and forming process 12 using the constraining assembly 60, and in particular, the constraining device 62, eliminates or substantially eliminates wrinkles, or fiber distortions or the like. For example, the forming apparatus 10 and forming process 12 using the constraining assembly 60 with the constraining device 62, as disclosed herein, eliminates 95%-100% of wrinkles in the cap 52, of contoured composite structures 16, such as highly contoured composite structures 18, as compared to 75% or less wrinkle reduction in the cap of contoured composite parts or structures formed using existing form-to-contour methods and technology. However, the percentage of wrinkle elimination may vary depending on contour, thickness, and other factors.

Further, the constraining assembly 60 (see FIG. 1B) advantageously includes a retaining element 96 (see FIG. 1B) that is designed to restrain, and restrains, the constraining device 62, when the second die 64 is retracted away from the first die 54 and after the highly contoured composite structure 18 is formed. The retaining element 96 prevents the constraining device 62 from pushing the highly contoured composite structure 18 upward, when the second die 64 is retracted away from the first die 54. The retaining element 96 preferably removes the upward resistive force 92 applied by the constraining device 62, when the second die 64, or upper die 64b, is retracted upward.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A forming apparatus for constraining a composite charge and forming the composite charge into a highly contoured composite structure, the forming apparatus comprising:
    a first die and a second die between which the composite charge is formed, the first die having pairs of first die portions spaced apart to define a die cavity into which the composite charge is formed into a contoured hat section having a cap, the pairs being slidably displaceable with respect to each other, and the second die having a tapered portion designed for at least partial insertion into the die cavity and the second die having a composite charge engagement end with a width; and
    a constraining assembly comprising a pneumatic assembly coupled to the first die and having a constraining device comprising an air cylinder coupled to an air cylinder rod, the air cylinder rod having a first end coupled to a cap presser having an engagement surface engaging a cap portion of the composite charge, the air cylinder and the cap presser being removably attached to the die cavity, the cap presser comprising an aluminum bar that is semi-rigid and having a uniform width that is less than a width of the air cylinder and less than the width of the composite charge engagement end of the second die, and the width of the air cylinder being less than the width of the composite charge engagement end of the second die,
    the constraining device designed to constrain the cap portion of the composite charge between the engagement surface of the cap presser and the composite charge engagement end of the second die, and the constraining device designed to apply an upward resistive force against the cap portion, and against a downward compressive force applied by the second die, to provide wrinkle prevention in the cap, as the contoured hat section is formed, and the constraining assembly further having a retaining element designed to retain the constraining device, when the second die is retracted after the highly contoured composite structure is formed.

2. The forming apparatus of claim 1, further comprising a control system for operatively controlling the forming apparatus, including coordinating movements of the first die and the second die with movement of the constraining assembly.

3. The forming apparatus of claim 1, wherein the highly contoured composite structure comprises one or more of, a stringer, a hat-shaped stringer, an aircraft stringer, a hat-shaped aircraft stringer, a fuselage stringer, a keel stringer, a wing stringer, a stabilizer stringer, a stiffener member, a hat-shaped stiffener member, and a spar.

4. The forming apparatus of claim 1, wherein the constraining device has a first end engaging, directly or indirectly, with a first surface of the cap portion, to apply the upward resistive force against the first surface of the cap portion, and against the downward compressive force applied by the second die, and to pinch the cap portion against the tapered portion of the second die, during the forming of the composite charge into the highly contoured composite structure.

5. The forming apparatus of claim 1, wherein during the forming of the composite charge into the highly contoured composite structure, the constraining device is initially in an expanded position in the die cavity to constrain the cap portion against the second die, and when the tapered portion of the second die is fully inserted into the die cavity, the constraining device is in a compressed position, and one or more of the pairs of the first die portions are positioned laterally outward from the constraining device.

6. The forming apparatus of claim 1, wherein the air cylinder rod of the constraining device comprises a piston rod designed to move from an expanded position to a compressed position, the air cylinder rod having a second end attached to a piston head.

7. The forming apparatus of claim 1, wherein the cap presser comprising the aluminum bar has a thickness of 0.125 inch.

8. The forming apparatus of claim 1, wherein the air cylinder of the constraining device comprises a linear actuator that works with compressed air.

9. The forming apparatus of claim 1, wherein the air cylinder comprises a single acting spring return air cylinder having one air supply line connected between an air supply source and a first port of the single acting spring return air cylinder, the single acting spring return air cylinder comprising a spring inside the air cylinder and fitted around a rod body of the air cylinder rod.

10. The forming apparatus of claim 1, wherein the air cylinder comprises a double acting air cylinder having a first air supply line and a second air supply line connected between an air supply source and the double acting air cylinder, the first air supply line coupled, via a first port, to a lower bore located within the double acting air cylinder, and the second air supply line coupled, via a second port, to an upper bore located within the double acting air cylinder.

11. The forming apparatus of claim 10, wherein the retaining element comprises one of,
a spring return and a spring force applied to the air cylinder rod, to retain the air cylinder rod in a compressed position, where the air cylinder comprises a single acting spring return air cylinder;
a pneumatic air pressure application applied to the air cylinder rod, to retain the air cylinder rod in the compressed position, where the air cylinder comprises the double acting air cylinder; and
an actuated rod locking device retaining the air cylinder rod in the compressed position, where the air cylinder comprises a rod lock air cylinder.

12. The forming apparatus of claim 1, wherein the tapered portion of the second die has the composite charge engagement end with an engagement surface designed to engage with the cap portion of the composite charge, and the width of the cap presser is less than a width of the engagement surface of the tapered portion.

13. The forming apparatus of claim 1, wherein the air cylinder comprises a rod lock air cylinder having an actuated rod locking device within a cylinder tube of the air cylinder, the actuated rod locking device configured to couple to the air cylinder rod to lock the air cylinder rod in a compressed position.

14. The forming apparatus of claim 13, wherein the actuated rod locking device comprises an actuator configured to actuate a rod lock to couple to one or more portions of the air cylinder rod to lock the air cylinder rod in the compressed position.

15. A method for constraining a composite charge and forming the composite charge into a highly contoured composite structure, the method comprising the steps of:
positioning the composite charge between, and in contact with, a first die and a second die of a forming apparatus, the first die having pairs of first die portions spaced apart to define a die cavity into which the composite charge is formed into a contoured hat section having a cap, the pairs being slidably displaceable with respect to each other, and the second die having a tapered portion designed for at least partial insertion into the die cavity, and the second die having a composite charge engagement end with a width, and the first die having a constraining assembly with a constraining device positioned in the die cavity, the constraining assembly comprising a pneumatic assembly coupled to the first die and having the constraining device comprising an air cylinder coupled to an air cylinder rod, the air cylinder rod having a first end coupled to a cap presser having an engagement surface engaging a cap portion of the composite charge, the air cylinder and the cap presser being removably attached to the die cavity, the cap presser comprising an aluminum bar that is semi-rigid and having a uniform width that is less than a width of the air cylinder and less than the width of the composite charge engagement end of the second die, and the width of the air cylinder being less than the width of the composite charge engagement end of the second die;
pressing the composite charge into the die cavity of the forming apparatus, to form the contoured hat section having the cap and having sides;
constraining the cap portion of the composite charge between the engagement surface of the cap presser and the composite charge engagement end of the second die, as the contoured hat section is formed, and applying an upward resistive force, with the constraining device, against the cap portion, and against a downward compressive force applied by the second die, to transfer stress away from the cap and to provide wrinkle prevention in the cap;
obtaining the highly contoured composite structure having the cap that is wrinkle-free; and
retaining the constraining device with a retaining element of the constraining assembly, to prevent the constraining device from pushing the highly contoured composite structure upward, when the second die is retracted.

16. The method of claim 15, further comprising, after retaining the constraining device, the steps of:
removing the highly contoured composite structure from the first die; and
releasing the retaining element, to allow the constraining device to move upward from a compressed position to an expanded position.

17. The method of claim 16, further comprising after removing the highly contoured composite structure from the first die, moving the highly contoured composite structure to one of, a secondary holding tool, and a substrate.

18. The method of claim 15, wherein positioning the composite charge further comprises, positioning the composite charge between, and in contact with, the first die and the second die, wherein the first die has the constraining assembly comprising the retaining element comprising one of,
a spring return and a spring force applied to the air cylinder rod, to retain the air cylinder rod in a compressed position, where the air cylinder comprises a single acting spring return air cylinder;
a pneumatic air pressure application applied to the air cylinder rod, to retain the air cylinder rod in the compressed position, where the air cylinder comprises the double acting air cylinder; and
an actuated rod locking device retaining the air cylinder rod in the compressed position, where the air cylinder comprises a rod lock air cylinder.

19. The method of claim 15, wherein positioning the composite charge further comprises, positioning the composite charge between, and in contact with, the first die and the second die, wherein the first die has the constraining assembly comprising the pneumatic assembly, and the air cylinder comprises a single acting spring return air cylinder having one air supply line connected between an air supply source and a first port of the single acting spring return air cylinder, the single acting spring return air cylinder comprising a spring inside the air cylinder and fitted around a rod body of the air cylinder rod.

20. The method of claim 15, wherein positioning the composite charge further comprises, positioning the composite charge between, and in contact with, the first die and the second die, wherein the first die has the constraining assembly comprising the pneumatic assembly, and the air cylinder comprises a double acting air cylinder having a first air supply line and a second air supply line connected between an air supply source and the double acting air cylinder, the first air supply line coupled, via a first port, to a lower bore located within the double acting air cylinder, and the second air supply line coupled, via a second port, to an upper bore located within the double acting air cylinder.

21. A method for forming an aircraft stringer having a cap that is wrinkle-free, the method comprising the steps of:
positioning a composite laminate charge between, and in contact with, a female die and a male die of a high contour stringer former apparatus, the female die having pairs of die blocks spaced apart to define a die cavity, and the female die having a constraining assembly with a constraining device disposed in the die cavity, and the male die having a composite charge engagement end with a width, and the constraining assembly comprising a pneumatic assembly coupled to the female die and having the constraining device comprising an air cylinder coupled to an air cylinder rod, the air cylinder rod having a first end coupled to a cap presser having an engagement surface engaging a cap portion of the composite laminate charge, the air cylinder and the cap presser being removably attached to the die cavity, the cap presser comprising an aluminum bar that is semi-rigid and having a uniform width that is less than a width of the air cylinder and less than the width of the composite charge engagement end of the male die, and the width of the air cylinder being less than the width of the composite charge engagement end of the male die;
pressing the composite laminate charge into the die cavity of the high contour stringer former apparatus, to form a contoured hat section of the aircraft stringer, the contoured hat section having the cap and sides;
constraining the cap between the engagement surface of the cap presser and the composite charge engagement end of the male die, as the contoured hat section is formed, and applying an upward resistive force, with the constraining device, against the cap, and against a downward compressive force applied by the male die, to transfer stress away from the cap and to provide wrinkle prevention in the cap;
forming remaining portions of the composite laminate charge into the aircraft stringer, while the cap presser continues to constrain the cap and apply the upward resistive force against the cap and against the downward compressive force;
obtaining the aircraft stringer having the cap that is wrinkle-free;
retracting the male die away from the aircraft stringer;
retaining the constraining device with a retaining element of the constraining assembly, to prevent the constraining device from pushing the aircraft stringer upward, when the male die is retracted;
removing the aircraft stringer from the female die; and
releasing the retaining element.

22. The method of claim 21, further comprising, after removing the aircraft stringer from the female die, moving the aircraft stringer to one of, a secondary holding tool, and a substrate.

23. The method of claim 21, wherein positioning the composite laminate charge between, and in contact with, the female die and the male die, where the female die has the constraining assembly with the constraining device, further comprises, positioning the composite laminate charge between, and in contact with, the female die and the male die, where the female die has the constraining assembly the retaining element comprising one of,
a spring return and a spring force applied to the air cylinder rod, to retain the air cylinder rod in a compressed position, where the air cylinder comprises a single acting spring return air cylinder;
a pneumatic air pressure application applied to the air cylinder rod, to retain the air cylinder rod in the compressed position, where the air cylinder comprises the double acting air cylinder; and
an actuated rod locking device retaining the air cylinder rod in the compressed position, where the air cylinder comprises a rod lock air cylinder.

24. The method of claim 21, wherein positioning the composite laminate charge between, and in contact with, the female die and the male die, where the female die has the constraining assembly with the constraining device, further comprises, positioning the composite laminate charge between, and in contact with, the female die and the male die, where the female die has the constraining assembly comprising the pneumatic assembly, and the air cylinder comprises a single acting spring return air cylinder having one air supply line connected between an air supply source and a first port of the single acting spring return air cylinder, the single acting spring return air cylinder comprising a spring inside the air cylinder and fitted around a rod body of the air cylinder rod.

25. The method of claim 21, wherein positioning the composite laminate charge between, and in contact with, the female die and the male die, where the female die has the constraining assembly with the constraining device, further comprises, positioning the composite laminate charge between, and in contact with, the female die and the male die, where the female die has the constraining assembly comprising the pneumatic assembly, and the air cylinder comprises a double acting air cylinder having a first air supply line and a second air supply line connected between an air supply source and the double acting air cylinder, the first air supply line coupled, via a first port, to a lower bore located within the double acting air cylinder, and the second air supply line coupled, via a second port, to an upper bore located within the double acting air cylinder.

26. The method of claim 21, wherein constraining the cap with the constraining device, as the contoured hat section is formed, and applying the upward resistive force against the downward compressive force applied by the male die, further comprises, the downward compressive force pushing the cap downward, compressing the constraining device, and moving one or more of the pairs of the die blocks laterally outward.

* * * * *